US011964494B2

(12) United States Patent
Minamikawa et al.

(10) Patent No.: US 11,964,494 B2
(45) Date of Patent: *Apr. 23, 2024

(54) IMAGE FORMING APPARATUS AND COMPUTER-READABLE STORAGE MEDIUM

(71) Applicant: BROTHER KOGYO KABUSHIKI KAISHA, Nagoya (JP)

(72) Inventors: Shunsuke Minamikawa, Nagoya (JP); Kenta Horade, Tokai (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/740,631

(22) Filed: May 10, 2022

(65) Prior Publication Data

US 2022/0266599 A1 Aug. 25, 2022

Related U.S. Application Data

(60) Continuation of application No. 16/989,995, filed on Aug. 11, 2020, which is a division of application No. 16/218,589, filed on Dec. 13, 2018, now abandoned.

(30) Foreign Application Priority Data

Dec. 27, 2017 (JP) ................................ 2017-252597

(51) Int. Cl.
*B41J 29/393* (2006.01)
*B41J 2/175* (2006.01)
*B41J 29/13* (2006.01)

(52) U.S. Cl.
CPC ....... *B41J 2/17566* (2013.01); *B41J 2/17509* (2013.01); *B41J 2/17513* (2013.01);
(Continued)

(58) Field of Classification Search
CPC .................. B41J 29/393; B41J 2/17566; B41J 2002/17589
See application file for complete search history.

(56) References Cited

U.S. PATENT DOCUMENTS 5,315,317 A 5/1994 Terasawa et al.
6,223,131 B1 4/2001 Kanaya et al.
(Continued)

FOREIGN PATENT DOCUMENTS

CN 104602915 A 5/2015
JP H03-032851 A 2/1991
(Continued)

OTHER PUBLICATIONS

U.S. Official Action dated Oct. 3, 2022 from related U.S. Appl. No. 16/989,995.
(Continued)

*Primary Examiner* — Julian D Huffman
(74) *Attorney, Agent, or Firm* — Scully, Scott, Murphy & Presser, PC

(57) ABSTRACT

An image forming apparatus, having a cartridge detachably attached to the image forming apparatus and including a first compartment configured to store a colorant, a container configured to be connected with the cartridge and including a second compartment configured to store the colorant flowing from the cartridge, and a display configured to display a first object indicating a first remainder amount and a second object indicating a second remainder amount in a single screen, is provided. The first remainder amount is a remainder amount of the colorant stored in the first compartment, and the second remainder amount is a remainder amount of the colorant stored in the second compartment.

26 Claims, 26 Drawing Sheets

(52) U.S. Cl.
CPC ......... *B41J 2/1752* (2013.01); *B41J 2/17523* (2013.01); *B41J 2/17553* (2013.01); *B41J 29/13* (2013.01); *B41J 2002/17573* (2013.01); *B41J 2002/17576* (2013.01); *B41J 2002/17589* (2013.01)

(56) References Cited

U.S. PATENT DOCUMENTS

| | | | |
|---|---|---|---|
| 2002/0085050 | A1 | 7/2002 | Aruga et al. |
| 2008/0198186 | A1 | 8/2008 | Hayakawa |
| 2008/0204488 | A1 | 8/2008 | Usui |
| 2013/0249988 | A1 | 9/2013 | Mihara |
| 2016/0200115 | A1 | 7/2016 | Niiyama |
| 2017/0157942 | A1 | 6/2017 | Koganehira et al. |
| 2018/0370244 | A1 | 12/2018 | Dabon et al. |

FOREIGN PATENT DOCUMENTS

| | | | |
|---|---|---|---|
| JP | 9-131897 | A | 5/1997 |
| JP | 2005-1149 | A | 1/2005 |
| JP | 2007-253396 | A | 10/2007 |
| JP | 2008-204132 | A | 9/2008 |
| JP | 2008-213162 | A | 9/2008 |
| JP | 2013-159070 | A | 8/2013 |

OTHER PUBLICATIONS

U.S. Official Action dated Feb. 2, 2023 from related U.S. Appl. No. 16/989,995.

Canon PR0-6000 Online Manual, Cover page and p. 346, retrieved from URL: http:/cdn.cnetcontent.com/a9/b9/a9b957fd-5b5e-4695-9dba-02ca33c8841b.pdf.

"Professional Fine Art Photographers Prepare to Obsess as Canon U.S.A. Announces New Large-Format imagePROGRAF Inkjet Printer", Press Release, Melville, N.Y., Jul. 20, 2017, pp. 1-3.

U.S. Office Action dated Apr. 18, 2022 from related U.S. Appl. No. 16/989,995.

U.S. Office Action dated Feb. 3, 2020 from related U.S. Appl. No. 16/218,589.

Japanese Notice of Reasons for Refusal dated Nov. 9, 2021 received in Japanese Patent Application No. 2017-252597, together with an English-language translation.

U.S. Oficial Action dated Aug. 3, 2023 from related U.S. Appl. No. 17/741,541.

Office Action dated Dec. 29, 2023 from related U.S. Appl. No. 17/741,541.

IMAGE FORMING APPARATUS AND COMPUTER-READABLE STORAGE MEDIUM

CROSS REFERENCE TO RELATED APPLICATIONS

This application is a continuation of U.S. patent application Ser. No. 16/989,995, filed Aug. 11, 2020, which is a divisional of U.S. patent application Ser. No. 16/218,589, filed Dec. 13, 2018, now abandoned, which claims priority under 35 U.S.C. § 119 from Japanese Patent Application No. 2017-252597, filed on Dec. 27, 2017, the entire subject matter of each of which is incorporated herein by reference.

BACKGROUND

Technical Field

The present disclosure is related to an aspect of an image forming apparatus having two (2) reservoirs, such as a cartridge and a container, for storing a colorant, and a computer readable storage medium to store computer readable instructions to control an information processing apparatus that may communicate with the image forming apparatus.

Related Art

An inkjet recording apparatus capable of detecting an amount of ink remaining in a cartridge being an ink reservoir, is known. The inkjet recording apparatus may display the detected remaining ink amount in a display device, and a user may recognize the remaining ink amount through the display device.

Meanwhile, an inkjet printer having two (2) ink reservoirs to store ink, which are a main tank and a subsidiary tank, is known. A cartridge serving as the main tank may be attached to an attachable area in the inkjet printer, and when the cartridge is attached thereto, a portion of the ink stored in the cartridge may flow into the subsidiary tank so that the ink in the subsidiary tank may be used when the ink in the cartridge runs out.

SUMMARY

While the user may recognize the amount of the ink remaining in the cartridge through the display device, the user may wish to know how much further printing may be continued even after the ink in the cartridge runs out.

The present disclosure is advantageous in that an image forming apparatus, by which a user may recognize how much further after exhaustion of ink in a cartridge printing may be continued, is provided.

According to an aspect of the present disclosure, an image forming apparatus, having a cartridge detachably attached to the image forming apparatus and including a first compartment configured to store a colorant, a container configured to be connected with the cartridge and including a second compartment configured to store the colorant flowing from the cartridge, and a display configured to display a first object indicating a first remainder amount and a second object indicating a second remainder amount in a single screen, is provided. The first remainder amount is a remainder amount of the colorant stored in the first compartment, and the second remainder amount is a remainder amount of the colorant stored in the second compartment.

According to another aspect of the present disclosure, an image forming apparatus, having a cartridge, a container, a recorder, a display, a memory, and a controller, is provided. The cartridge is detachably attached to the image forming apparatus. The cartridge includes a first compartment configured to store a colorant. The container is configured to be connected with the cartridge. The container includes a second compartment configured to store the colorant flowing from the cartridge. The recorder is connected with the container and is configured to discharge the colorant supplied from the container. The controller is configured to control the recorder to discharge the colorant and the display to display an image in a screen, calculate a discharged amount value indicating an amount of the colorant having been discharged from the recorder; obtain first information, which indicates an initial amount being an amount of the colorant stored in the cartridge after attachment of the cartridge in the image forming apparatus, and second information, which indicates an amount of the colorant stored in the container prior to the attachment of the cartridge, from the memory; and display a first object including a bar, of which length is varied according to a first remainder amount indicating an amount of the colorant stored in the cartridge, the first remainder amount being determined based on the discharged amount value, the first information, and the second information, and a second object including a bar, of which length is varied according to a second remainder amount indicating the amount of the colorant stored in the container, in a single screen.

According to another aspect of the present disclosure, a non-transitory computer readable storage medium storing computer readable instructions that are executable by a computer in an information processing apparatus, including a display and a first communication interface, through which the information processing apparatus communicates with an image forming apparatus, is provided. The computer readable instructions, when executed by the computer, causing the computer to receive first information and second information from the image forming apparatus through the first communication interface, the first information indicating an amount of a colorant stored in a cartridge in the image forming apparatus, the second information indicating an amount of the colorant stored in a container in the image forming apparatus; and control the display to display a first object, the first object indicating the amount of the colorant stored in the cartridge based on the first information, and a second object, the second object indicating the amount of the colorant stored in the container based on the second information, in a single screen.

BRIEF DESCRIPTION OF THE ACCOMPANYING DRAWINGS

FIG. 1A is a perspective exterior view of a printer 10 according to a first embodiment of the present disclosure with a cover 87 at a covering position. FIG. 1B is a perspective exterior view of the printer 10 according to the first embodiment of the present disclosure with the cover 87 at an exposing position.

Figure 5:
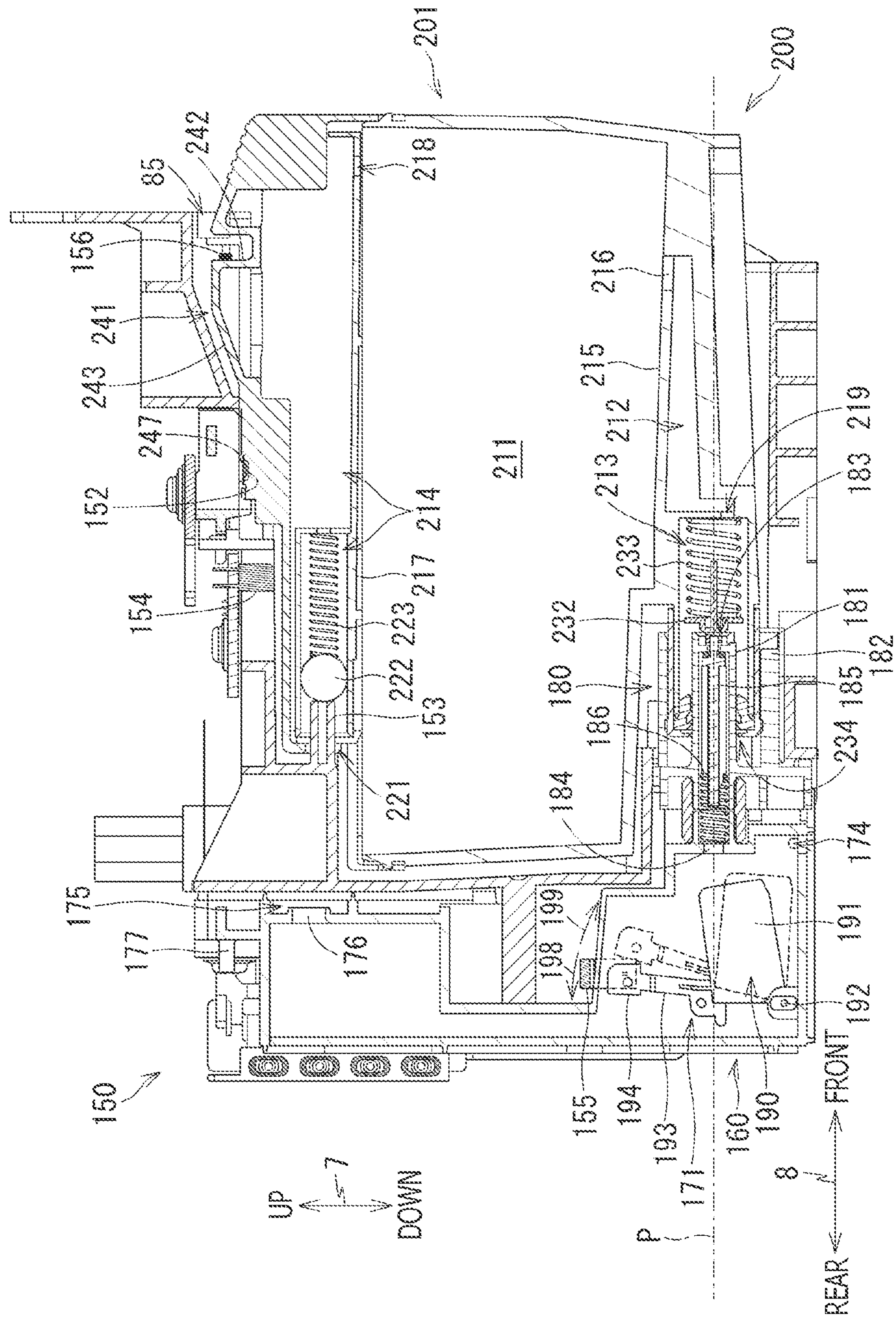

FIG. 5 is a cross-sectional view of the attachment case 150 with the cartridge 200 attached thereto in the printer 10 according to the first embodiment of the present disclosure.

Figure 6:
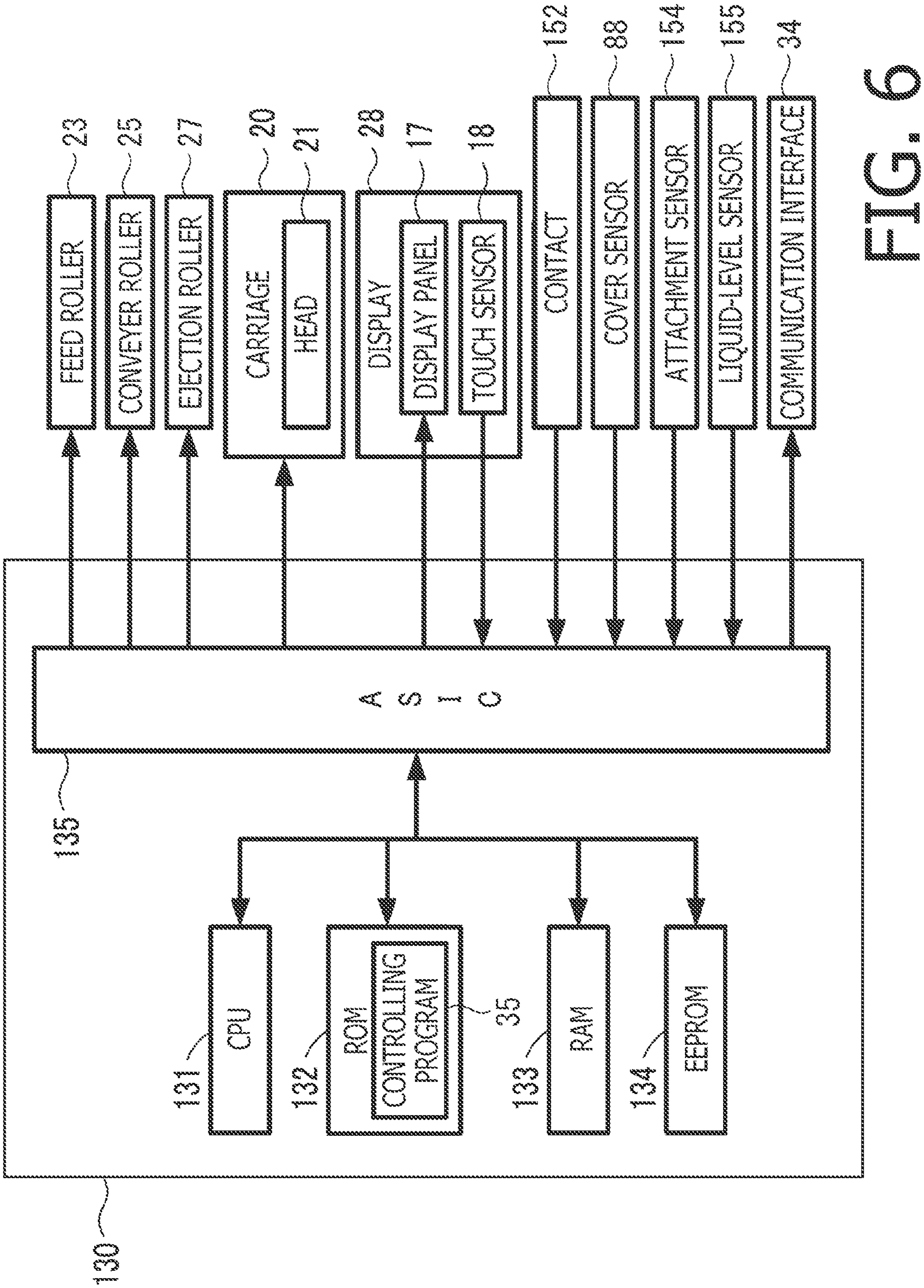

FIG. 6 is a block diagram to illustrate a configuration in the printer 10 according to the first embodiment of the present disclosure.

Figure 7:
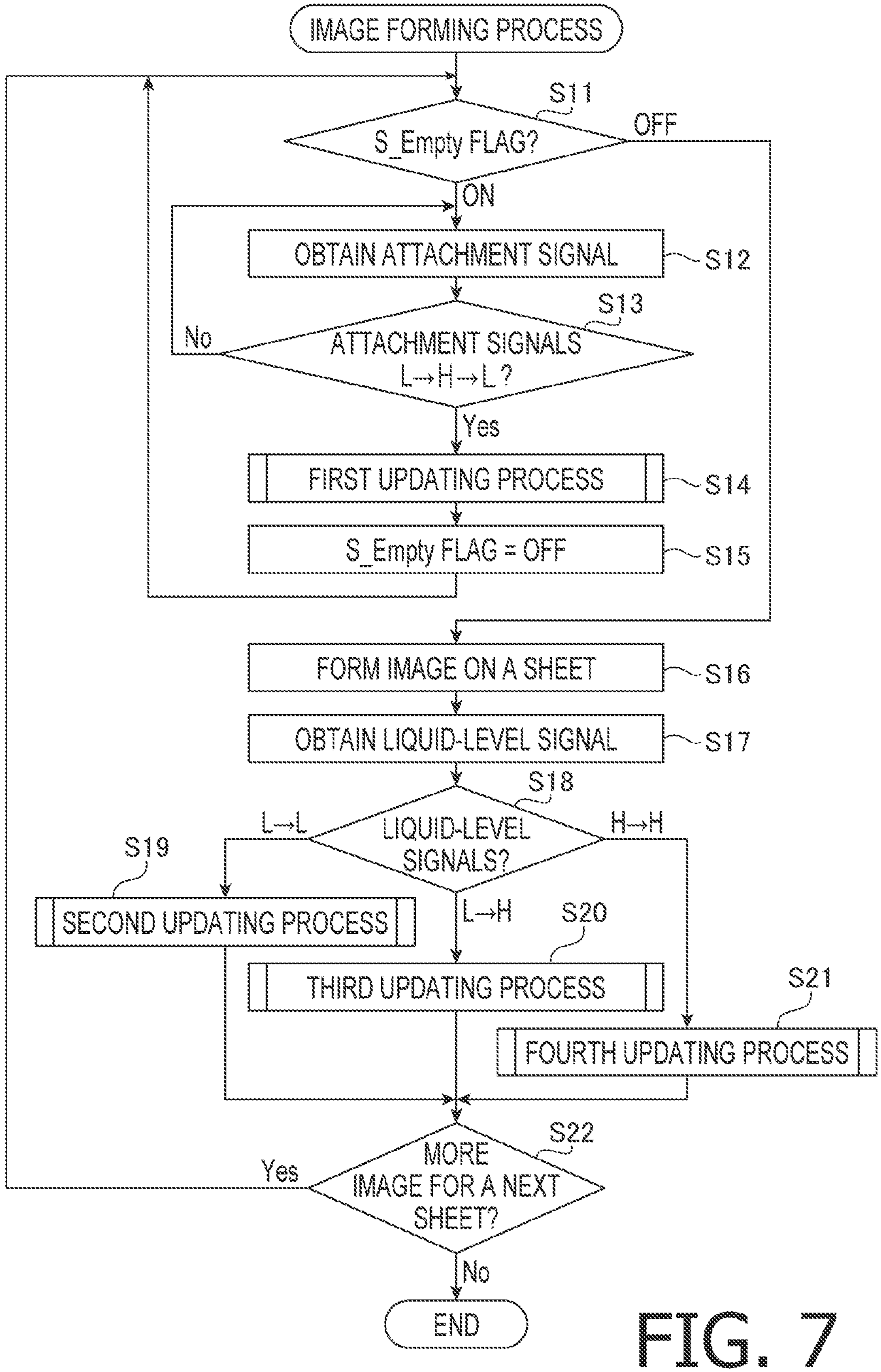

FIG. 7 is a flowchart to illustrate a flow of steps in an image forming process to be conducted in the printer 10 according to the first embodiment of the present disclosure.

FIGS. 8A-8D are flowcharts to illustrate flows of steps in first, second, third, and fourth updating processes to be conducted in the printer 10 according to the first embodiment of the present disclosure.

Figure 9:
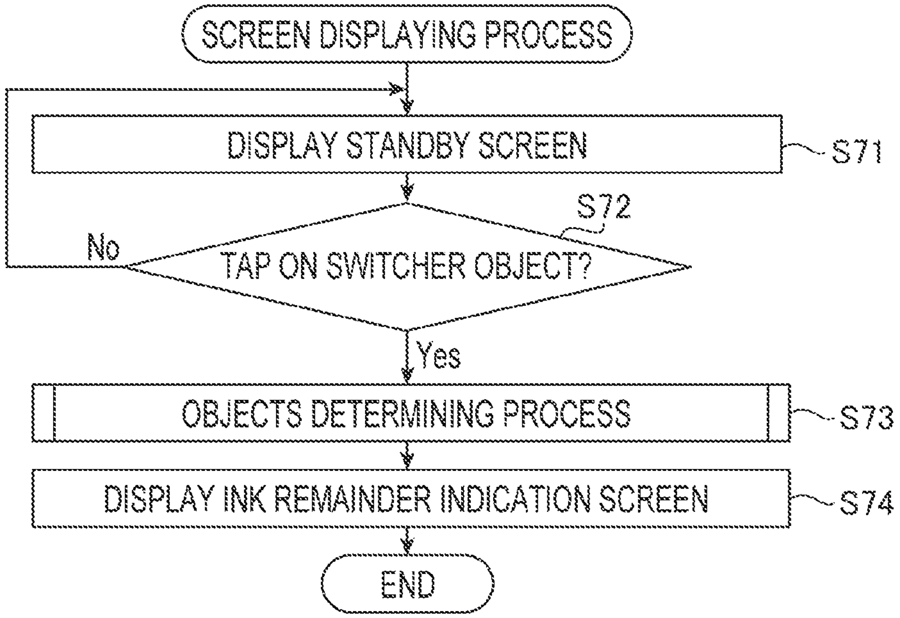

FIG. 9 is a flowchart to illustrate a flow of steps in a screen displaying process to be conducted in the printer 10 according to the first embodiment of the present disclosure.

Figure 10A:
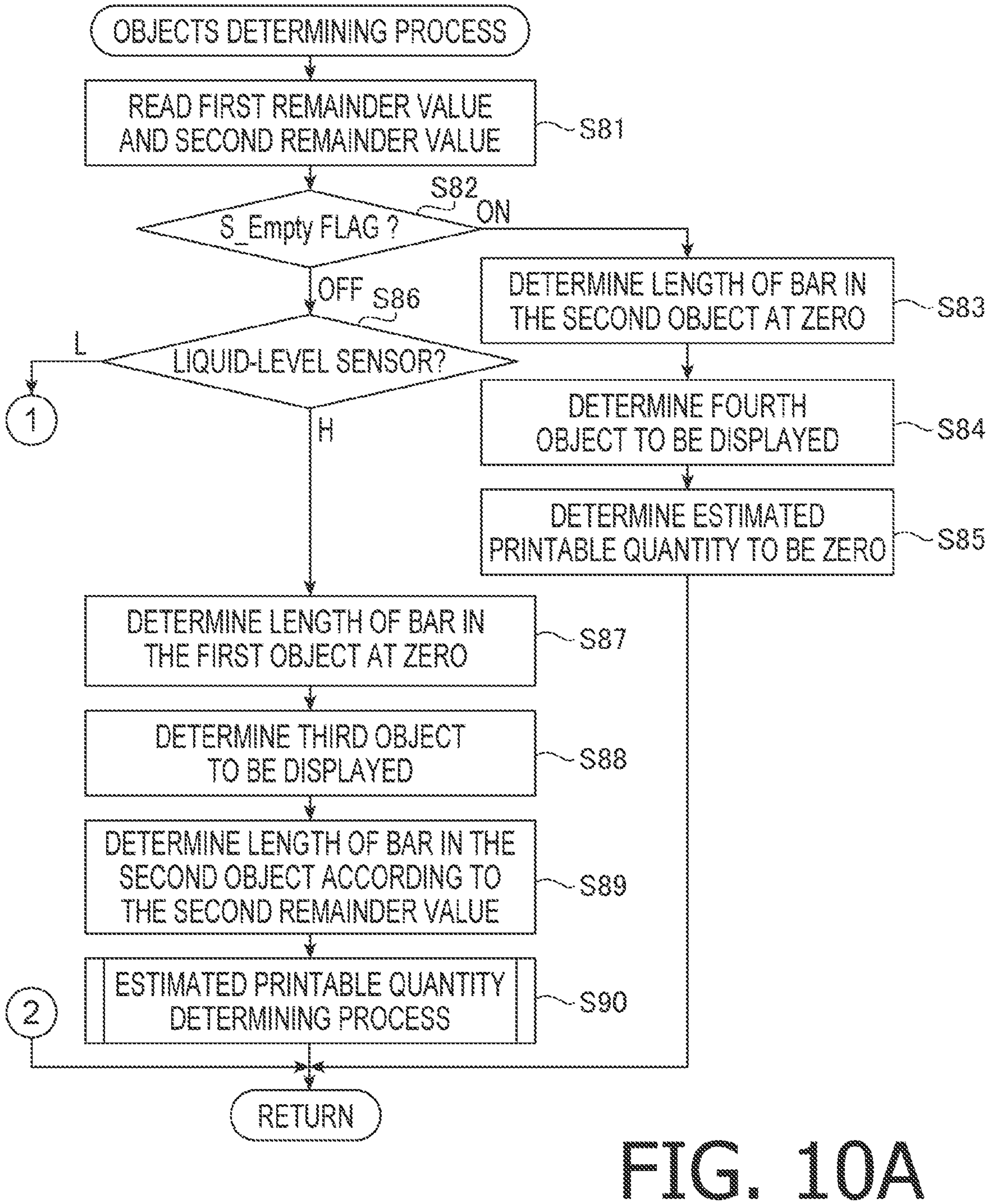
Figure 10B:
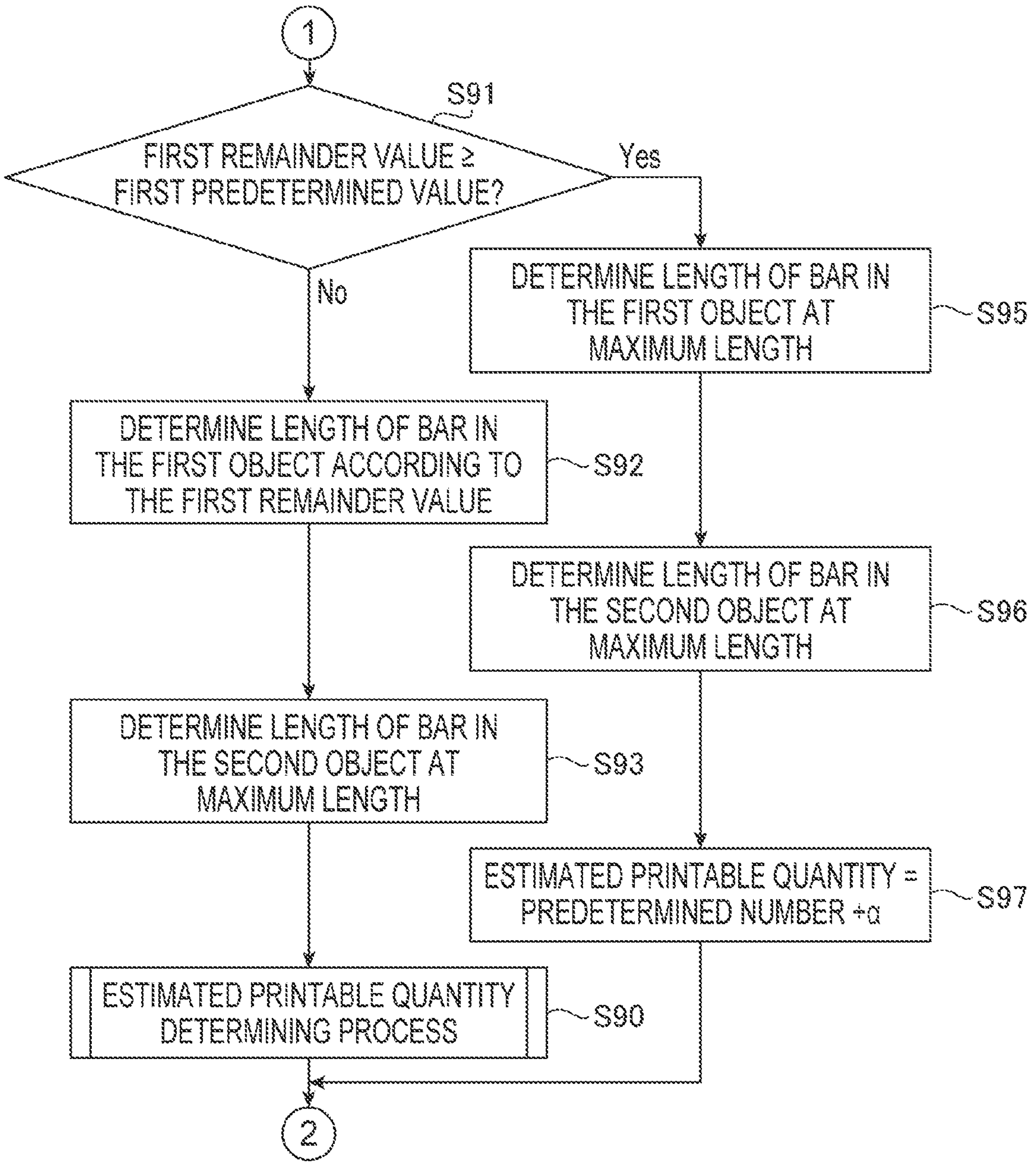

FIGS. 10A-10B are a flowchart to illustrate flows of steps in an objects determining process to be conducted in the printer 10 according to the first embodiment of the present disclosure.

FIGS. 11A-11D are illustrative views of liquid levels in the cartridge 200 for the printer 10 according to the first embodiment of the present disclosure.

Figure 12:
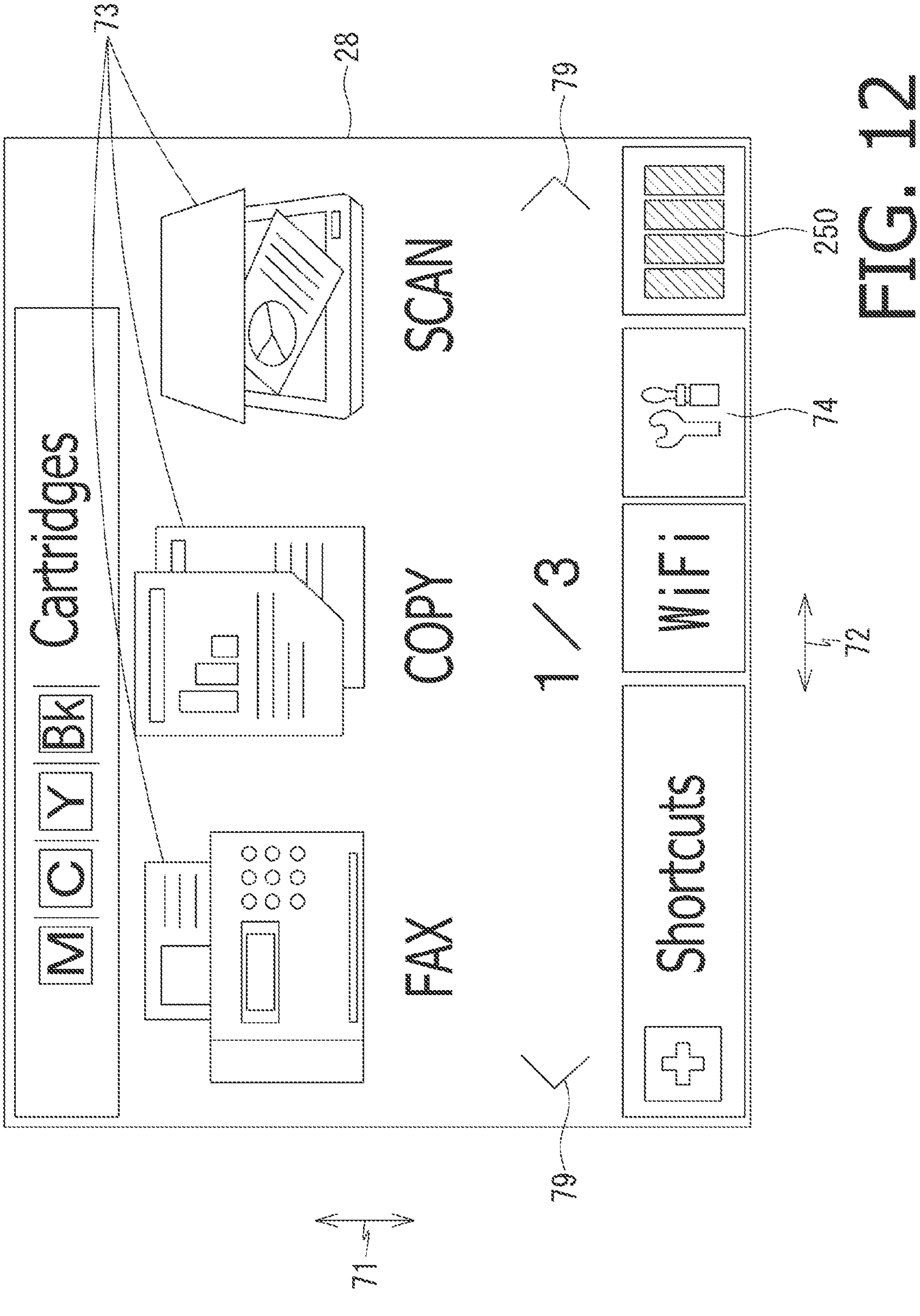

FIG. 12 is an illustrative view of a standby screen to be displayed in a display 28 in the printer 10 according to the first embodiment of the present disclosure.

Figure 13A:
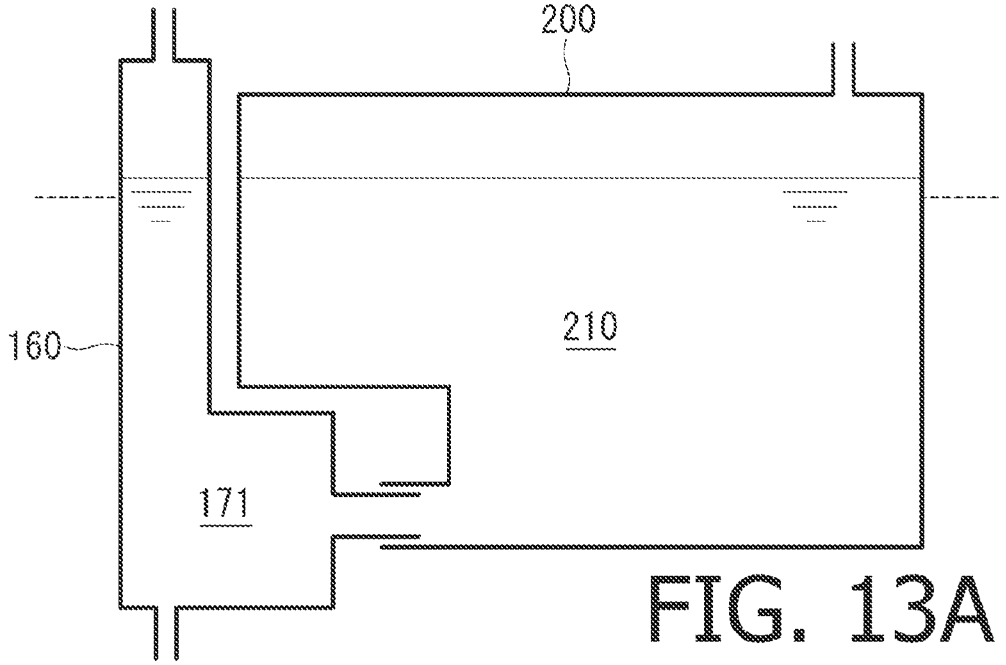
Figure 13B:
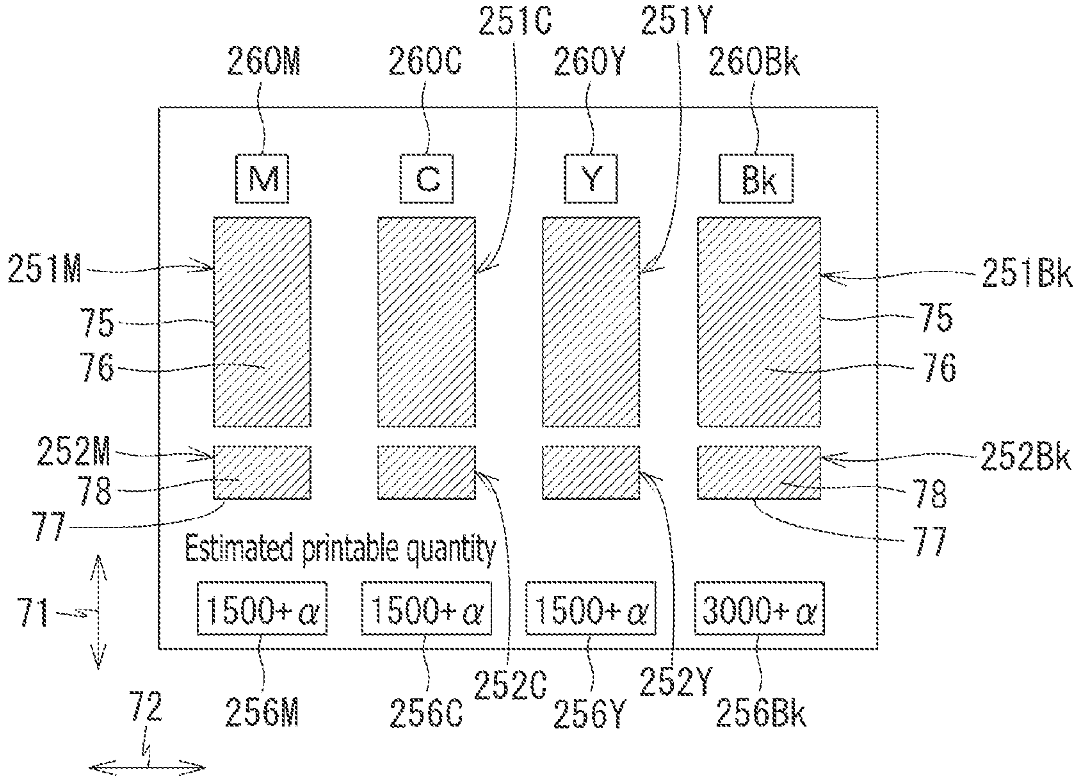

FIG. 13A illustrates a liquid level of black ink Bk in the cartridge 200 for the printer 10 according to the first embodiment of the present disclosure. FIG. 13B is an illustrative view of an ink remainder indication screen, corresponding to the liquid level of the black ink Bk as shown in FIG. 13A, to be displayed in the display 28 in the printer 10 according to the first embodiment of the present disclosure.

Figure 14A:
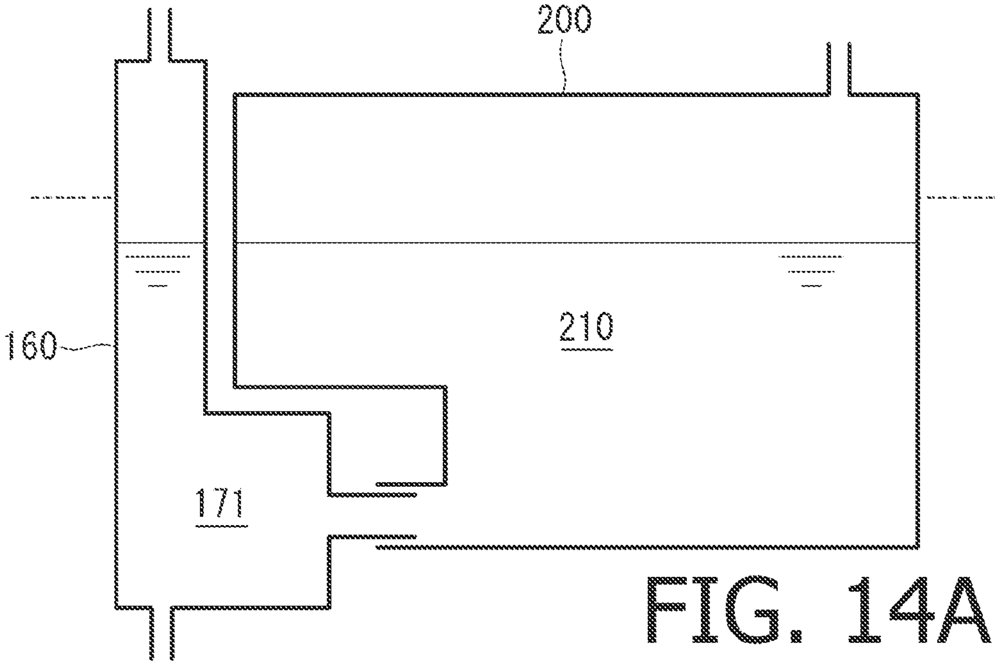
Figure 14B:
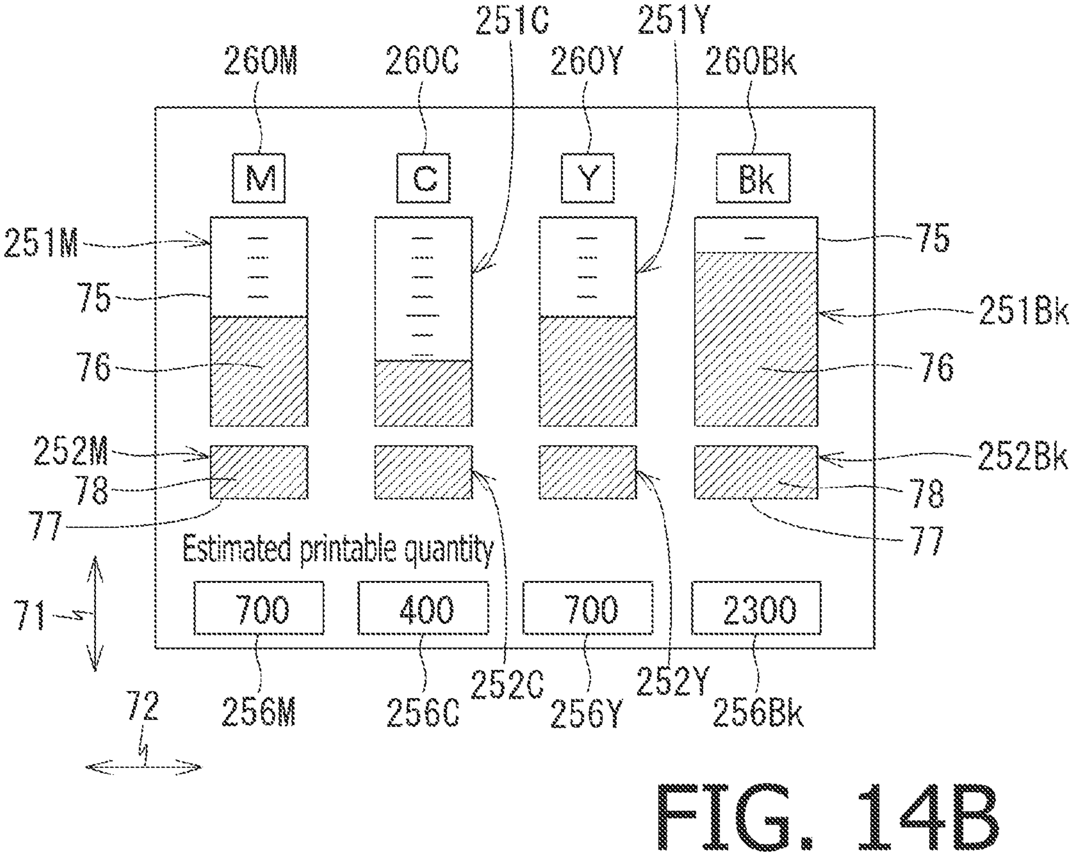

FIG. 14A illustrates another liquid level of the black ink Bk in the cartridge 200 for the printer 10 according to the first embodiment of the present disclosure. FIG. 14B is an illustrative view of the ink remainder indication screen, corresponding to the liquid level of the black ink Bk as shown in FIG. 14A, to be displayed in the display 28 according to the first embodiment of the present disclosure.

Figure 15A:
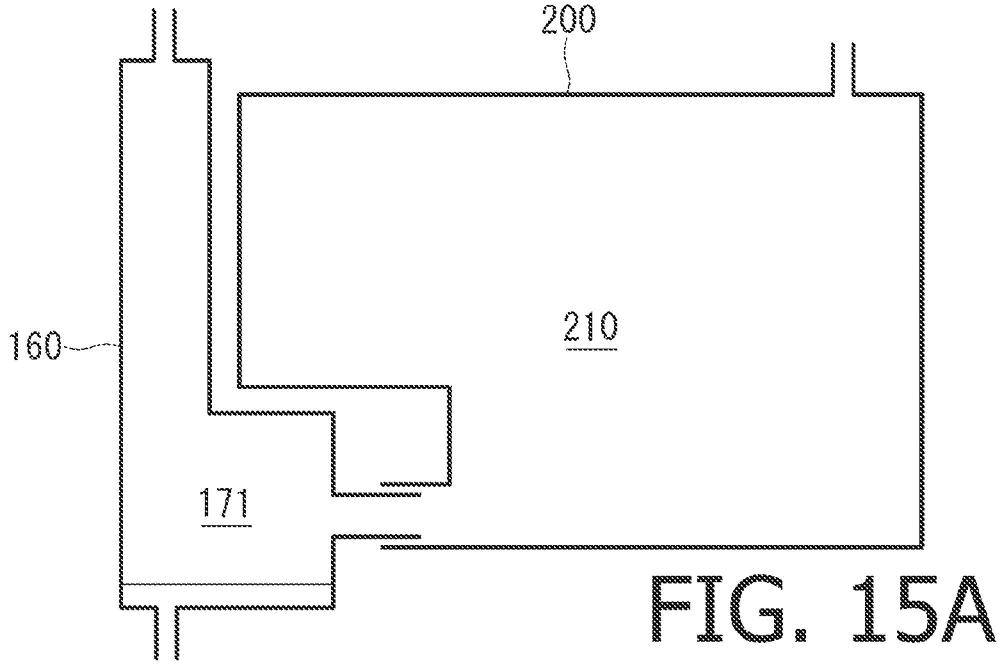
Figure 15B:
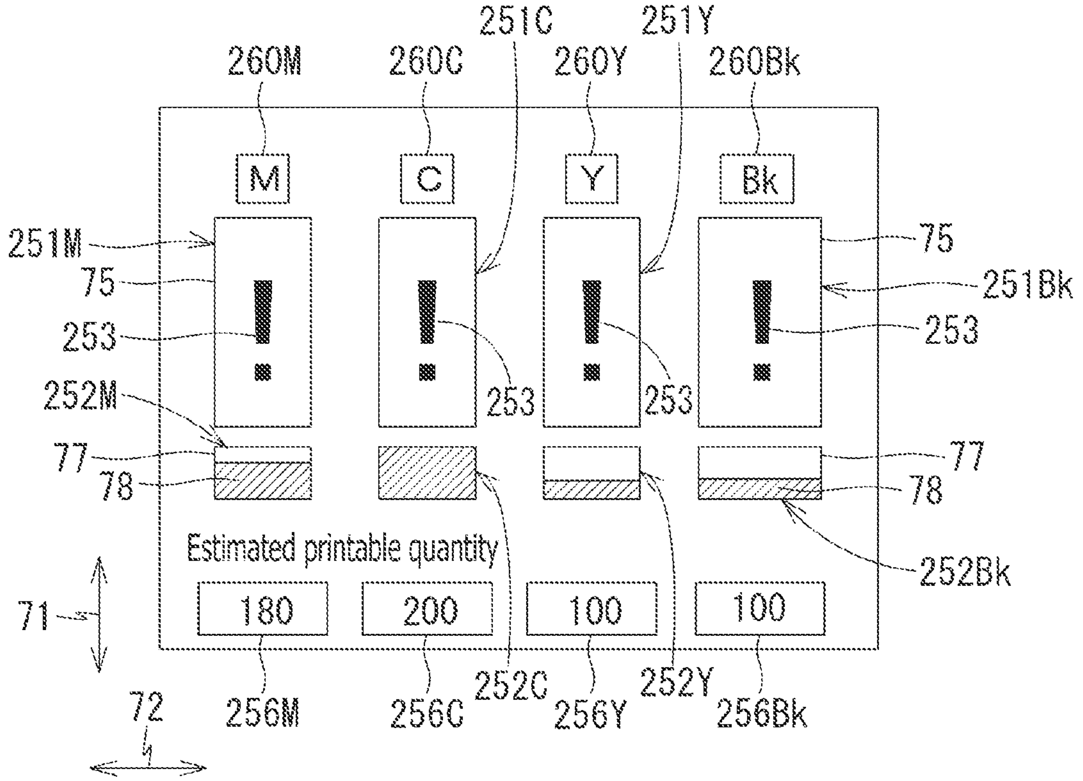

FIG. 15A illustrates another liquid level of the black ink Bk in the cartridge 200 for the printer 10 according to the first embodiment of the present disclosure. FIG. 15B is an illustrative view of the ink remainder indication screen, corresponding to the liquid level of the black ink Bk as shown in FIG. 15A, to be displayed in the display 28 according to the first embodiment of the present disclosure.

Figure 16A:
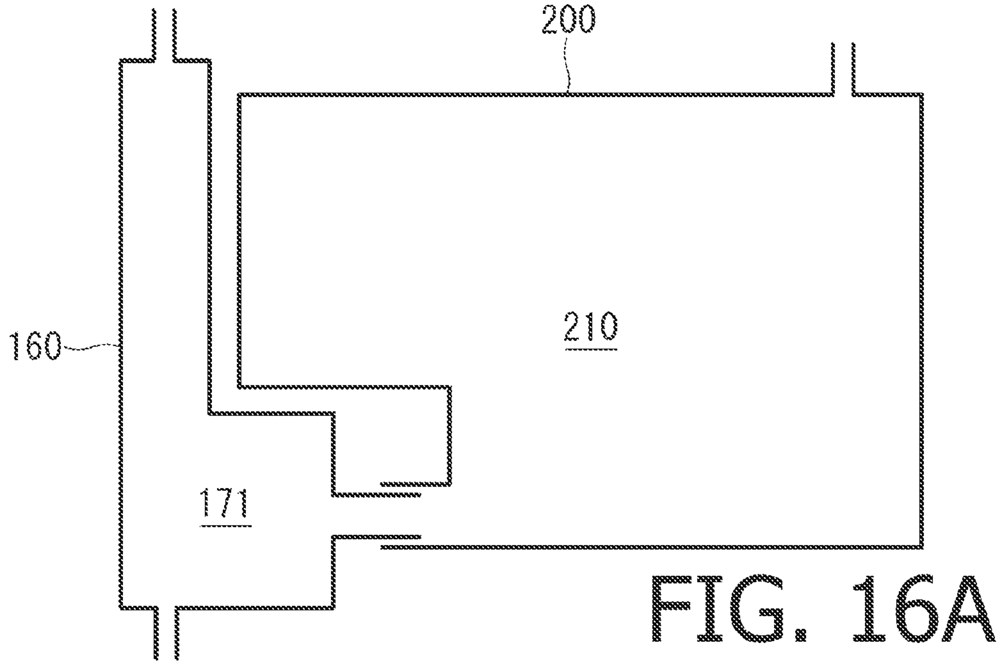
Figure 16B:
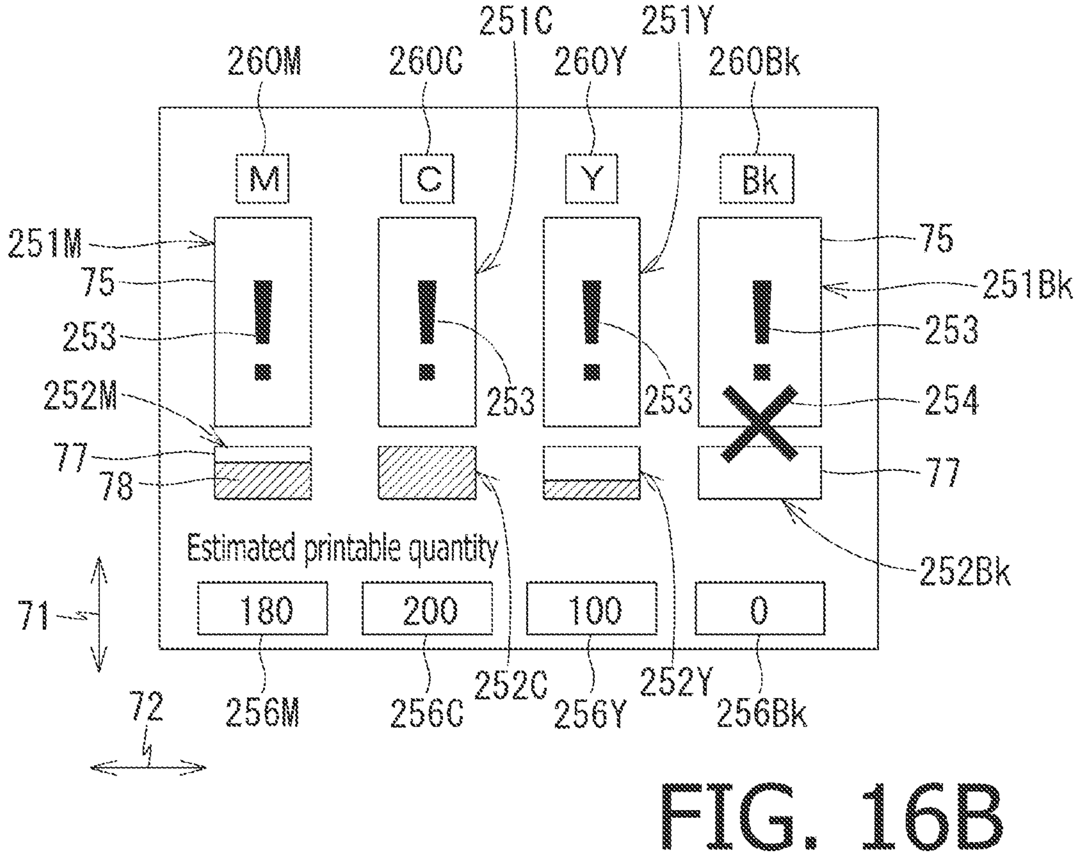

FIG. 16A illustrates another liquid level of the black ink Bk in the cartridge 200 for the printer 10 according to the first embodiment of the present disclosure. FIG. 16B is an illustrative view of the ink remainder indication screen, corresponding to the liquid level of the black ink Bk as shown in FIG. 16A, to be displayed in the display 28 according to the first embodiment of the present disclosure.

Figure 17A:
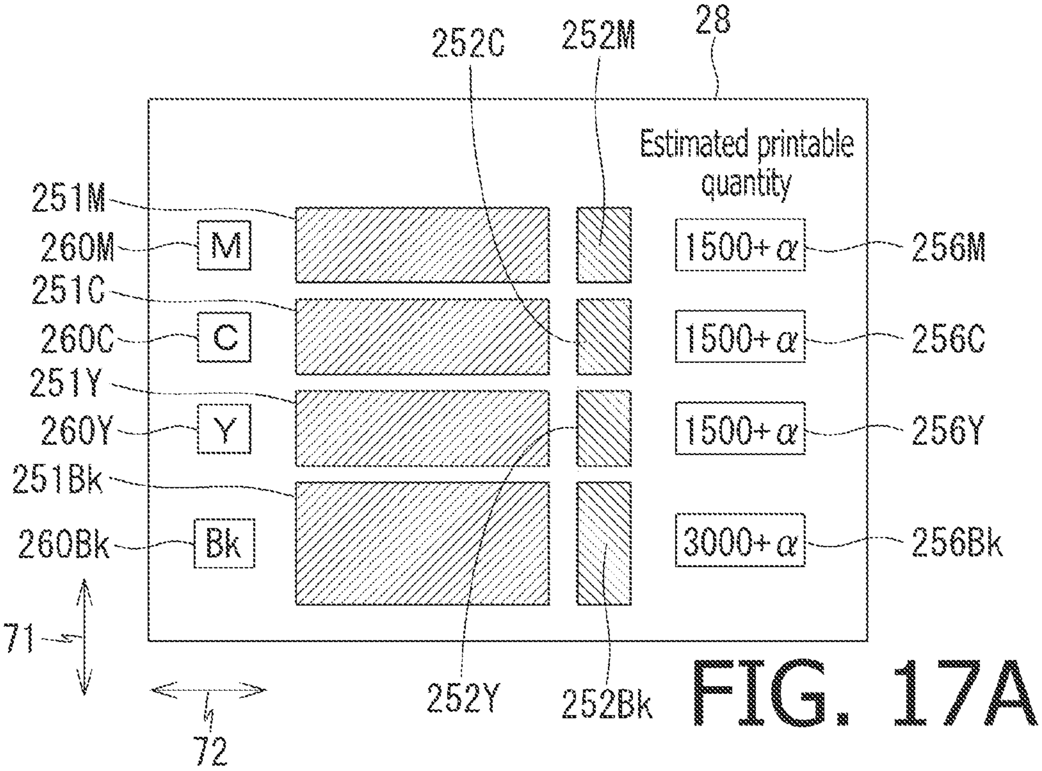
Figure 17B:
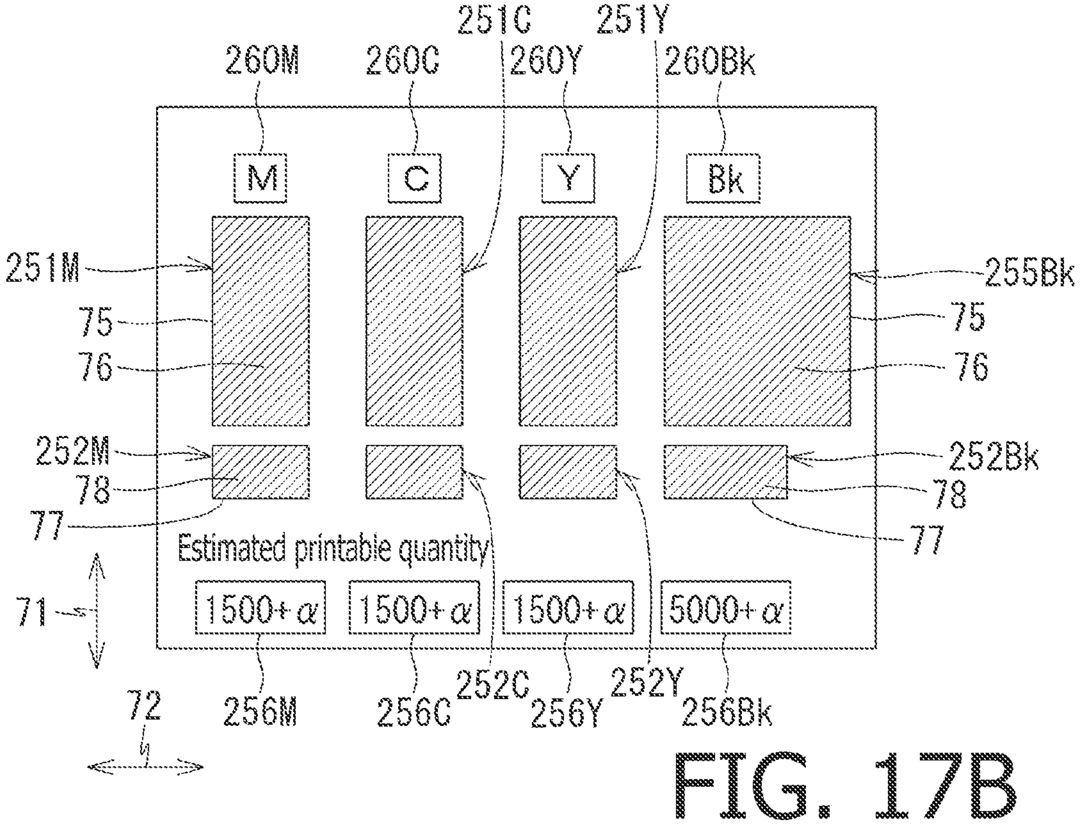

FIG. 17A is an illustrative view of an ink remainder indication screen in a first modified example according to the first embodiment of the present disclosure. FIG. 17B is an illustrative view of an ink remainder indication screen in a second modified example according to the first embodiment of the present disclosure.

Figure 18A:
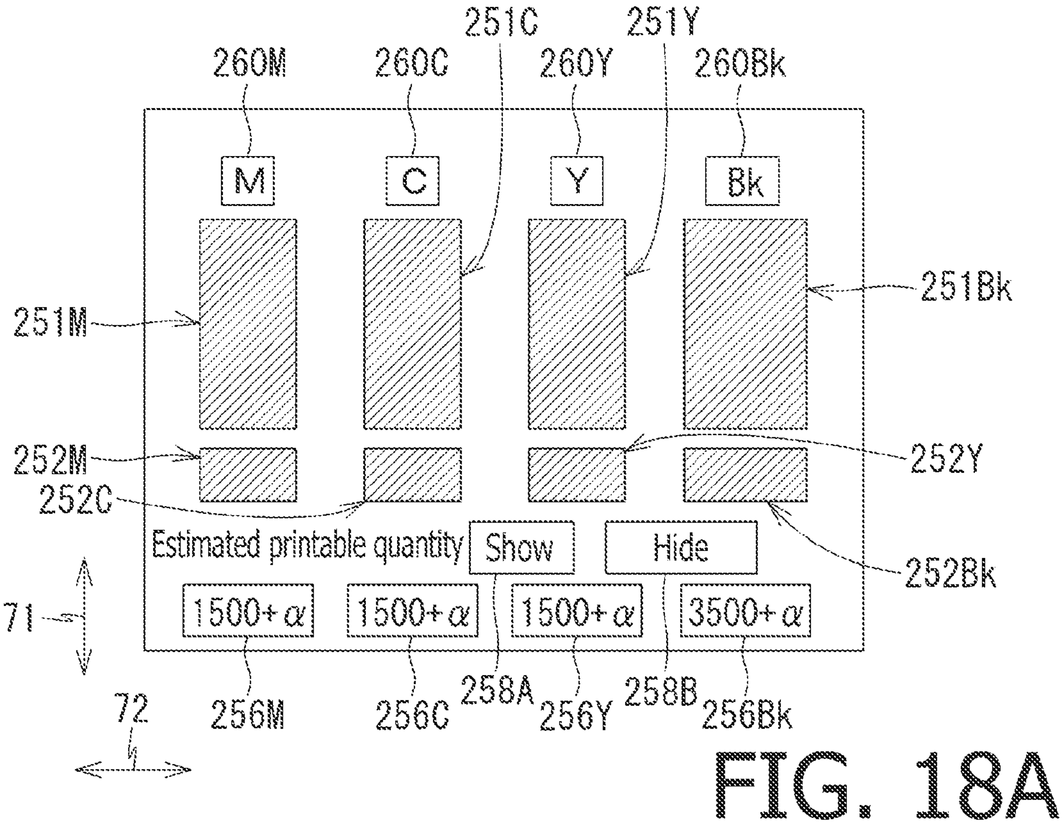
Figure 18B:
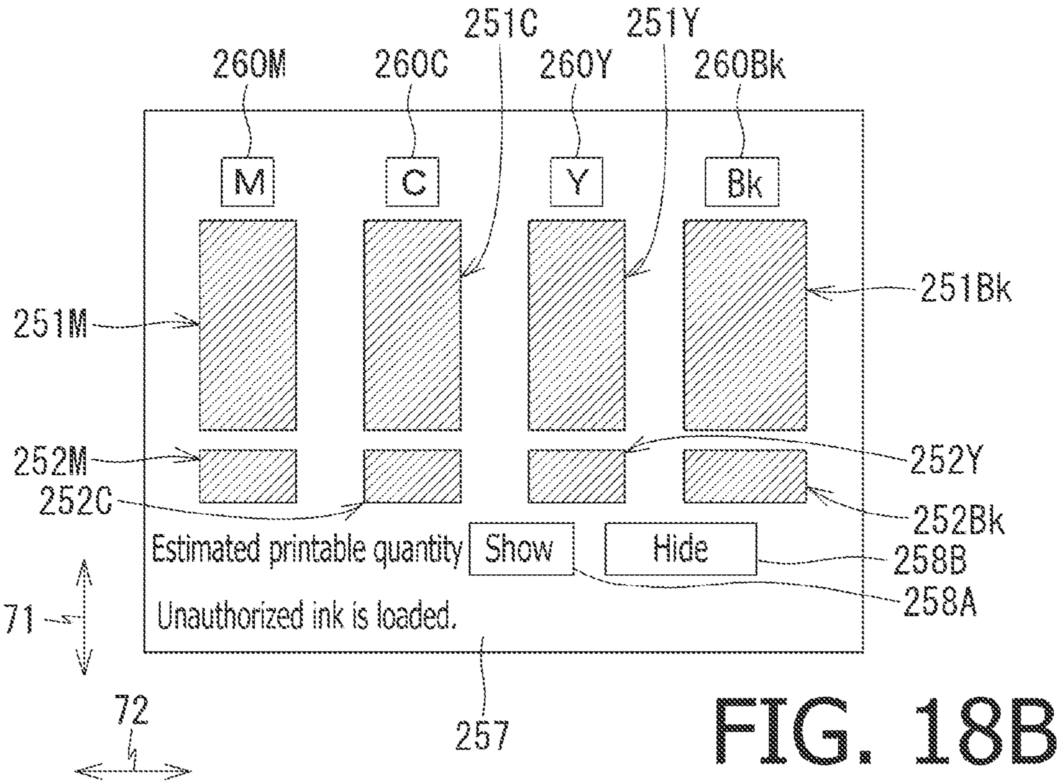

FIG. 18A is an illustrative view of an ink remainder indication screen in a third modified example according to the first embodiment of the present disclosure. FIG. 18B is an illustrative view of the ink remainder indication screen in the third modified example, without displaying an estimated printable quantity, according to the first embodiment of the present disclosure.

Figure 19:
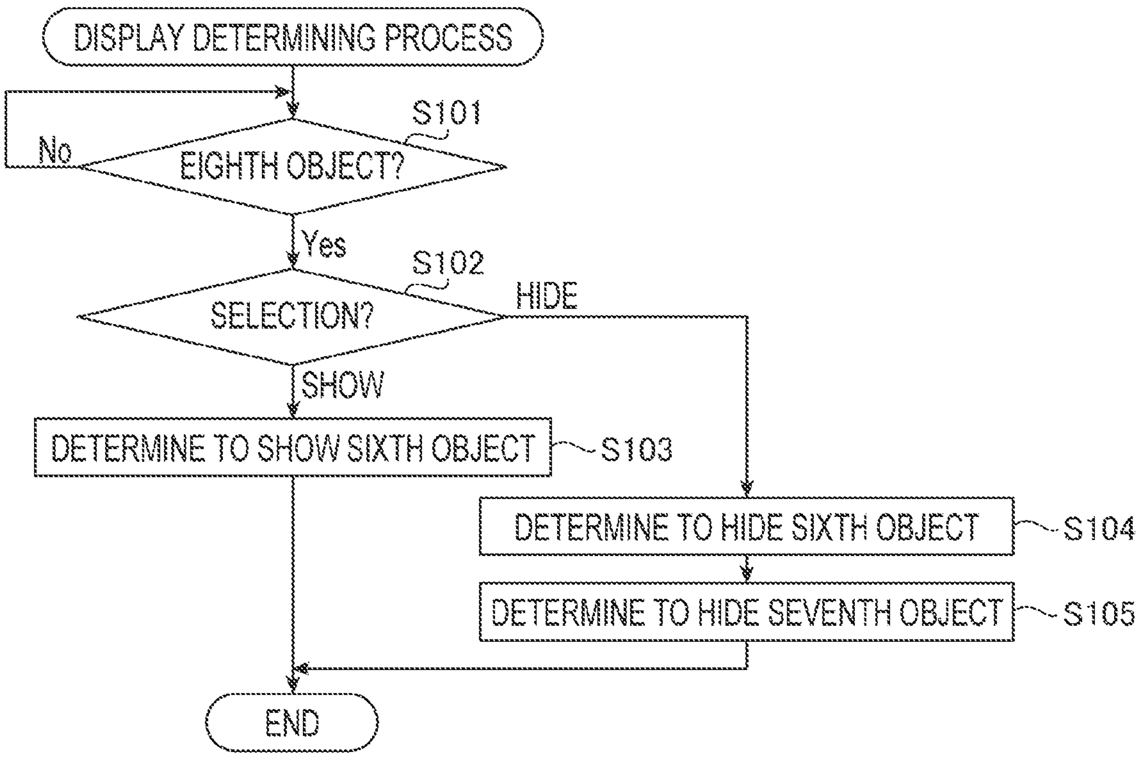

FIG. 19 is a flowchart to illustrate a flow of steps in a display determining process to be conducted in the third modified example according to the first embodiment of the present disclosure.

Figure 20A:
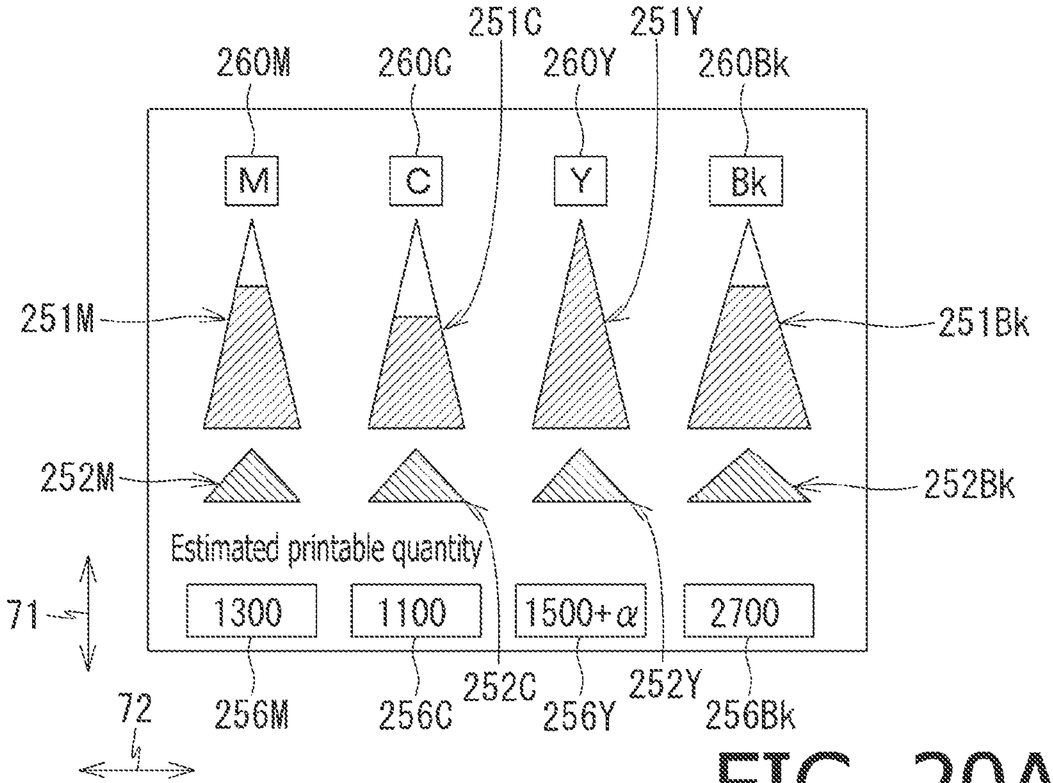
Figure 20B:
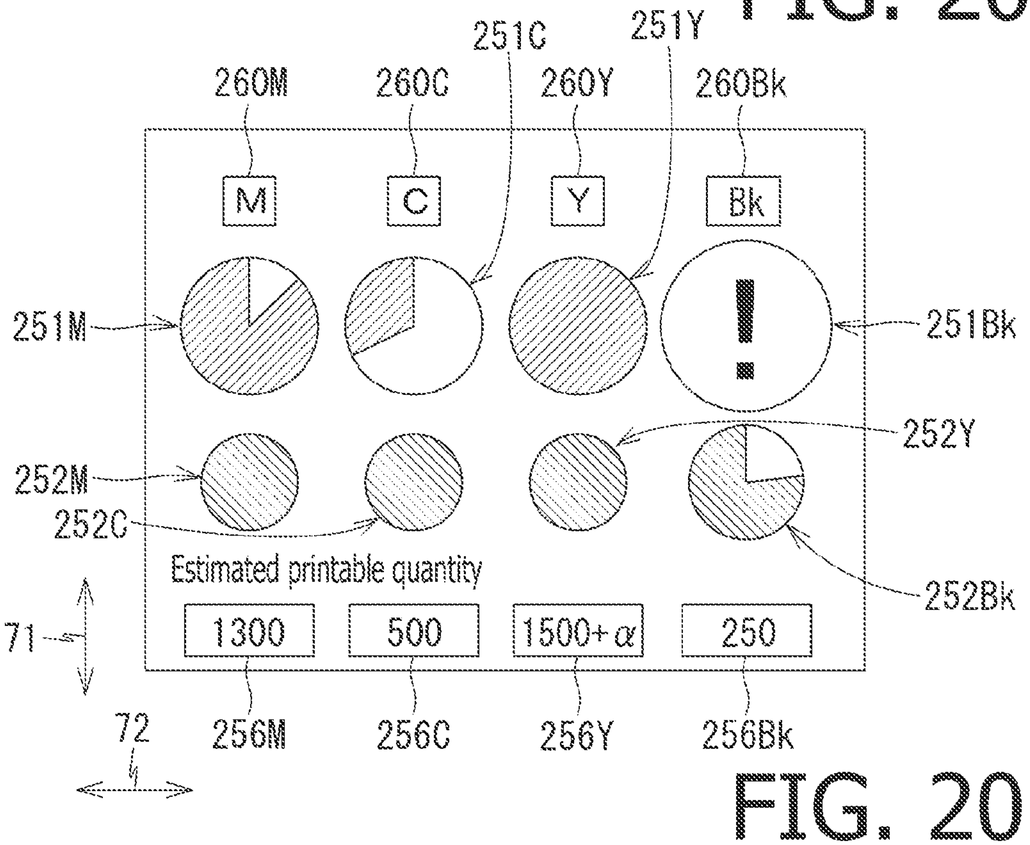

FIG. 20A is an illustrative view of an ink remainder indication screen in a fourth modified example according to the first embodiment of the present disclosure. FIG. 20B is another illustrative view of the ink remainder indication screen in the fourth modified example according to the first embodiment of the present disclosure.

Figure 21A:
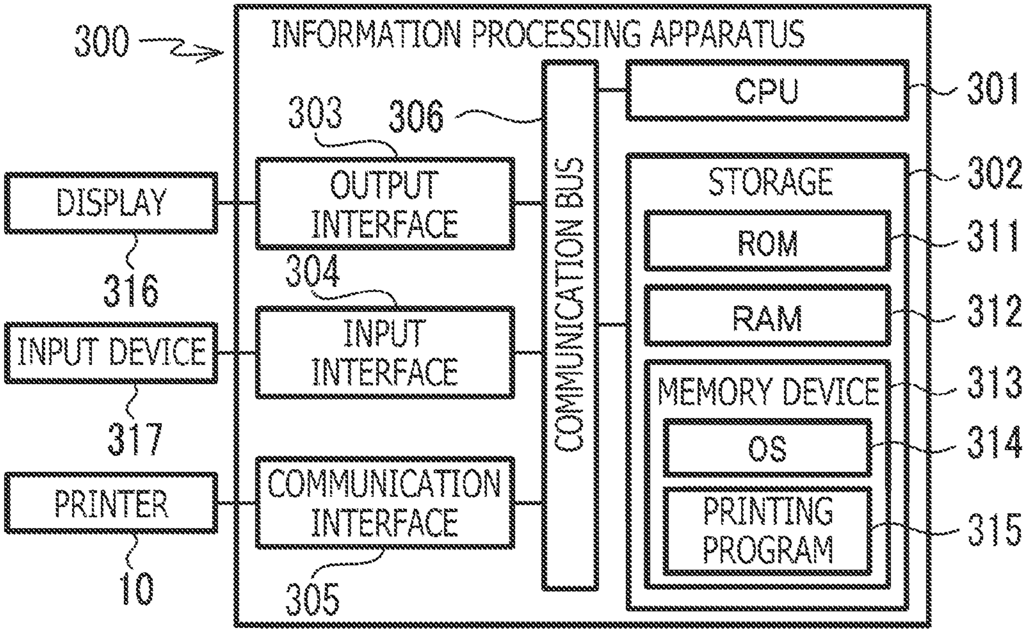
Figure 21B:
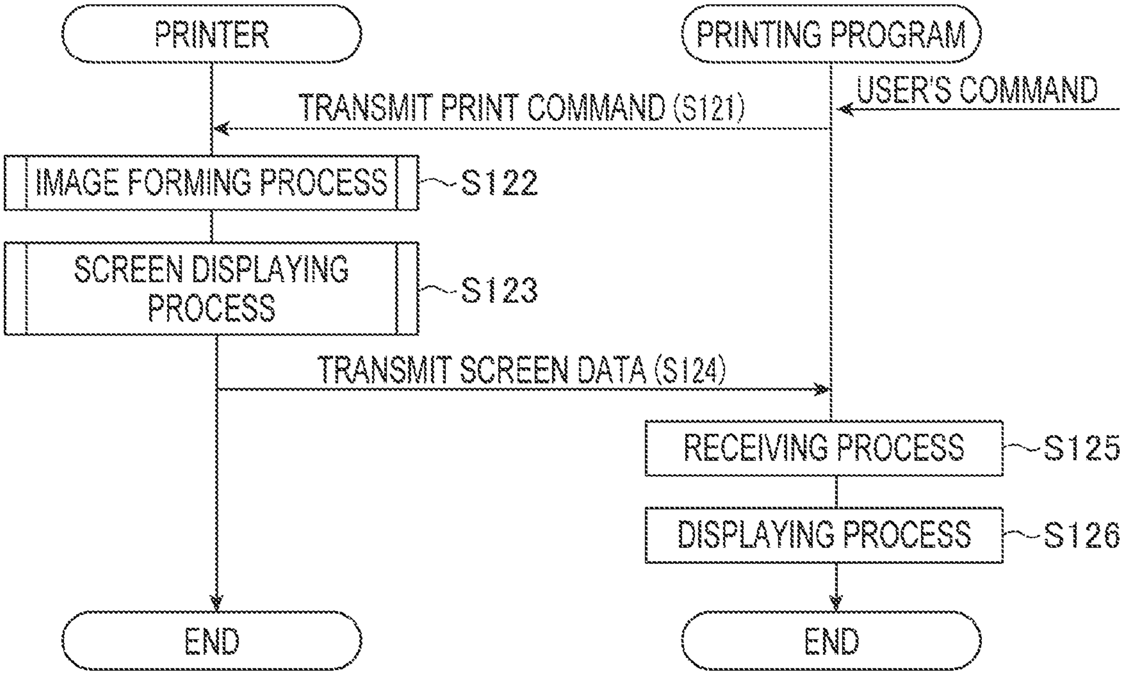

FIG. 21A is a block diagram to illustrate a configuration in an information processing apparatus 300 according to a second embodiment of the present disclosure. FIG. 21B is a flowchart to illustrate flows of steps to be conducted in the printer 10 and the information processing apparatus 30 according to the second embodiment of the present disclosure.

Figure 22:
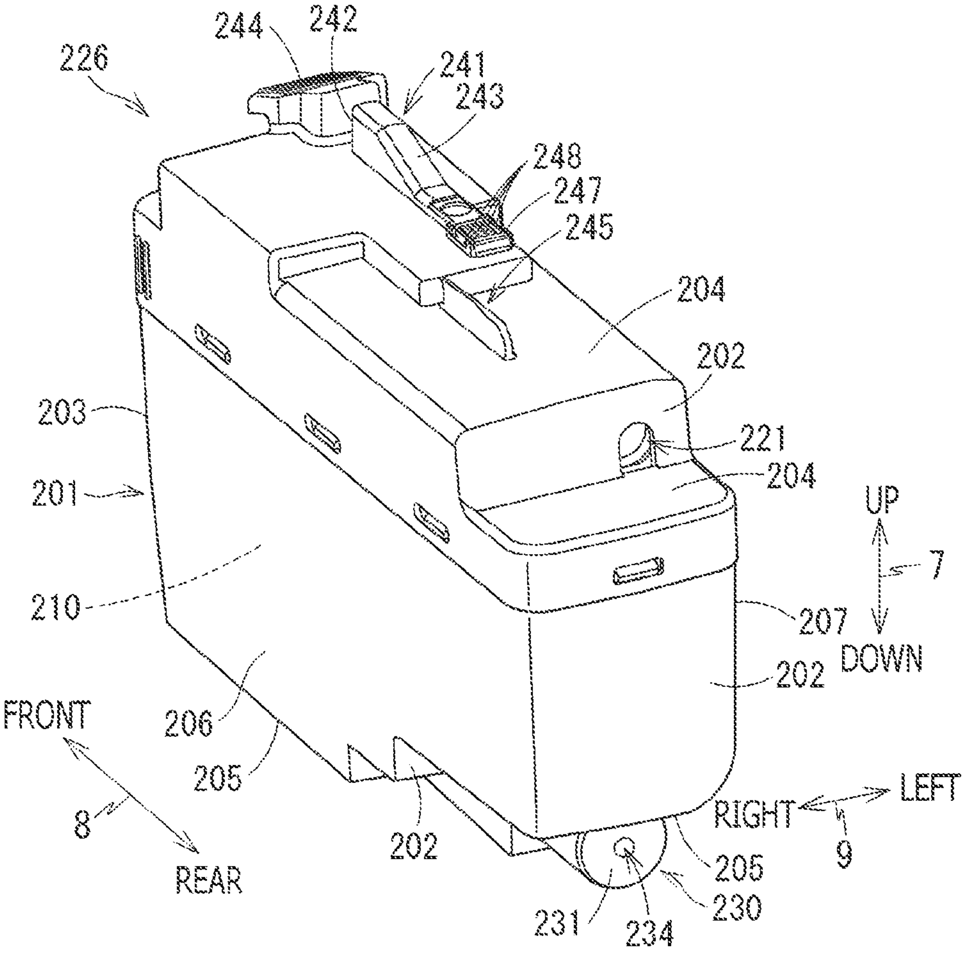

FIG. 22 is a perspective view of a large-capacity cartridge 226 for the printer 10 according to the first embodiment of the present disclosure.

Figure 23A:
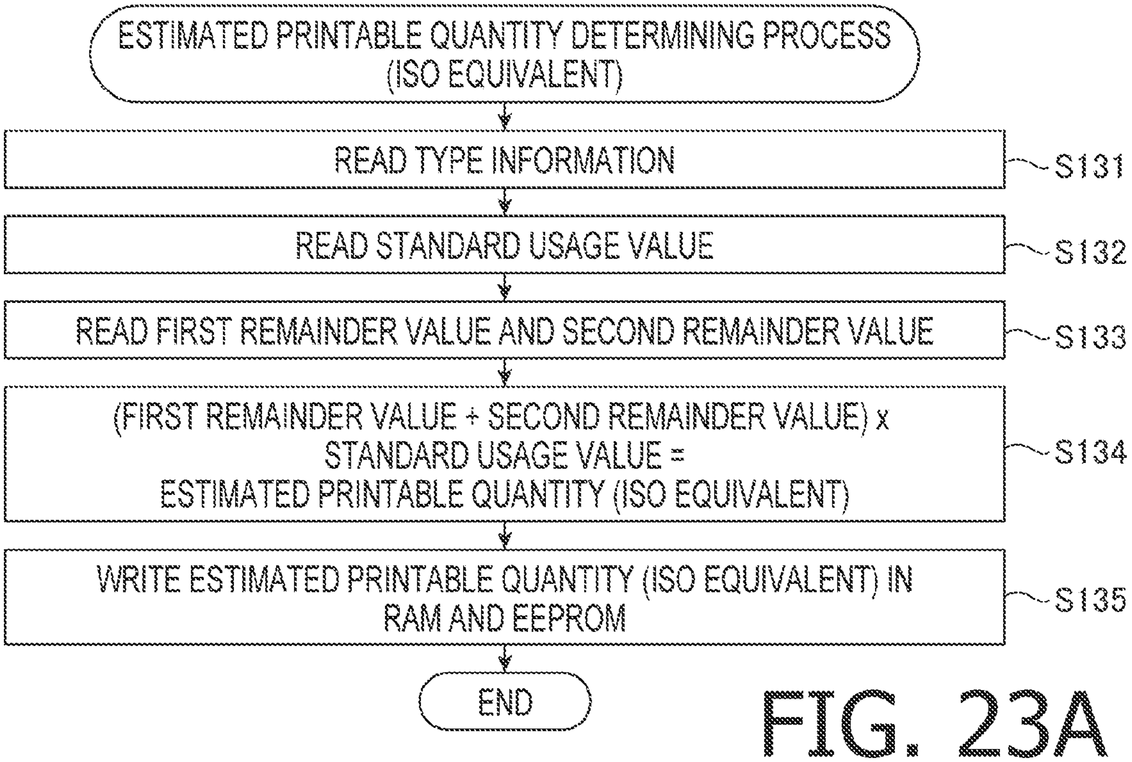
Figure 23B:
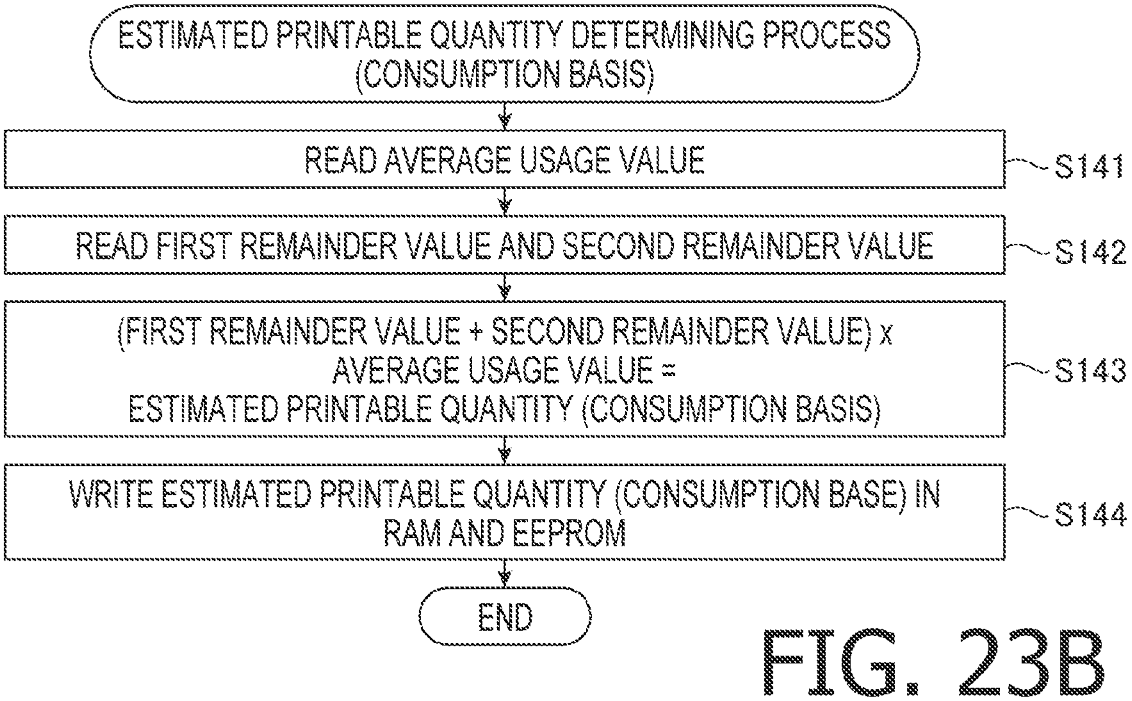

FIG. 23A is a flowchart to illustrate a flow of steps in an estimated printable quantity determining process (ISO equivalent) according to the first embodiment of the present disclosure. FIG. 23B is a flowchart to illustrate a flow of steps in an estimated printable quantity determining process (consumption basis) according to the first embodiment of the present disclosure.

Figure 24:
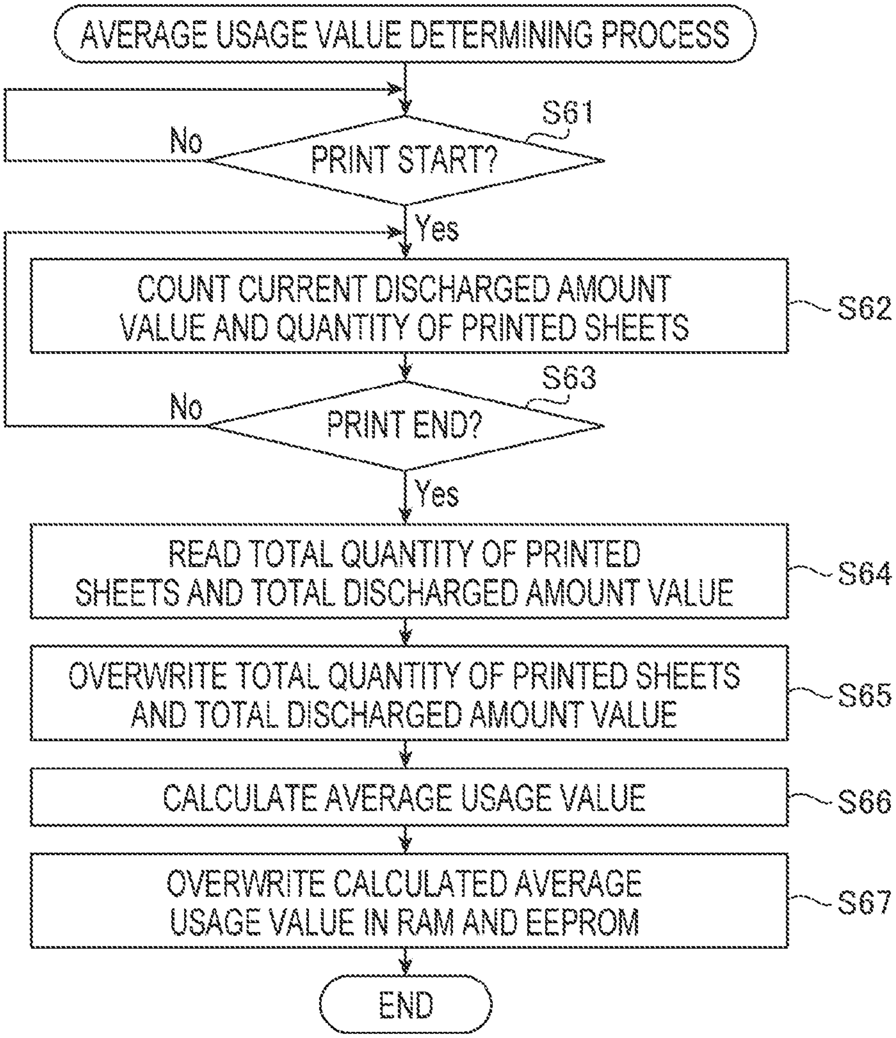

FIG. 24 is a flowchart to illustrate a flow of steps in an average usage determining process according to the first embodiment of the present disclosure.

DETAILED DESCRIPTION

Hereinafter, exemplary embodiments according to the present disclosure will be described in detail with reference to the accompanying drawings. It is noted that various connections may be set forth between elements in the following description. These connections in general and, unless specified otherwise, may be direct or indirect and that this specification is not intended to be limiting in this respect.

In the following description, positional relation within a printer 10 and each part or item included in the printer 10 will be mentioned on basis of a user's position to use the printer 10 placed on a horizontal surface, as indicated by the bi-directionally pointing arrows in some of the drawings. For example, in FIG. 1A, a vertical axis between an upper side and a lower side in the drawing may be defined as a vertical direction 7. While a side, on which an opening 13 is arranged, is defined as a front side to the user, a horizontal axis between the front side and a rear side opposite from the front side may be defined as a front-rear direction 8. Further, a horizontal axis between a right-hand side and a left-hand side to the user when the user faces toward the front side of the printer 10 may be defined as a widthwise direction 9. The vertical direction 7, the front-rear direction 8, and the widthwise direction 9 intersect orthogonally to one another.

First Embodiment

In the following paragraphs, with reference to FIGS. 1A-1B, described will be the printer 10 according to a first embodiment of the present disclosure.

[Overall Configuration of the Printer 10]

The printer 10 may form images on sheets in an inkjet recording technique. The printer 10 has a body 14, which is in an approximate shape of a rectangular box. The printer 10 may not necessarily be a single-functioned printer but may be a multifunction device having other functions such as a facsimile transmission function, a scanning function, and a copying function.

Figure 1A:
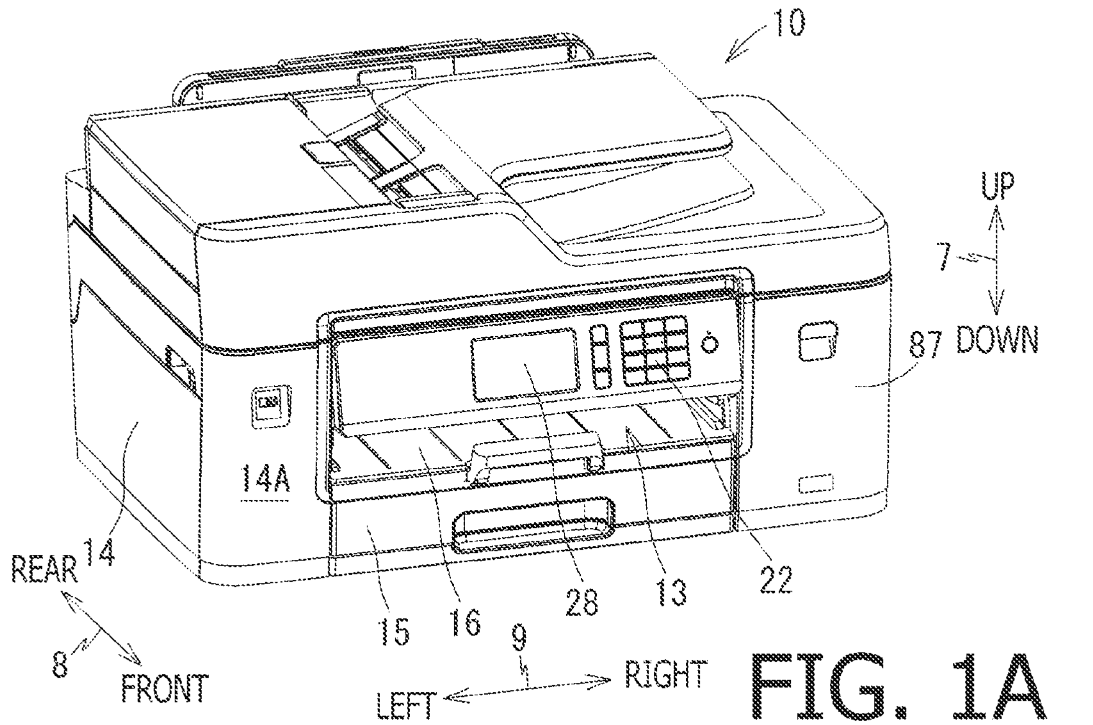
Figure 1B:
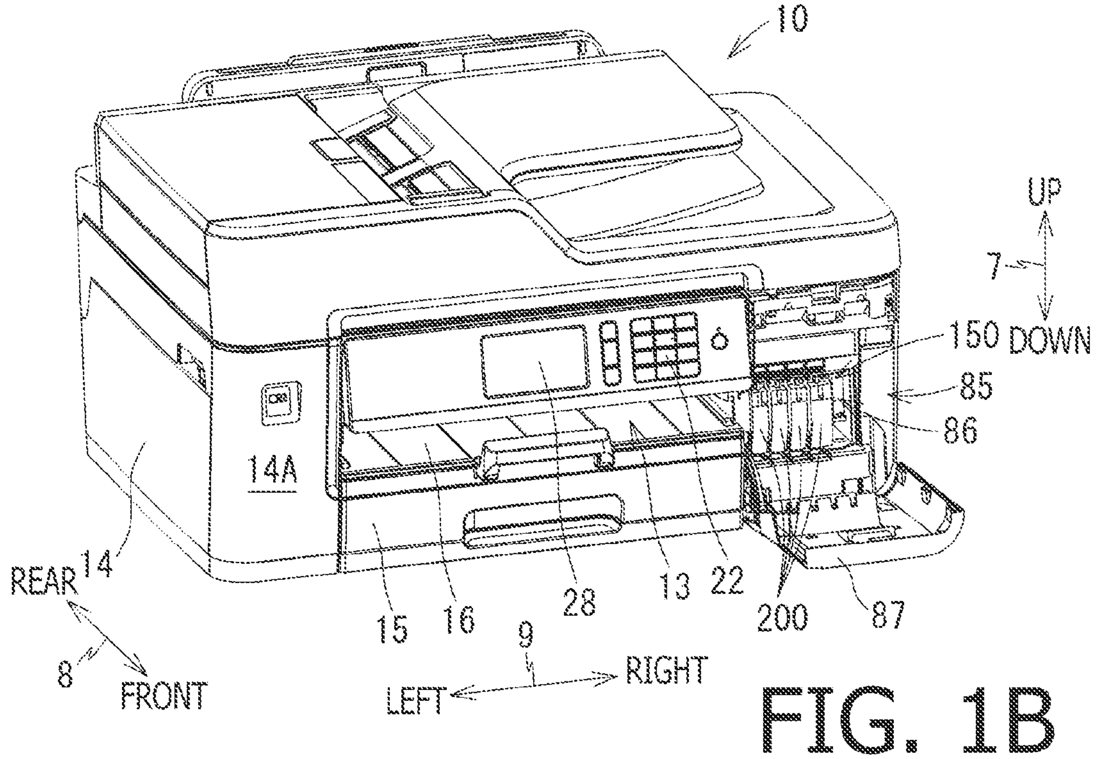
Figure 2:
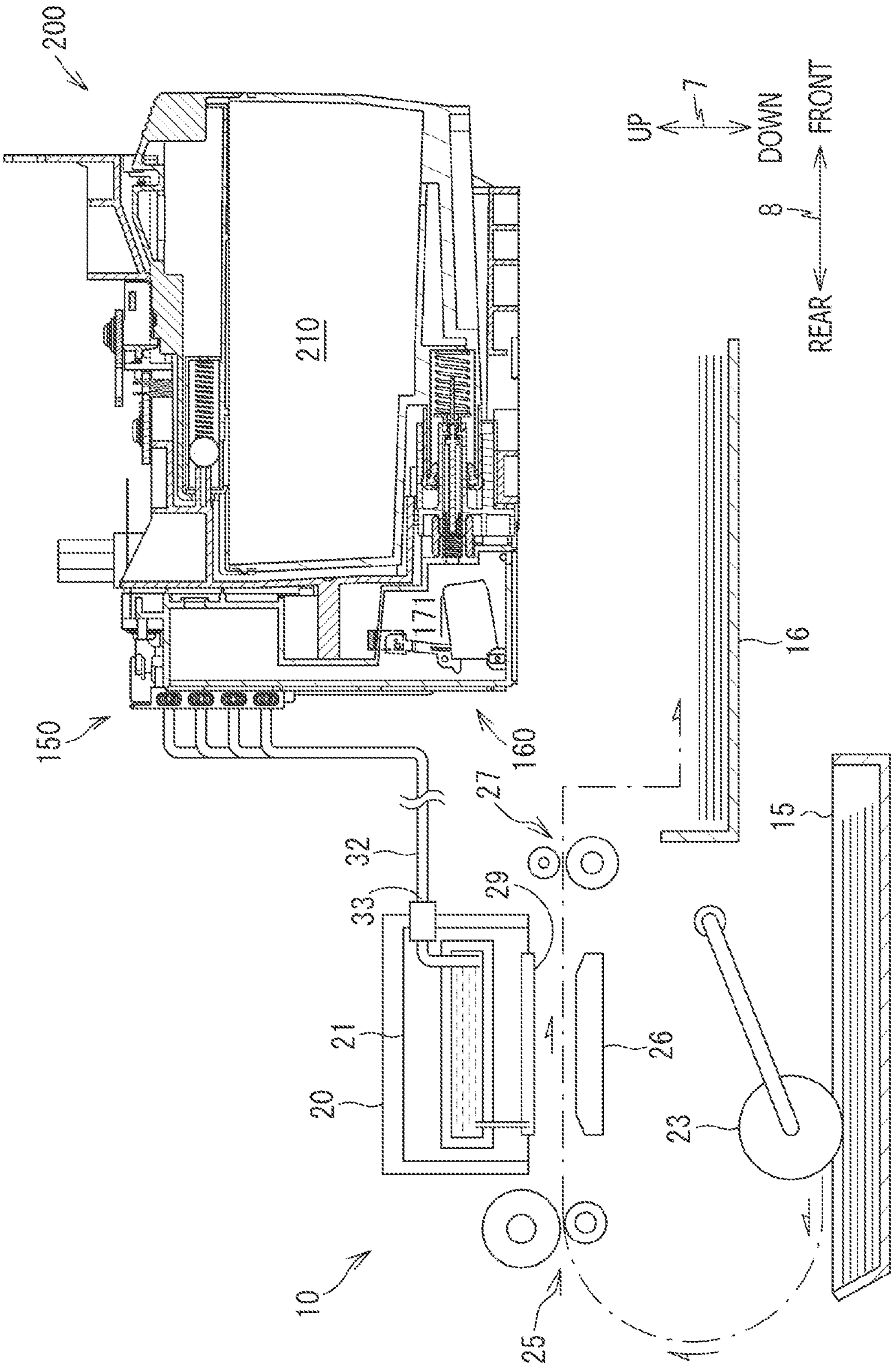
FIG. 2 is an illustrative cross-sectional view of the printer 10 according to the first embodiment of the present disclosure.

In the body 14, as shown in FIGS. 1A-1B and 2, arranged are a feeder tray 15, a feed roller 23, a conveyer roller 25, a head 21 with a plurality of nozzles 29, a platen 26 arranged to face toward the head 21, an ejection roller 27, an ejection tray 16, an attachment case 150, and a tube 32. To the attachment case 150, a cartridge 200 may be detachably attached. The cartridge 200 attached to the attachment case 150 is connected with the head 21 through the tube 32.

The printer 10 may drive the feed roller 23 and the conveyer roller 25 to rotate and convey a sheet loaded in the feeder tray 15 to a position of the platen 26. The printer 10 controls the head 21 to discharge ink, which may be supplied from the cartridge 200 attached to the attachment case 32 through the tube 32, from the nozzles 29. Thus, the ink discharged from the nozzles 26 may land on the sheet and record an image on the sheet. The printer 10 may drive the ejection roller 27 to eject the sheet with the image formed thereon at the ejection tray 16.

The head 21 is mounted on a carriage 20, which reciprocates in a main scanning direction. The main scanning direction extends in a direction of depth in FIG. 2 and intersects with a conveying direction, in which the sheet may be conveyed by the conveyer roller 25. The carriage 20 may be moved in the main scanning direction by a driving force from a motor (not shown). The printer 10 may control the conveyer roller 25 to pause and control the carriage 20 to move in the main scanning direction and the head 21 to discharge the ink from the nozzles 29. Thereby, a row of image may be recorded in a linear path on the sheet that faces with the head 21 while the head 21 moves in the main scanning direction. The linear path faces with the head 21 while the head 21 moves in the main scanning direction. The printer 10 may further control the conveyer roller 25 to convey the sheet for a predetermined amount so that a next linear path in the sheet may face with the head 21 and another row of image may be recorded in the next linear path. Operations of recording a row of image and conveying the sheet for a next linear path may be repeated alternately for a plurality of times to form an image on the sheet.

[Cover 87]

As shown in FIGS. 1A-1B, on a front face 14A of the body 14, at a rightward area, formed is an opening 85. The body 14 has a cover 87. The cover 87 is pivotable between a covering position, in which the opening 85 is closed (see FIG. 1A), and an exposing position, in which the opening 85 is exposed (see FIG. 1B). The cover 87 may be pivotably supported by, for example, a lower edge of the body 14, to pivot about a pivot axis, which extends in the widthwise direction 9. Inside the body 14, in an attachment cavity 86, which continues from the opening 85 in the front-rear direction, arranged is the attachment case 150.

[Cover Sensor 88]

The printer 10 has a cover sensor 88 (see FIG. 6). The cover sensor 88 may be a mechanical sensor, such as a switch that may be in contact with or separated from the cover 87, or an optical sensor, which may detect light transmitted or blocked by the cover 87, depending on positions of the cover 87. The cover sensor 88 may output signals, which vary depending on the positions of the cover 87, to a controller 130. In particular, the cover sensor 88 may output a lower-leveled signal to the controller 130 in response to the cover 87 being at the covering position 87 and a higher-leveled signal, which is more intense than the lower-leveled signal, to the controller 130 in response to the cover 87 being at a position other than the covering position 87. In other words, the cover sensor 88 may output the higher-leveled signal to the controller 130 in response to the cover 87 being at the exposing position.

[Attachment Case 150]

Figure 3:
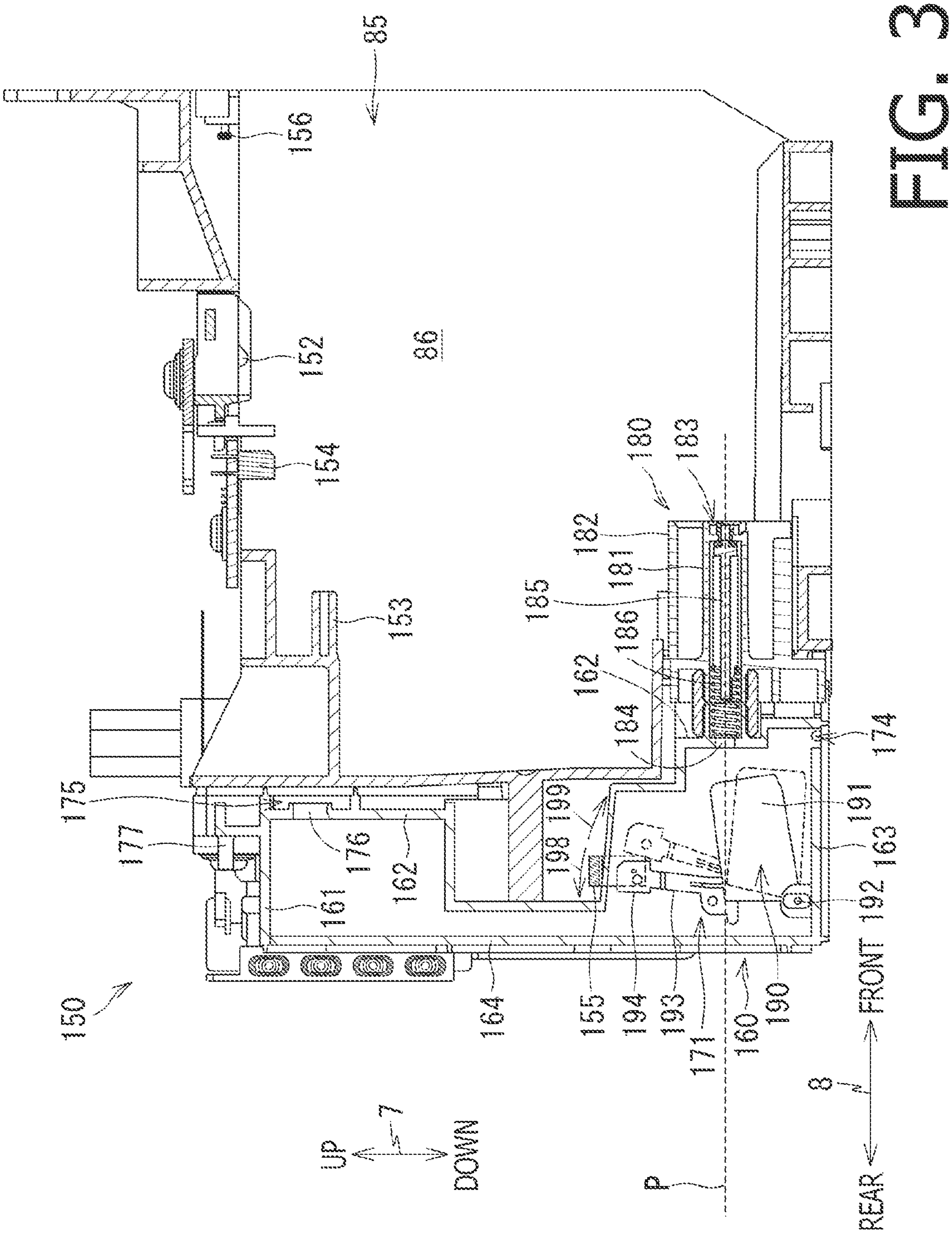
FIG. 3 is a cross-sectional view of an attachment case 150 in the printer 10 according to the first embodiment of the present disclosure.

The attachment case 150 as shown in FIG. 3 includes a contact 152, a rod 153, an attachment sensor 154, a liquid-level sensor 155, and a locking pin 156. The attachment case 150 may accommodate a plurality of, e.g., four (4), cartridges 200 each containing ink in a different color, which may be, for example, black, cyan, magenta, and yellow. In this regard, the attachment case 150 has a set of the contact 152, the rod 153, the attachment sensor 154, and the liquid-level sensor 155, for each of the four cartridges 200. In the following paragraphs, the terms “the contact 152,” “the rod 153,” “the attachment sensor 154,” and “the liquid-level sensor 155” may mean four (4) contacts 152, four (4) rods 153, four (4) attachment sensors 154, and four (4) liquid-level sensors 155, for the cartridges 200 for black, cyan, magenta, and yellow, respectively. Meanwhile, a quantity of the cartridges 200 to be mounted in the attachment case 150 may not necessarily be limited to four but may be less than four, e.g., one, or more than four. In the following paragraphs, among the four identical items, e.g., the contacts 152, the rods 153, the attachment sensors 154, and the liquid-level sensors 155, solely one of them may be described as a representative.

The attachment case 150 has a shape of a box having an inner cavity to accommodate the cartridges 200. The inner cavity in the attachment case 150 is limited by a ceiling, a bottom, a rear wall, and a pair of side walls, which define an upper end, a lower end, a rear end in the front-rear direction 8, and widthwise ends in the widthwise direction 9, respectively. A frontward part of the attachment case 150 across from the rear wall in the front-rear direction 8 forms the opening 85 in the body 14. When the cover 87 is at the exposing position, the inner cavity in the attachment case 150 may be exposed outward through the opening 85.

The cartridges 200 may be attached to and removed from the attachment case 150 through the opening 85 in the body 14. In particular, each cartridge 200 may be pushed rearward through the opening 85 to be attached to the attachment case 150 and may be pulled frontward through the opening 85 to be removed from the attachment case 150.

[Contacts 152]

The contacts 152 are arranged on the ceiling of the attachment case 150 and protrude downward in the inner cavity from the ceiling. Each contact 152 is located at a position, where the contact 152 may contact electrodes 248 (see FIG. 4A) on the cartridge 200, which will be described further below, when the cartridge 200 is attached to the attachment case 150. The contact 152 is electrically conductive and resiliently deformable in the vertical direction 7. The contact 152 is electrically connected with the controller 130.

[Rods 153]

The rods 153 (see FIG. 3) protrude frontward from the rear wall of the attachment case 150. Each rod 153 is located at a position higher than a joint 180, which will be described further below, on the rear wall of the attachment case 150. The rod 153 may enter an air valve compartment 214 (see FIG. 4B) in the cartridge 200 through an air communication hole 221 (see FIGS. 4A-4B), which will be described further below, while the cartridge 200 is in transition to be attached to the attachment case 150. The rod 153 in the air valve compartment 214 allows the air valve compartment to be in fluid communication with the atmosphere.

[Attachment Sensors 154]

The attachment sensors 154 (see FIG. 3) are arranged on the ceiling of the attachment case 150. Each attachment sensor 154 may detect a condition of a corresponding one of the cartridges 200, i.e., whether the cartridge 200 is attached to the attachment case 150 or not. The attachment sensor 154 may include a light emitter and a light receiver, which are not shown but may be spaced apart from each other in the widthwise direction 9. When the cartridge 200 is attached to the attachment case 150, a light-blocking rib 245 (see FIGS. 4A-4B) on the cartridge 200 is located between the light emitter and the light receiver in the attachment sensor 154. In other words, the light emitter and the light receiver in the attachment sensor 154 are arranged to face each other across the light-blocking rib 245 on the cartridge 200 when the cartridge 200 is attached to the attachment case 150.

The attachment sensor 154 outputs different signals depending on light-receiving conditions of the light receiver, i.e., whether or not the light receiver receives the light emitted in the widthwise direction 9 from the light emitter. The signals output from the light receiver indicating the light-receiving condition of the light receiver in the attachment sensor 154 will be called as an attachment signal. The attachment sensor 154 may output a lower-leveled signal to the controller 130 in response to, for example, an intensity of the light received in the light receiver being less than a threshold intensity. On the other hand, the attachment sensor 154 may output a higher-leveled signal to the controller 130 in response to the intensity of the light received in the light receiver being greater than or equal to the threshold intensity.

[Liquid-Level Sensors 155]

Each of the liquid-level sensors 155 may detect a position of a detectable part 194 (see FIG. 5) in an actuator 190, which will be described further below. In particular, the liquid-level sensor 155 may detect whether or not the detectable part 194 is at a detectable position. The liquid-level sensor 155 includes a light emitter and a light receiver, which are not shown but may be spaced apart from each other in the widthwise direction 9. In other words, the light emitter and the light receiver in the liquid-level sensor 155 are arranged to face each other across the detectable part 194 when the detectable part 194 is at the detectable position. The liquid-level sensor 155 may output different signals depending on light-receiving conditions of the light receiver, i.e., whether or not the light receiver receives the light emitted from the light emitter. The signals output from the light receiver indicating the light-receiving condition of the light receiver in the liquid-level sensor 155 will be called as a liquid-level signal.

[Locking Pins 156]

The locking pin 156 is located at an upper end in the inner cavity of the attachment case 150 in proximity to the opening 85 and has a shape of a rod longitudinally extending in the widthwise direction 9. The locking pin 156 is fixed to the sideward walls of the attachment case 150 at widthwise ends thereof. The locking pin 156 extends in the widthwise direction 9 crossing through the inner cavity that may accommodate the four cartridges 200. The locking ping 56 may hold the cartridges 200 attached to the attachment case 150 at the position shown in FIG. 5. The cartridges 200 attached to the attachment case 150 may engage with the locking pin 156.

[Tanks 160]

The printer 10 has four (4) tanks 160 for the four (4) cartridges 200. In particular, the printer 10 has four (4) reservoir sets of tanks 160 and cartridges 200: a tank 160 to store the magenta ink and a cartridge 200 to store the magenta ink, a tank 160 to store the cyan ink and a cartridge 200 to store the cyan ink, a tank 160 to store the yellow ink and a cartridge 200 to store the yellow ink, and a tank 160 to store the black ink and a cartridge 200 to store the black ink.

The tanks 160 are located at positions rearward with respect to the rear wall of the attachment case 150. Each tank 160 has, as shown in FIG. 3, an upper wall 161, a front wall 162, a lower wall 163, a rear wall 164, and a pair of sidewalls which are not shown. The front wall 162 may include a plurality of walls that are in different positions from one another in the front-rear direction 8. Inside the tank 160, formed is a liquid compartment 171.

Among the walls that form the tank 160, at least a part that faces the liquid-level sensor 155 is translucent. Therefore, the light emitted from the liquid-level sensor 155 may be transmitted through the wall that faces the liquid-level sensor 155. The rear wall 164 may include, at least partly, a sheet of film fused to edges of the upper wall 161, the lower wall 163, and the sidewalls. Meanwhile, the sidewalls of the tank 160 may be unified with the attachment case 150 or may be independent from the attachment case 150. The tanks 160 adjoining along the widthwise direction 9 are divided by bulkheads, which are not shown. The tanks 160 may be in similar or identical configuration to one another.

The liquid compartment 171 is continuous with an ink channel, which is not shown, through a liquid outlet 174. A lower end of the liquid outlet 174 is defined by the lower wall 163, which defines the lower end of the liquid compartment 171. The liquid outlet 174 is located to be lower than the joint 180, and in particular, a lower end of a through hole 184. The ink channel continuous with the liquid outlet 174 is continued to the tube 32. Therefore, the liquid compartment 171 is continuous with the head 21 through the liquid outlet 174, the ink channel, and the tube 32. In other words, the ink stored in the liquid compartment 171 may be supplied to the head 21 through the liquid outlet 174, the ink channel, and the tube 32. The ink channel and the tube 32, which are continuous with the liquid outlet 174, are continued to the liquid compartment 171 at one end, i.e., the liquid outlet 174, and to the head 21 at the other end 33 (see FIG. 2).

The liquid compartment 171 is in fluid communication with the atmosphere through the air communication compartment 175. In particular, the air communication compartment 175 is continuous with the liquid compartment 171 though a through hole 176, which is formed through the front wall 162 of the tank 160. Moreover, the air communication compartment 175 is continuous with the atmosphere outside the printer 10 through an air communication port 177 and a tube, which is now shown but is connected with the air communication port 177. In other words, the air communication compartment 175 is in fluid communication with the liquid compartment 171 at one end, i.e., at the through hole 176, and to the atmosphere outside the printer 10 at the other end, i.e., at the air communication port 177. Meanwhile, the air communication compartment 175 is continuous with the atmosphere through the air communication port 177 and the tube which is not shown.

[Joints 180]

The joint 180 includes, as shown in FIG. 3, a needle 181 and a guide 182. The needle 181 is tubular and has an inner cavity serving as a fluid channel therein. The needle 181 protrudes frontward from the front wall 162, which defines the front end of the liquid compartment 171. The needle 181 is formed to have an opening 183 at a protruded end thereof. The fluid channel inside the needle 181 is continuous with the liquid compartment 171 through the through hole 184 formed in the front wall 162. The needle 181 is in fluid communication with the atmosphere outside the tank 160 at one end, i.e., through the opening 183, and with the liquid compartment 171 at the other end, i.e., through the through hole 184. The guide 182 is in a cylindrical shape arranged around the needle 181. The guide 182 protrudes frontward from the front wall 162 and is open frontward at the protruded end thereof.

In the inner cavity inside the needle 181, arranged are a valve 185 and a coil spring 186. The valve 185 is movable in the inner cavity inside the needle 181 between a closed position and an open position along the front-rear direction 8. The valve 185 at the closed position closes the opening 183 and at the open position opens the opening 183. The coil spring 186 urges the valve 185 in a direction to move from the open position toward the closing position, i.e., frontward, in the front-rear direction 8.

[Actuator 190]

In the liquid compartment 171, arranged is an actuator 190. The actuator 190 is pivotably supported by a supporting member, which is not shown but is arranged in the liquid compartment 171, to pivot in directions indicated by counterclockwise and clockwise arrows 198, 199 (see FIG. 3). The actuator 190 may pivot between positions indicated by solid lines and broken lines in FIG. 3. Meanwhile, the actuator 190 is restricted by a stopper, which is not shown, e.g., an inner wall in the liquid compartment 171, from pivoting in the direction indicated by the counterclockwise arrow 198. The actuator 190 includes a float 191, a shaft 192, an arm 193, and the detectable part 194.

The float 191 is made of a material, of which specific gravity is smaller than the ink to be stored in the liquid compartment 171. The shaft 192 protrudes in the widthwise direction 9 from a rightward face and a leftward face of the float 191. The shaft 192 is inserted in a hole, which is not shown but is formed in the supporting member for the actuator 190. Thereby, the actuator 190 is pivotably supported by the supporting member to pivot about the shaft 192. The arm 193 extends upward from the float 191. The detectable part 194 is arranged at a protruded end of the arm 193. The detectable part 194 may be a piece of plate spreading in the vertical direction 7 and the front-rear direction 8. The detectable part 194 is either made of a material or in a color that blocks the light emitted from the light emitter of the liquid-level sensor 155.

When a level of the ink in the liquid compartment 171 is higher than or equal to a threshold position P, the actuator 190, pivoted in the direction of the counterclockwise arrow 198 by its buoyancy, is held by the stopper at a detectable position indicated by the solid lines in FIG. 3. On the other hand, when the level of the ink in the liquid compartment 171 descends to be lower than the threshold position P, the actuator 190 pivots in the direction of the clockwise arrow 199. Therefore, the detectable part 194 moves to a position displaced from the detectable position. In other words, the detectable part 194 moves to a position corresponding to an amount of the ink remaining in the liquid compartment 171.

The threshold position P may be at a same height as an axial center of the needle 181 in the vertical direction 7 and at a same height as a center of an ink supplier port 234, which will be described further below. However, the threshold position P is not necessarily limited as long as the threshold position P is higher than the liquid outlet 174. For example, the threshold position P may be at a same height as an upper end or a lower end of the inner cavity in the needle 181 or may be at a same height as an upper end or a lower end of the ink supplier port 234.

When the level of the ink in the liquid compartment 171 is higher than or equal to the threshold position P, the light emitted from the light emitter in the liquid-level sensor 155 is blocked by the detectable part 194. Therefore, the light from the light emitter may not reach the light receiver, and the liquid-level sensor 155 may output a lower-leveled signal to the controller 130. On the other hand, when the level of the ink in the liquid compartment 171 is lower than the threshold position P, the light emitted from the light emitter may reach the light receiver; therefore, the liquid-level sensor 155 may output a higher-leveled signal to the controller 130. In other words, when the signal from the liquid-level sensor 155 is the lower-leveled signal, the level of the ink in the liquid compartment 171 is higher than or equal to the threshold position P. On the other hand, when the signal from the liquid-level sensor 155 is the higher-leveled signal, the level of the ink in the liquid compartment 171 is lower than the threshold position P. Thus, the controller 130 may detect the level of the ink in the liquid compartment 171, whether the level of the ink is higher than or equal to or lower than the threshold position P, based on the signal output from the liquid-level sensor 155.

[Cartridges 200]

Figure 4A:
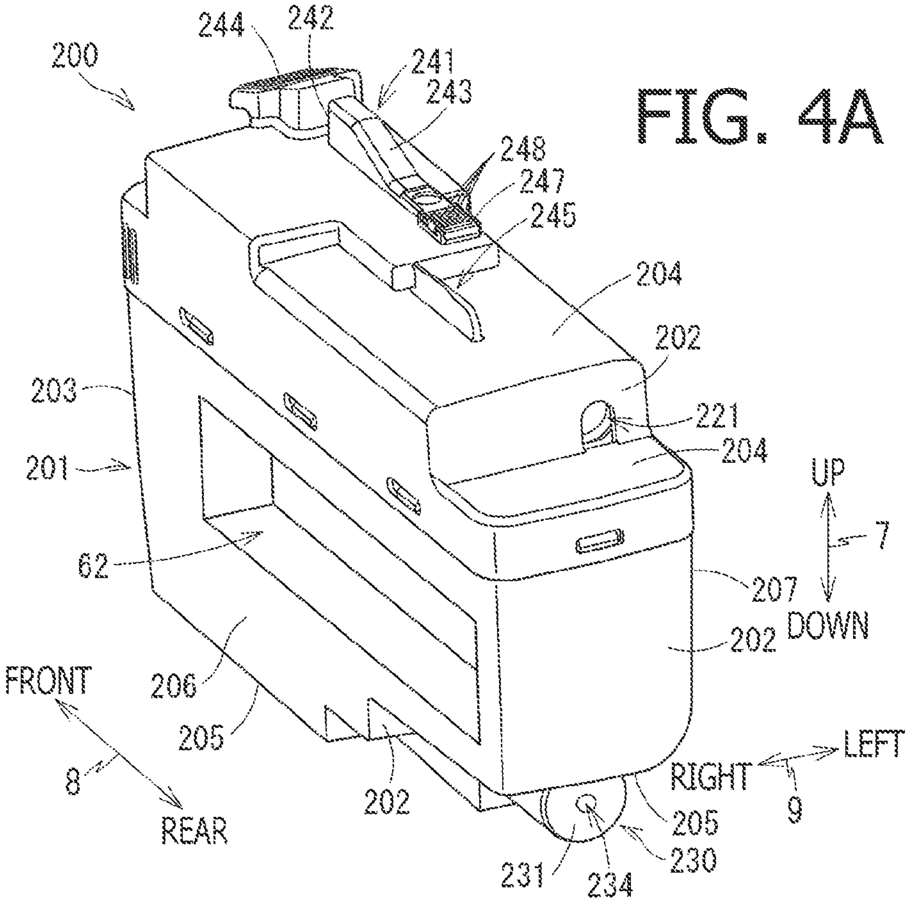
FIGS. 4A and 4B are a perspective view and a cross-sectional view of a cartridge 200 for the printer 10 according to the first embodiment of the present disclosure.

The cartridges 200 are reservoirs, each having the liquid compartment 210 (see FIG. 2) to store a colorant, e.g., the ink. The liquid compartment 210 is defined by walls that may be made of, for example, resin. The cartridge 200 may be in a shape thinner in the widthwise direction 9, and of which dimensions in the vertical direction 7 and the front-rear direction 8 are greater than a dimension in the widthwise direction 9, as shown in FIG. 4A. The cartridges 200 to store inks in different colors may be either in a same shape or in different shapes. At least a part of the walls that form each cartridge 200 is translucent. Therefore, the user may visually recognize the level of the ink stored in the liquid compartment 210 from the outside through the translucent part.

Each cartridge 200 has a body 201 and a supplier tube 230. The body 201 includes a rear wall 202, a front wall 203, an upper wall 204, a lower wall 205, and a pair of sidewalls 206, 207. The rear wall 202 may include a plurality of walls that are in different positions from one another in the front-rear direction 8. The upper wall 204 may include a plurality of walls that are in different positions from one another in the vertical direction 7. The lower wall 205 may include a plurality of walls that are in different positions from one another in the vertical direction 7.

Figure 4B:
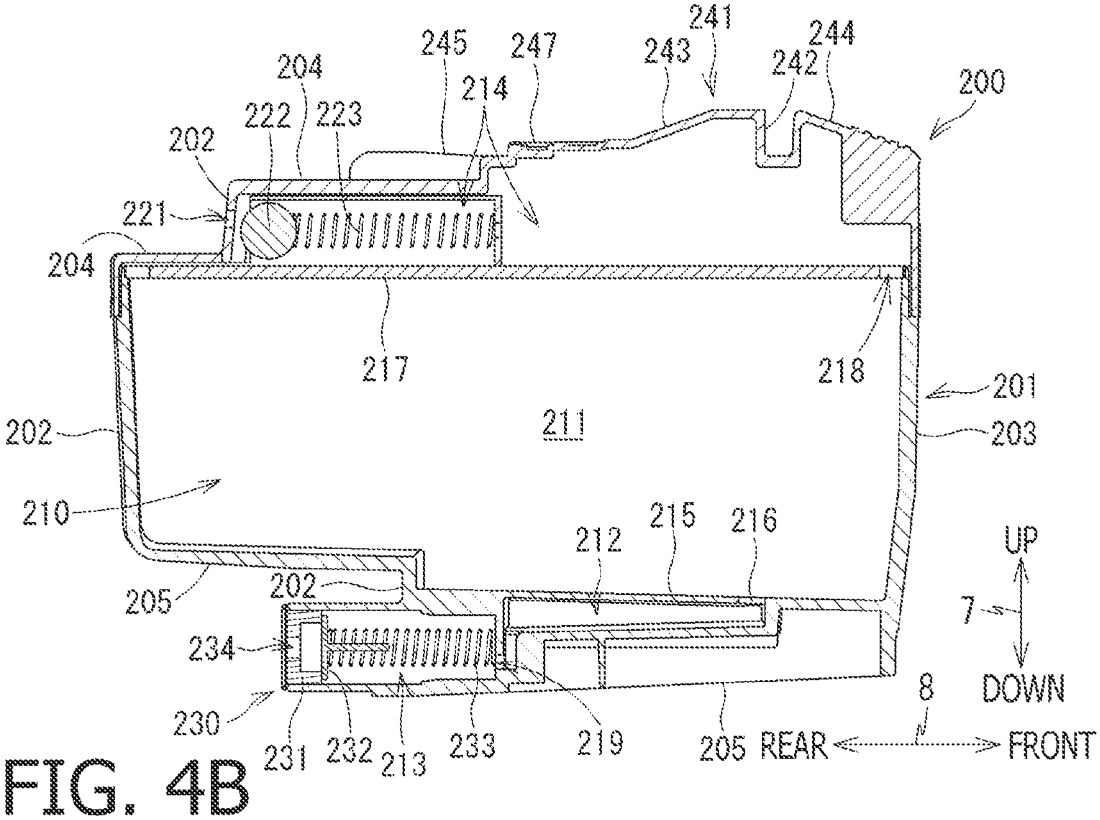

Inside each cartridge 200, as shown in FIG. 4B, formed are the liquid compartment 210, an ink valve compartment 213, and the air valve compartment 214. The liquid compartment 210 includes an upper liquid compartment 211 and a lower liquid compartment 212. The upper liquid compartment 211, the lower liquid compartment 212, and the air valve compartment 214 form the inner cavity in the body 201. Meanwhile, the ink valve compartment 213 forms an inner cavity in the supplier tube 230. The liquid compartment 210 may store the ink therein. The air valve compartment 214 connects the liquid compartment 210 to be in fluid communication with the atmosphere outside the cartridge 200.

Each cartridge 200 has recessed sections 62, 62, which are recessed inward from the sidewalls 206, 207, respectively. The recessed sections 62, 62 may be formed to adjust an amount of the ink to be stored in the cartridge 200. The recessed sections 62, 62 will be described further below.

The upper liquid compartment 211 and the lower liquid compartment 212 are separated from each other in the vertical direction 7 by a bulkhead 215 that divides the inner cavity in the body 201. Meanwhile, the upper liquid compartment 211 and the lower liquid compartment 212 are in fluid communication with each other through a through hole 216, which is formed through the bulkhead 215. The upper liquid compartment 211 and the air valve compartment 214 are separated from each other in the vertical direction 7 by a bulkhead 217 that divides the inner cavity in the body 201. Meanwhile, the upper liquid compartment 211 and the air valve compartment 214 are in fluid communication with each other through a through hole 218, which is formed through the bulkhead 217. The ink valve compartment 213 is in fluid communication with a lower end of the lower liquid compartment 212 through a through hole 219.

The air valve compartment 214 is continuous with the atmosphere outside the cartridge 200 through an air communication port 221, which is formed in the rear wall 202, at an upper position in the cartridge 200. Therefore, the air valve compartment 214 is in fluid communication with the liquid compartment 210, more specifically, to the upper liquid compartment 211, at one end, i.e., at the through hole 218, and with the atmosphere outside the cartridge 200 at the other end, i.e., at the air communication port 221. The air valve compartment 214 is in fluid communication with the atmosphere through the air communication port 221. Meanwhile, in the air valve compartment 214, arranged are a valve 222 and a coil spring 223. The valve 222 is movable in the air valve compartment 214 between a closed position and an open position along the front-rear direction 8. The valve 222 at the closed position closes the air communication port 221 and at the open position opens the air communication port 221. The coil spring 223 may urge the valve 222 in a direction to move from the open position toward the closed position, i.e., rearward, in the front-rear direction 8.

As the cartridge 200 moves to be attached to the attachment case 150, the rod 153 may enter the air valve compartment 214 through the air communication port 221. The rod 153 entering the air valve compartment 214 may move the valve 222 frontward from the closed position against the urging force of the coil spring 223. When the valve 222 reaches the open position, the upper liquid compartment 11 becomes in fluid communication with the atmosphere. Meanwhile, the structure to open the air communication port 221 may not necessarily limited to those described above. For example, the rod 153 may push and tear a film that seals the air communication port 221 open.

The supplier tube 230 protrudes rearward from the rear wall 202 at a lower position in the body 201. The supplier tube 230 is open rearward at a protrusive end, i.e., a rear end, thereof. In this regard, the ink valve compartment 213 connects the liquid compartment 210, which is continuous with the ink valve compartment 213 through the through hole 219, with the atmosphere outside the cartridge 200. Thus, the ink valve compartment 213 is in fluid communication with the liquid compartment 210, more specifically, to the lower liquid compartment 212, at one end, i.e., at the through hole 219, and to the atmosphere outside the cartridge 200 at the other end, i.e., at an ink supplier compartment 234, which will be described further below. In the ink valve compartment 213, arranged are a packing 231, a valve 232, and a coil spring 233.

At a center in the packing 231, formed through in the front-rear direction 8 is the ink supplier port 234. An inner diameter of the ink supplier port 234 is substantially smaller than an outer diameter of the needle 181. The valve 232 may move between the closed position and the open position along the front-rear direction 8. The valve 232 at the closed position contacts the packing 231 and closes the ink supplier port 234. The valve 232 at the open position is separated from the packing 231 and opens the ink supplier port 234. The coil spring 233 may urge the valve 232 in a direction to move from the open position toward the closed position, i.e., rearward, in the front-rear direction 8. The urging force of the coil spring 233 is greater than the urging force of the coil spring 186.

As the cartridge 200 moves to be attached to the attachment case 150, the supplier tube 230 may enter the guide 182, and the needle 181 may enter the ink valve compartment 213 through the ink supplier port 234. The needle 181 entering the ink valve compartment 213 may resiliently deform the packing 231 and liquid-tightly fit in an inner peripheral surface of the ink supplier port 234. As the cartridge 200 is pushed further in the attachment case 150, the needle 181 may move the valve 232 frontward against the urging force of the coil spring 233. Meanwhile, the valve 232 may move the valve 185 protruding through the opening 183 rearward against the urging force of the coil spring 186.

As the valve 185 moves rearward, the ink supplier port 234 and the opening 183 are connected, and the ink valve compartment 213 in the supplier tube 230 and the inner cavity in the needle 181 are connected with each other, as shown in FIG. 5. In other words, under the condition where the cartridge 200 is attached to the attachment case 150, the ink valve compartment 213 and the inner cavity in the needle 181 form a channel, which connects the liquid compartment 210 in the cartridge 200 with the liquid compartment 171 in the tank 160.

Moreover, under the condition where the cartridge 200 is attached to the attachment case 150, as shown in FIG. 5, a part of the liquid compartment 210 and a part of the liquid compartment 171 overlap each other in a view along a horizontal direction. Therefore, the ink stored in the liquid compartment 210 may flow in the liquid compartment 171 in the tank 160 through the supplier tube 230 and the joint 180 that are connected with each other by an effect of a hydraulic difference.

On the upper wall 204 of the cartridge 200, formed is a protrusion 241. The protrusion 241 protrudes upward from an upward surface of the upper wall 204 and longitudinally extends in the front-rear direction 8. The protrusion 241 includes a locking surface 242 and a slope surface 243, which are located to be higher than the upper wall 204. The locking surface 242 faces frontward and spreads in the vertical direction 7 and the widthwise direction 9. In this regard, the locking surface 242 may spread substantially orthogonally to the upper wall 204. The slope surface 243 inclines with respect to the upper wall 204 to face upper-rearward.

The locking surface 242 may, under the condition where the cartridge 200 is attached to the attachment case 150, contact the locking pin 156. The slope surface 243 may, as the cartridge 200 moves to be attached to the attachment case 150, guide the locking pin 156 to a position where the locking pin 156 contacts the locking surface 242. While the locking surface 242 and the locking pin 156 are maintained in contact with each other, the cartridge 200 is maintained at an attachment position, as shown in FIG. 5, against the urging forces of the coil springs 186, 223, 233.

On the upward surface of the upper wall 204, at a frontward position with respect to the locking surface 242, arranged is a plate member, which extends upward from the upper wall 204. An upper surface of the plate member serves as an operative part 244, which may be operated by a user when the cartridge 200 is removed from the attachment case 150. Under the condition where the cartridge 200 is attached to the attachment case 150, and when the cover 87 is at the exposing position, the operative part 244 is accessible to the user. When the user pushes the operative part 244 downward, a front part of the cartridge 200 may pivot downward, and the locking surface 242 may move downward to be lower than the locking pin 156. Therefore, the cartridge 200 may be released from the attachment case 150.

On the upward surface of the upper wall 204, at a rearward position with respect to the protrusion 241, formed is a light-blocking rib 245. The light-blocking rib 245 protrudes upward from the upper face of the upper wall 204 and longitudinally extends in the front-rear direction 8. The light-blocking rib 245 is either made of a material or in a color that blocks the light emitted from the light emitter of the attachment sensor 154. The light-blocking rib 245 is, under the condition where the cartridge 200 is attached to the attachment case 150, located on a light path between the light emitter and the light receiver in the attachment sensor 154. Therefore, the attachment sensor 154 may output the lower-leveled signal to the controller 130 in response to the condition where the cartridge 200 is attached to the attachment case 150. On the other hand, the attachment sensor 154 may output the higher-leveled signal to the controller 130 in response to a condition where the cartridge 200 is not attached to the attachment case 150. Thus, the controller 130 may detect the condition of the cartridge 200 being attached to the attachment case 150 based on the signal output from the attachment sensor 154.

On the upward surface of the upper wall 204, at a position between the light-blocking rib 245 and the protrusion 241 in the front-rear direction 8, arranged is an IC chip 247, on which the electrodes 248 are mounted. The IC chip 247 includes a memory device, which is not shown, and the electrodes 248 are electrically connected with the memory device. The electrodes 248 on an upper surface of the IC chip 247 are exposed so that the electrodes 248 may be conductive with the contact 152. In this regard, under the condition where the cartridge 200 is attached to the attachment case 150, the electrodes 248 are electrically conducted with the contact 152. The controller 130 may read and write information in the memory device in the IC chip 247 through the contact 152 and the electrodes 248.

[Controller 130]

The controller 130 includes, as shown in FIG. 6, a CPU 131, a ROM 132, a RAM 133, an EEPROM 134, and an ASIC 135. The ROM 132 may store controlling program 35, by which the CPU 131 may control behaviors of the printer 10. The RAM 133 may serve as a storage area to store data and signals to be used by the CPU 131 as the CPU 131 executes programs, including the controlling program 35, temporarily, and as a work area for process the data and the information. The EEPROM 134 may store information, such as configuration information concerning the printer 10, which should be saved when the printer 10 is powered on and off.

The ASIC 135 may control behaviors of the feed roller 23, the conveyer roller 25, the ejection roller 27, and the heads 21. The controller 130 may drive a motor, which is not shown, through the ASIC 135 so that the feed roller 23, the conveyer roller 25, and the ejection roller 27 may rotate. Moreover, the controller 130 may output driving signals to drivable elements in the heads 21 through the ASIC 135 so that the heads 21 may discharge the inks through the nozzles 29. The ASIC 135 may output multiple types of driving signals depending on amounts of the inks to be discharged through the nozzles 29.

The ASIC 135 is electrically connected with the contacts 152, the cover sensor 88, the attachment sensors 154, the liquid-level sensors 155, and a communication interface 34. The controller 130 may access the memory devices in the IC chips 247 in the cartridges 200 attached to the attachment case 152 through the contacts 152. The controller 130 may detect a position of the cover 37 through the cover sensor 88. The controller 130 may detect attachment or removal of the cartridges 200 to and from the attachment case 150 through the attachment sensors 154. Moreover, the controller 130 may detect the levels of the inks in the liquid compartments 171, i.e., whether the levels of the inks are higher or equal to the threshold position P or not, through the liquid-level sensors 155.

The EEPROM 134 may store information the cartridges 200 to be attached to the attachment case 150. In other words, the EEPROM 134 may store information concerning each cartridge 200, in association with the tank 160 which is connected with the cartridge 200. The information may include a flag called S_Empty flag and a second remainder value for each of the cartridges 200, which will be described further below.

The second remainder value indicates a second remainder amount, which is an amount of the ink remaining in the liquid compartment 171 in the tank 160. The second remainder value, which will be described further below, is updated by the controller 130 regularly, for example, each time the printer 10 prints an image on a sheet.

The ASIC 135 is connected with a display 28. The display 28 includes a display panel 17 and a touch sensor 18 laid over the display panel 17. The display panel 17 may display information, which may or may not be related to the printer 10, and include, for example, a liquid crystal display and an organic EL display. The touch sensor 18 may detect a position in the display panel 17 touched by the user and output information related to the position. Therefore, when an object is being displayed in the display panel 17, the controller 130 may detect a touching action by the user to the object. A user's touching action on an object in the display 28 may include, for example, tapping, pressing, and flicking.

The display 28 may display a standby screen as shown in FIG. 12 and an ink remainder indication screen as shown in, for example, FIGS. 13B and 14B, in response to a command by the controller 130. The standby screen as shown in FIG. 12 may be displayed in the display 28 when the printer 10 is in a standby mode. The standby screen may include function objects 73, which represent functions such as facsimile, copy, and scan, that are available to the user from the printer 10. Moreover, the standby screen may include a setting object 74, through which the screen to be displayed may be switched from the standby screen to a setting screen (not shown), and scroll objects 79, through which the screen being displayed may be scrolled in the display panel 17.

Moreover, the standby screen includes a switcher object 250. The switcher object 250 may be, as shown in FIG. 12, arranged in a lower-rightward area in the standby screen.

Meanwhile, the position of the switcher object 250 is not necessarily be limited to the lower-rightward area.

The switcher object 250 includes four (4) rectangular figures aligning side by side along a crosswise direction 72 in the display 28. The rectangular figures represent the four cartridges 200: the cartridge 200 to store the magenta ink, the cartridge 200 to store the cyan ink, the cartridge 200 to store the yellow ink, and the cartridge 200 to store the black ink, in the order from left to right. The shape of the figures to represent the cartridges 200 may not necessarily be limited to rectangles but may be in a different shape or may be replaced with signs.

In response to a tapping action to the switcher object 250 by the user, the screen in the display 28 may be switched from the standby screen (see FIG. 12) to the ink remainder indication screen (see, for example, FIGS. 13B and 14B), which indicates remaining amounts of the inks.

The ink remainder indication screen includes, as shown in FIG. 14B, an M object 260M, a C object 260C, a Y object 260Y, and a Bk object 260Bk, which include letters of M, C, Y, and Bk, representing magenta, cyan, yellow, and black, respectively.

The ink remainder indication screen further includes a first object 251M and a second object 252M. The first object 251M indicates a first remainder amount being an amount of the ink stored in the cartridge 200 for magenta. The second object 252M indicates the second remainder mount being an amount of the ink stored in the liquid compartment 171 in the tank 160 connected with the cartridge 200 for magenta. The first object 251M and the second object 252M align along a perpendicular direction 71 in the display 28. The first object 251M and the second object 252M may be rectangular bars, each of which has a length extending along the perpendicular direction 71 of the display 28 and a width extending along the crosswise direction 72 of the display 28. The width of the first object 251M and the width of the second object 252M may be the same.

More specifically, the first object 251M includes a frame 75, of which rectangular shape is invariable, and a bar 76, of which length in the perpendicular direction 71 extending from a lower end thereof is variable. The bar 76 may not be displayed when the first remainder amount is zero (0), i.e., none. In other words, when the first remainder amount is zero, the first object 251M solely includes the frame 75 (see FIG. 15B). When the first remainder amount is greater than zero, the first object 251M includes the frame 75 and the bar 76, of which length corresponds to the first remainder amount. The ink remainder indication screen further includes first objects 251C, 251Y, and 251Bk for cyan, yellow, and black, respectively, which will be described further below. Each of the first objects 251C, 251Y, and 251Bk includes the frame 75 and the bar 76 that are similar to those in the first object 251M for magenta.

The second object 252 M includes, as shown in FIG. 15B, a frame 77, of which rectangular shape is invariable, and a bar 78, of which length in the perpendicular direction 71 extending from a lower end thereof is variable, similarly to the frame 75 and the bar 76 in the first object 251M. The bar 78 may not be displayed when the second remainder amount is zero (0), i.e., none. In other words, when the second remainder amount is zero, the second object 251M solely includes the frame 77 (see FIG. 15B). When the second remainder amount is greater than zero, the second object 252M includes the frame 77 and the bar 78, of which length corresponds to the second remainder amount. The ink remainder indication screen further includes second objects 252C, 252Y, and 252Bk for cyan, yellow, and black, respectively, which will be described further below. Each of the second objects 252C, 252Y, and 252Bk includes the frame 77 and the bar 78 that are similar to those in the second object 252M for magenta.

The first object 251C indicates a first remainder amount being an amount of the ink stored in the cartridge 200 for cyan. The second object 252C indicates the second remainder mount being an amount of the ink stored in the liquid compartment 171 in the tank 160 connected with the cartridge 200 for cyan. The first object 251C and the second object 252C align along the perpendicular direction 71 in the display 28. The first object 251C and the second object 252C may be rectangular bars, each of which has a length extending along the perpendicular direction 71 of the display 28 and a width extending along the crosswise direction 72 of the display 28. The width of the first object 251C and the width of the second object 252C may be the same. The first object 251C is arranged at a rightward adjoining position to the first object 251M for magenta, and the second object 252C is arranged at a rightward adjoining position to the second object 251M for magenta.

The first object 251Y indicates a first remainder amount being an amount of the ink stored in the cartridge 200 for yellow. The second object 252Y indicates the second remainder mount being an amount of the ink stored in the liquid compartment 171 in the tank 160 connected with the cartridge 200 for yellow. The first object 251Y and the second object 252Y align along the perpendicular direction 71 in the display 28. The first object 251Y and the second object 252Y may be rectangular bars, each of which has a length extending along the perpendicular direction 71 of the display 28 and a width extending along the crosswise direction 72 of the display 28. The width of the first object 251Y and the width of the second object 252Y may be the same. The first object 251Y is arranged at a rightward adjoining position to the first object 251C for cyan, and the second object 252Y is arranged at a rightward adjoining position to the second object 251C for cyan.

The first object 251 Bk indicates a first remainder amount being an amount of the ink stored in the cartridge 200 for black. The second object 252 Bk indicates the second remainder mount being an amount of the ink stored in the liquid compartment 171 in the tank 160 connected with the cartridge 200 for black. The first object 251 Bk and the second object 252 Bk align along the perpendicular direction 71 in the display 28. The first object 251 Bk and the second object 252 Bk may be rectangular bars, each of which has a length extending along the perpendicular direction 71 of the display 28 and a width extending along the crosswise direction 72 of the display 28. The width of the first object 251 Bk and the width of the second object 252 Bk may be the same. The first object 251 Bk is arranged at a rightward adjoining position to the first object 251Y for yellow, and the second object 252C is arranged at a rightward adjoining position to the second object 251Y for yellow.

While the widths of the first objects 251M, 251C, 251Y, which indicate the first remainder amounts for the inks stored in the cartridges 200 for magenta, cyan, yellow, respectively, are the same, the width of the first object 251Bk, which indicates the first remainder amount for the ink stored in the cartridge 200 for black is greater than the widths of the first objects 251M, 251C, 251Y. The difference in the widths between the first objects 251M, 251C, 251Y and the first object 251Bk may represent a difference in capacities in the cartridges 200. In other words, the greater width of the first object 251Bk for black may indicate a greater amount of ink storable in the cartridge 200 for black than a storable amount of ink in the cartridges 200 for magenta, cyan, and yellow.

Moreover, while the widths of the second objects 252M, 252C, 252Y, which indicate the second remainder amounts for the inks stored in the tanks 160 for magenta, cyan, yellow, respectively, are the same, the width of the second object 252Bk, which indicates the second remainder amount for the ink stored in the tank 160 for black is greater than the widths of the second objects 252M, 252C, 252Y. The difference in the widths between the second objects 252M, 252C, 251Y and the second object 252Bk may represent a difference in capacities in the tanks 160. In other words, the greater width of the second object 252Bk for black may indicate a greater volume in the liquid compartment 171 in the tank 160 for black than a volume in the liquid compartments 171 of the tanks 160 for magenta, cyan, and yellow.

In the following paragraphs, the first objects 251M, 251C, 251Y, 251Bk may be collectively called as the first object 251, and the second objects 252M, 252C, 252Y, 252Bk may be collectively called as the second object 252. It may be noted that the ordinal terms (e.g., first, second, . . . etc.) appended to the objects to be displayed in the screens on the display 28 may not necessarily be related to an order of significance or appearance of some objects over the other objects but should be considered merely as names of the objects.

The ink remainder indication screen further includes, as shown in FIGS. 15B and 16B, a third object 253, which may be displayed depending on a condition of the ink in the cartridge 200. The third object 253 may be displayed to overlap the first object 251 when the ink in the cartridge 200 is exhausted. The condition of the cartridge 200 that the ink is exhausted may mean that the cartridge 200 does not store a substantial amount of ink to flow into the tank 160. In this regard, the expression that the ink is exhausted may not necessarily mean that no ink is stored in the cartridge 200.

The third object 253 may include, but not necessarily be limited to, an exclamation mark (!). The third object 253 may be, for another example, a sign, a character, or a figure other than the exclamation mark. The third object 253 displayed over the first object 251 may cause the user to intuitively recognize that the ink in the cartridge 200 is exhausted.

The third object 253 is displayed over the first object 251 corresponding to the cartridge 200, which exhausted the ink therein. When the cartridge 200 exhausts the ink therein, the first object 251 for the cartridge 200 solely includes the frame 75. The third object 253 may be displayed inside the frame 75, in an area where the bar 76 may otherwise be displayed.

The ink remainder indication screen further includes, as shown in FIG. 16B, a fourth object 254, which may be displayed depending on a condition of the ink in the cartridge 200 and the tank 160. The fourth object 254 may be displayed to overlap the first object 251 and the second object 252 when the cartridge 200 and the tank 160 no longer contain a sufficient amount of ink to continue printing. The condition of the cartridge 200 no longer containing a sufficient amount of ink to continue printing may mean the ink-empty condition mentioned earlier.

The fourth object 254 may include, but not necessarily be limited to, a cross-out mark (x). The fourth object 254 may be, for another example, a sign, a character, or a figure other than the cross-out mark. The fourth object 254 displayed over the first object 251 and the fourth object 252 may cause the user to intuitively recognize that no sufficient ink remains in the cartridge 200.

The fourth object 254 is displayed over the first object 251 and the second object 252 corresponding to the cartridge 200 and the tank 160, which exhausted the ink therein. In FIG. 16B, the fourth object 254 is displayed over the first object 251Bk and the second object 252Bk for the black ink. When the fourth object 254 is displayed, the third object 253 may be displayed along with the fourth object 254, as shown in FIG. 16B, or the third object 253 may be deleted.

When the cartridge 200 and the tank 160 exhaust the ink therein, the first object 251 for the cartridge 200 solely includes the frame 75, and the second object 252 solely includes the frame 77. The fourth object 254 may be displayed over the frame 75 and the frame 77, in areas where the bar 76 and the bar 78 may otherwise be displayed.

The ink remainder indication screen further includes a sixth object 256M indicating an estimated printable quantity for magenta, a sixth object 256C indicating an estimated printable quantity for cyan, a sixth object 256Y indicating an estimated printable quantity for yellow, and a sixth object 256Bk indicating an estimated printable quantity for black.

The estimated printable quantity for magenta is a value, which indicates a quantity of sheets that may be printed in the magenta ink currently remaining in the printer 10. The estimated printable quantity for cyan is a value, which indicates a quantity of sheets that may be printed in the cyan ink currently remaining in the printer 10. The estimated printable quantity for yellow is a value, which indicates a quantity of sheets that may be printed in the yellow ink currently remaining in the printer 10. The estimated printable quantity for black is a value, which indicates a quantity of sheets that may be printed in the black ink currently remaining in the printer 10. A method to calculate the estimated printable quantity will be described further below.

[Processes in the Printer 10]

Processes to be taken in the printer 10 will be described with reference to the flowcharts shown in FIGS. 7-10 and the drawings in FIGS. 11A-11D through 15A-15B. Processes described in the following paragraphs and illustrated in the flowcharts in FIGS. 7-10 may be implemented by the CPU 131 running the controlling program 35 stored in the ROM 132 or by a hardware circuit (not shown) mounted on the controller 130. An order to process the steps in the flowcharts may not necessarily be fixed to the flow described below but may be altered within a scope of the present invention as set forth in the appended claims.

[Image Forming Process]

The controller 130 activates an image forming process as shown in FIG. 7 in response to input of a print command in the printer 10. The print command by the user may be received through, for example, but not necessarily limited to, the operation panel 22 or the display 28. For another example, the print command may be received from an external device through the communication interface 34. In the following paragraphs, each of the cartridges 200 for magenta, cyan, yellow, and black inks and each of the four tanks 160 for magenta, cyan, yellow, and black inks may be collectively called as the cartridge 200 and the tank 160, respectively, in the singular form. In other words, each of the steps in the processes described below may be repeated for four times for the four colored inks although the steps in the processes may be described solely once.

In S11, the controller 130 determines the value in the S_Empty flag for the cartridge 200. In other words, the controller 130 determines whether the printer 10 contains the sufficient amount of ink to print an image on a sheet. If the controller 130 determines that the S_Empty flags is on (S11: ON), in S12, the controller 130 obtains the attachment signal for the cartridge 200. In S13, the controller 130 determines whether the attachment signal for the cartridge 200 changes from the lower level (L) to the higher level (H) and thereafter from the higher level (H) to the lower level (L). In other words, the controller 130 monitors the changes in the attachment signals to determine whether the cartridge 200 with the lowered ink level has been exchanged with another cartridge 200.

In S13, if the controller 130 determines that the cartridge 200 has not been exchanged (S13: NO), the flow returns to S12 and obtains the attachment signal for another round. In S13, if the controller 130 determines that the cartridge 200 has been exchanged with another cartridge 200 (S13: YES), the flow proceeds to a first updating process in S14. Alternatively to S12-S13, the controller 130 may conduct another process to determine the exchange of the cartridges 200. For example, the controller 130 may read the IC chip 247 in the cartridge 200 to obtain a serial number of the cartridge 200 and determine whether the obtained serial number matches a serial number having been saved in the EEPROM 134.

[First Updating Process]

Figure 8A:
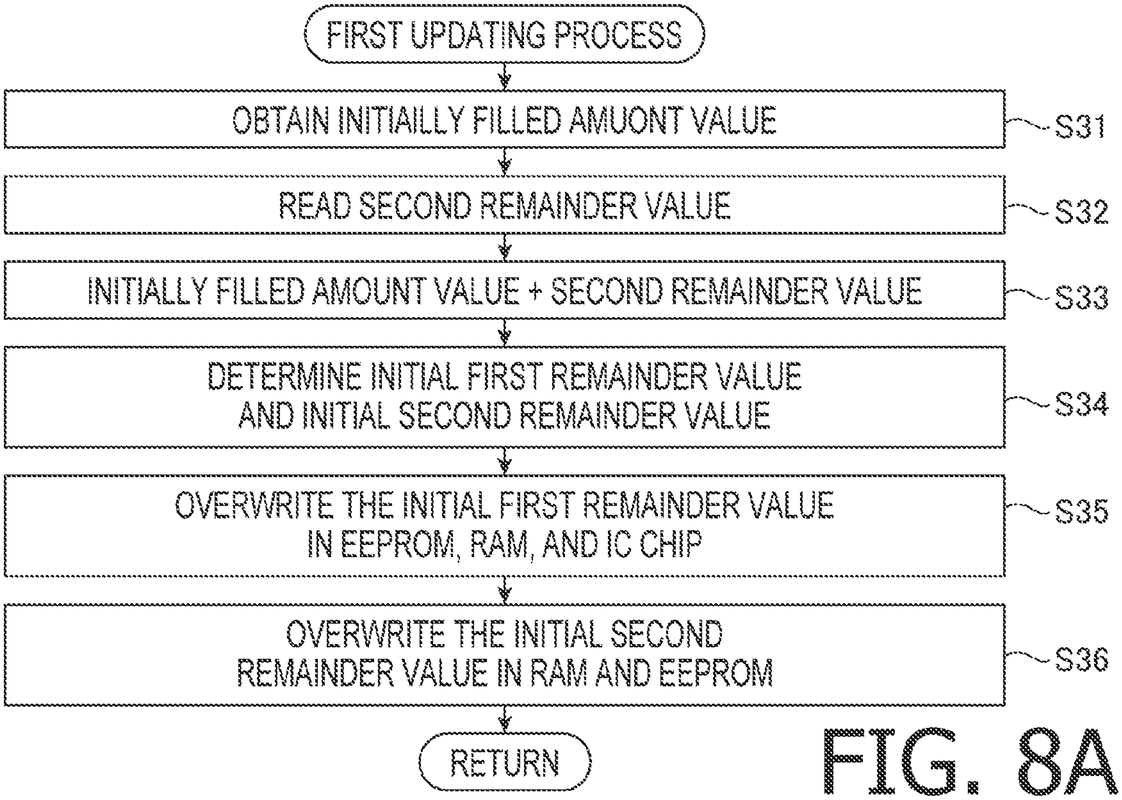

The first updating process shown in FIG. 8A may be conducted in order to update a first remainder value, which indicates the first remainder amount, and a second remainder value, which indicates the second remainder amount, when the cartridges 200 are exchanged. As mentioned earlier, the first remainder amount is an amount of the ink remaining in the cartridge 200, and the second remainder amount is an amount of the ink remaining in the tank 160.

In S31, the controller 130 obtains an initially filled amount value, which indicates an amount of the ink initially loaded in the cartridge 200. The controller 130 may read type information in the IC chip 247 in the cartridge 200 and obtain the initially filled amount value corresponding to the type information from the EEPROM 134. In the EEPROM 134, a table indicating correspondence between the type information and the initially filled amount value is prepared and stored in advance. Alternatively, the controller 130 may obtain an initial value for the first remainder value stored in the IC chip 247 in the cartridge 200 and use the obtained initial value as the initially filled amount value.

In S32, the controller 130 reads the second remainder value in the RAM 133. The second remainder value indicates an amount of the ink having been stored in the tank 160 immediately before the cartridge 200 was exchanged.

In S33, the controller 130 adds the initially filled amount value to the second remainder value to calculate a total remainder value, which indicates a total remainder amount of the ink. In S34, the controller 130 updates the first remainder value and the second remainder value for the new cartridge 200 based on the total remainder value calculated in S130. When the new cartridge 200 is attached to the attachment case 150, a portion of the ink in the cartridge 200 may flow into the liquid compartment 171 in the tank 160. In this regard, the level of the ink in the cartridge 200 may be lowered, and the level of the ink in the tank 160 may rise. In this regard, the updated first remainder value indicates the amount of the ink remaining in the cartridge 200 after the portion of the ink flowed into the tank 160, and the updated second remainder value indicates the amount of the ink in the tank 160 that accepted the ink flowed from the cartridge 200. The first remainder value and the second remainder value may be updated by, for example, calculation through a function formula or based on a table as described in the following paragraph.

The shapes of the liquid compartment 210 in the cartridge 200 and the liquid compartment 171 in the tank 160 are fixed and known to the manufacturer prior to shipping. Therefore, based on the shapes of the liquid compartment 210 and the liquid compartment 171, and based on the total remainder value, the first remainder value and the second remainder value are obvious to the manufacturer. Therefore, formulas, by which the first remainder value and the second remainder value are calculated based on the total remainder value, or a table, in which the total remainder value is associated with the first remainder value and the second remainder value, may be prepared in advance and stored in the EEPROM 134 by the manufacturer. The controller 130 may determine the first remainder value and the second remainder value based on the formulas or the table.

In S35, the controller 130 saves the newly determined first remainder value as an initial first remainder value in the EEPROM 134 and in the RAM 133. Further, the controller 130 writes the new first remainder value over the existing first remainder value in the memory device in the IC chip 247. Moreover, the controller 130 saves the newly determined second remainder value as an initial second remainder value in the EPROM 134 and in the RAM 133. The first updating process ends thereat. The flow returns to S14 in FIG. 7.

Following the first updating process in S14, in S15, the controller 130 sets the S_Empty flag off and returns to S11.

In S11, the controller 130 determines the value in the S_Empty flag for the cartridge 200. If the controller 130 determines that the S_Empty flag is off (S11: OFF), in S16, the controller 130 forms an image on a sheet. Forming an image on a sheet consumes inks; therefore, the levels of the inks in the tanks 160 may be lowered. In this regard, in S17, the controller obtains the liquid-level signals before and after forming the image in S16 from the liquid-level sensor 155.

In S18, the controller 130 determines whether the obtained liquid-level signals indicate a change in the liquid level in the tank 160. If the controller 130 determines that the liquid-level signals stay unchanged at the lower level (L) (S18: L-→L), the controller 130 determines that the ink in the cartridge 200 is not exhausted. In this regard, as mentioned earlier, the liquid-level sensor 155 outputs the lower-leveled signal (L) when the level of the ink in the liquid compartment 171 is higher than the threshold position P (see FIG. 3). The flow proceeds to S19, and the controller 130 conducts a second updating process.

[Second Updating Process]

Figure 8B:
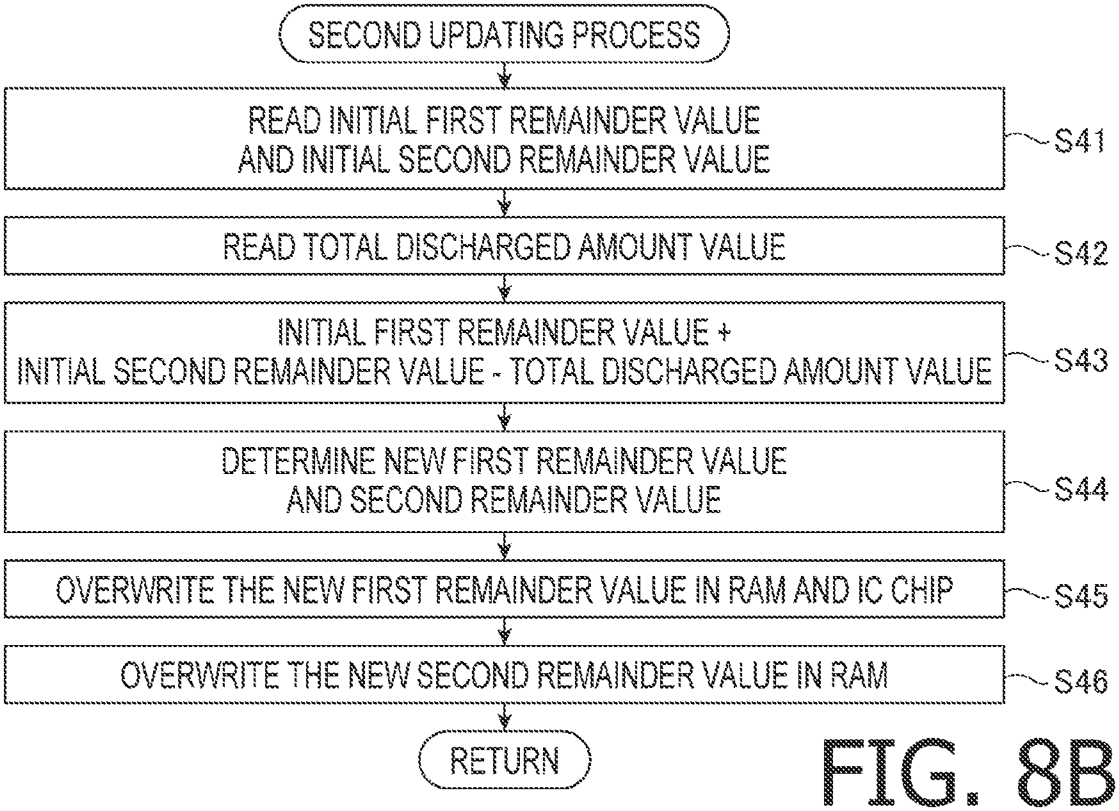

In the second updating process shown in FIG. 8B, the controller 130 may determine new values for the first remainder value and the second remainder value based on a discharged amount value, which indicates an amount of the ink discharged in the image forming in the past. The discharged amount value for the ink may be obtained, for example, by multiplying a voltage value, which may define a size of an ink droplet to be discharged from the head 21, by a quantity of ink droplets having been discharged in the image forming in the past. The controller 130 may calculate the discharged amount value each time when the controller 130 commands the head 21 to discharge the ink. The discharged amount values may be accumulated from the time of the exchange of the cartridges 200 up to the current moment. The accumulated discharged amount values will be called as a total discharged amount value. In other words, the total discharged amount value is a sum of the amount of the ink consumed by the head 21 from the time of the exchange of the cartridges 200 up to the current moment. The total discharged amount value may be stored in the EEPROM 134.

In the second updating process, in S41, the controller 130 reads the initial first remainder value in either the RAM 133 or the EEPROM 134 and reads the initial second remainder value in either the RAM 133 or the EEPROM 134. In S42, the controller 130 reads the total discharged amount value in the EEPROM 134. In S43, the controller 130 adds the initial first remainder value and the initial second remainder value read in S42 to calculate an initial total remainder value and subtracts the total discharged amount value from the initial total remainder value to calculate a current total remainder value. In S44, the controller 130 determines new values for the first remainder value and the second remainder value based on the formulas or the table, in the same manner as S34 in FIG. 8A.

In S45, the controller 130 stores the newly determined first remainder value in the RAM 133 and in the memory device in the IC chip 247 to overwrite the existing first remainder value in the memory device. Moreover, in S46, the controller 130 stores the newly determined second remainder value in the RAM 133. The second updating process ends thereat. The flow returns to S19 in FIG. 7.

Following the second updating process in S19, in S22, the controller 130 determines whether a next image to be printed on a new sheet is in queue. If the next image is in queue (S22: YES), the flow repeats S11 and the steps onward. If no next image is in queue (S22: NO), the image forming process ends thereat.

The first remainder value and the second remainder value may not necessarily be determined in the method described above but may be determined in a different method.

In S11, if the controller 130 determines that the S_Empty flags is off (S11: OFF), the controller 130 proceeds to S16, S17, and S18. In S18, if the controller 130 determines that the liquid-level signals changed from the lower level (L) to the higher level (H) (S18: L-→H), in other words, if the controller 130 determines that the ink in the cartridge 200 is exhausted, in S20, the controller 130 conducts a third updating process.

[Third Updating Process]

Figure 8C:
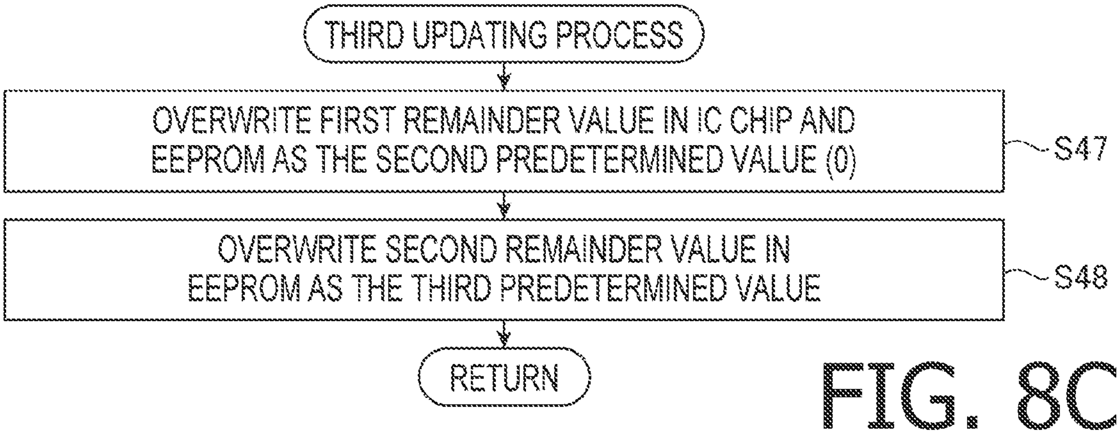

In the third updating process shown in FIG. 8C, the controller 130 may update the first remainder value and the second remainder value with a second predetermined value and a third predetermined value, respectively. That is, the discharged amount value indicating the estimated amount of the ink having been consumed in the image printing in the past may be different from an actual amount of the ink having been consumed. In this regard, the first remainder amount and the second remainder amount, which are updated each time an image is printed on a sheet, may contain accumulated differences. The third updating process may eliminate the differences contained in the first remainder amount and the second remainder amount.

In S47, the controller 130 writes the second predetermined value over the initial first remainder value having been stored in the memory device in the IC chip 247. The second predetermined value may be, for example, zero (0). In S48, the controller 130 saves the initial second remainder value as the third predetermined value in the EEPROM 134 and the RAM 133. The third updating process ends thereat. The third predetermined value indicates an amount of the ink in the liquid compartment 171 in the tank 160 when the level of the ink in the liquid compartment 171 is at the threshold position P and may be prepared in advance in the ROM 132.

Following the third updating process in S20, in S22, the controller 130 determines whether a next image to be printed on a new sheet is in queue. If the next image is in queue (S22: YES), the flow returns to S11 and proceeds to the steps onward. If no next image is in queue (S22: NO), the image forming process ends thereat.

In S11, if the controller 130 determines that the S_Empty flags is off (S11: OFF), the controller 130 proceeds to S16, S17, and S18. In S18, if the controller 130 determines that the liquid-level signal stay unchanged at the higher level (H) (S18: H-→H), in S21, the controller 130 conducts a fourth updating process. In other words, once the ink in the cartridge 200 is exhausted, and until the cartridge 200 is exchanged with a new cartridge 200, the controller 130 repeats the fourth updating process.

[Fourth Updating Process]

Figure 8D:
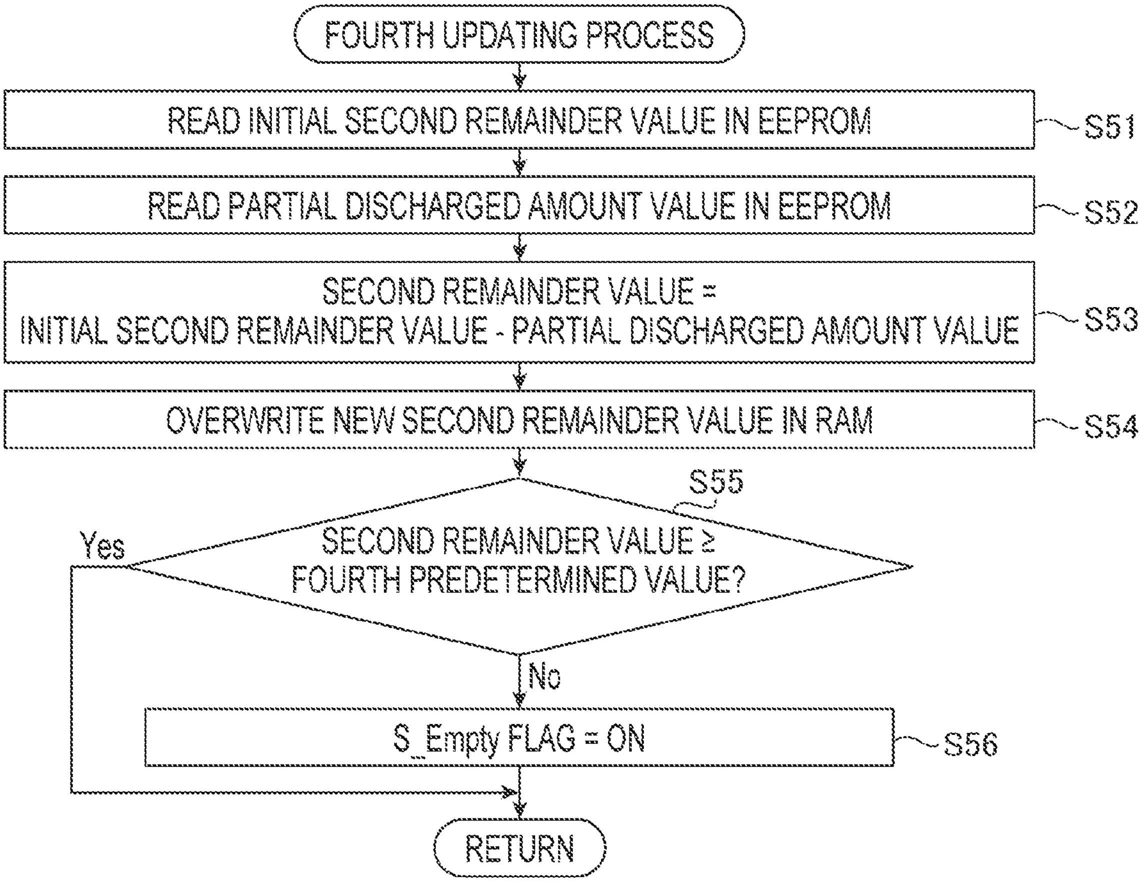

In the fourth updating process shown in FIG. 8D, the controller 130 calculates a value for the second remainder value and determine whether the calculated second remainder value indicates an amount, which is sufficient for printing an image continuously. In particular, in S51, the controller 130 reads the initial second remainder value in either the RAM 133 or the EEPROM 134. In S52, the controller 130 reads a partial discharged amount value in the EEPROM 134. The partial discharged amount value indicates a sum of the amounts of the ink discharged by the head 21 from the time, when the signals from the liquid-level sensor 155 changed from the lower-level (L) to the higher level (H), up to the current moment. In S53, the controller 130 subtracts the partial discharged amount value from the initial second remainder value read in S51 to calculate a new value for the second remainder value.

In S54, the controller 130 writes the new value for the second remainder value calculated in S53 over the existing second remainder value in the RAM 133 read in S51. Meanwhile, the first remainder value stays the same, without being overwritten, as the second predetermined value, i.e., zero (0), until the cartridge 200 is exchanged with a new cartridge 200.

In S55, the controller 130 determines whether the new second remainder value is greater than or equal to a fourth predetermined value, which may be a value corresponding to the ink-empty condition in the tank 160 and may be prepared in advance in the EEPROM 134.

In S55, if the controller 130 determines that the second remainder value is greater than or equal to the fourth predetermined value, in other words, if the image is continuously printable (S55: YES), skips S56 and ends the fourth updating process thereat. On the other hand, if the controller 130 determines that the second remainder value is smaller than the fourth predetermined value, in other words, if the image may not be continuously printed (S55: NO), in S56, the controller 130 sets the S_Empty flag on and ends the fourth updating process thereat.

In the image forming process, as described above, the first remainder value and the second remainder value may be determined based on the amount of the ink consumed each time when an image is printed on a sheet. Meanwhile, the first remainder value and the second remainder value may not necessarily be updated on a sheet basis but may be updated on basis of a different unit, for example, each time a row of image is printed in a path on a sheet. Moreover, the second updating process, the third updating process, and the fourth updating process may be conducted not only when an image is printed but also when the inks are discharged from the heads 21 for, for example, maintenance or cleaning.

Based on the first remainder value and the second remainder value updated in the image forming process, conducted may be a screen displaying process shown in FIG. 9 and an objects determining process shown in FIG. 10, which are described in the following paragraphs.

[Screen Displaying Process]

As shown in FIG. 9, in S71, the controller 130 displays the standby screen (see FIG. 12) in the display 28. The standby screen may include, as described earlier, the switcher object 250, by which the screen in the display 28 may be switched from the standby screen to the ink remainder indication screen including indication of the remaining inks. In S72, the controller 130 determines whether the user tapped on the switcher object 250. In particular, the controller 130 may determine whether the user tapped on the switcher object 250 based on the signals from the touch sensor 18.

The controller 130 may keep displaying the standby screen (see FIG. 12) until the user taps on the switcher object 250 (S72: NO). When the controller 130 determines that the user tapped on the switcher object 250 (S72: YES), in S73, the controller 130 conducts the objects determining process (see FIG. 10). Thereafter, in S74, the controller 130 displays the ink remainder indication screen (see, for example, FIG. 14B), in place of the standby screen, in the display 28. Optionally, the objects determining process may be conducted after the first through fourth updating processes (see FIGS. 8A-8D).

[Objects Determining Process]

In the objects determining process shown in FIG. 10, based on the first remainder value and the second remainder value, the controller 130 may determine lengths of the bars 76, 78 in the first and second objects 251, 252, a quantity of the estimated printable sheets in the sixth object 256 in the ink remainder indication screen, and whether the third object 253 and the fourth object 254 will be displayed in the ink remainder indication screen. The objects determining process is conducted for each of the four colored inks, i.e., magenta, cyan, yellow, and black. In other words, for each of the inks, the lengths of the bars 76, 78 in the first and second objects 251, 252, an estimated printable quantity in the sixth object 256 in the ink remainder indication screen, and whether the third object 253 and the fourth object 254 will be displayed in the ink remainder indication screen, are determined.

In S81, the controller 130 reads the first remainder value in the memory device in the IC chip 247 and the second remainder value in the EEPROM 134. In S82, the controller 130 reads the values in the S_Empty flag to determine whether the amount of the remaining ink is sufficient to print an image on a sheet. For example, when the cartridge 200 and the tank 160 are in a condition shown in FIG. 16A, the S_Empty flag may be on.

In S82, if the controller 130 determines that the S_Empty flag is on (S82: ON), in S83, the controller 130 determines the lengths of the bar 76 in the first object 251 and the bar 78 in the second object 252 to be none (zero: 0). In S84, the controller 130 determines that the fourth object 254 (cross-out mark: x) will be displayed. In S85, the controller 130 determines that the estimated printable quantity to be zero (0). The objects determining process ends thereat.

In S82, if the controller 130 determines that the S_Empty flag is off (S82: OFF), in other words, if the amount of the remaining ink is sufficient to print an image on a sheet, in S86, the controller determines the value from the liquid-level sensor 155. In other words, the controller 130 determines whether the ink in the cartridge 200 is exhausted.

For example, when the cartridge 200 and the tank 160 are in a condition shown in FIG. 15A, the liquid-level sensor 155 may output the higher-leveled signal (H). Therefore, the controller 130 determines that the value from the liquid-level sensor 155 indicates the higher level (H) (S86: H). In S87, the controller 130 determines the length of the bar 76 in the first object 251 to be zero (0), as shown in FIG. 15B, in S88, determines that the third object 253 (exclamation mark: !) will be displayed, and in S89, determines the length of the bar 78 in accordance with the second remainder value saved in the EEPROM 134.

For example, the controller 130 may determine the length of the bar 78 in the second object 252 proportionately to the second remainder value. In particular, the controller 130 may determine the length of the bar 78 in the second object 252 based on a formula or a table prepared in advance in the EEPROM 134. The length of the bar 78 in the second object 252 may decrease linearly as the second remainder value decreases gradually or may decrease non-linearly in phases each time the second remainder value decreases to a predetermined amount.

In S90, the controller 130 conducts an estimated printable quantity determining process, in which the estimated printable quantity is determined based on the second remainder value. In the following paragraphs, the estimated printable quantity determining process (ISO equivalent) will be described.

[Estimated Printable Quantity Determining Process (ISO Equivalent)]

An estimated printable quantity (ISO equivalent) indicates a quantity of sheets printable in the current amount of the remaining ink if images are hypothetically printed in a test method compliant with requirements prescribed by International Organization for Standardization (ISO). The test method prescribed by ISO requires printing a predetermined pattern of image on a predetermined type of sheet in a predetermined level of environment (e.g., temperature).

As shown in FIG. 23A, in S131, the controller 130 reads the IC chip 247 in the cartridge 200 for the type information of the cartridge 200. In S132, the controller 130 extracts a standard usage value for the cartridge 200 from the type information. The standard usage value indicates a quantity of sheets per unit amount of ink printable in the test method prescribed by ISO. The standard usage value may be prepared in advance in a table in association with the type information and stored in the EEPROM 134.

In S133, the controller 130 reads the first remainder value and the second remainder value in the RAM 133 and, in S134, calculates the estimated printable quantity (ISO equivalent) based on the first remainder value and the second remainder value in the RAM 133 read in S133. In particular, the controller 130 sums the first remainder value and the second remainder value to calculate the total remainder value. Further, the controller 130 may multiply the total remainder value by the standard usage value to calculate the estimated printable quantity (ISO equivalent). In S135, the controller 130 saves the estimated printable quantity (ISO equivalent) in the RAM 133 and the EEPROM 134. The printable quantity determining process ends (ISO equivalent) thereat. The controller 130 may conduct the estimated printable quantity determining process (ISO equivalent) each time the controller 130 conducts the image forming process shown in FIG. 7.

The controller 130 exits the estimated printable quantity process and ends the objects determining process (FIG. 10) thereat.

In S86, on the other hand, if the controller 130 determines that the value from the liquid-level sensor 155 indicates the lower level (L) (S86: L), in other words, if the ink in the cartridge 200 is not exhausted, in S91, the controller 130 determines whether the first remainder value read in S81 is greater than or equal to a first predetermined value. The first predetermined value is equal to the first remainder value under a condition where the cartridge 200 is newly attached to the attachment case 150 while the liquid compartment 171 in the tank 160 contains no ink therein. The first predetermined value is prepared in advance and may be stored in the EEPROM 134. The first predetermined value will be described more in detail in the following paragraph with reference to FIGS. 11A-11D.

Figure 11A:
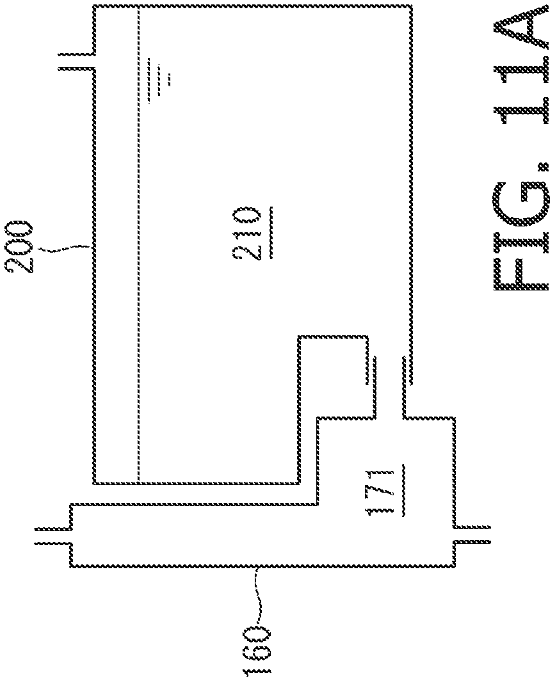
Figure 11B:
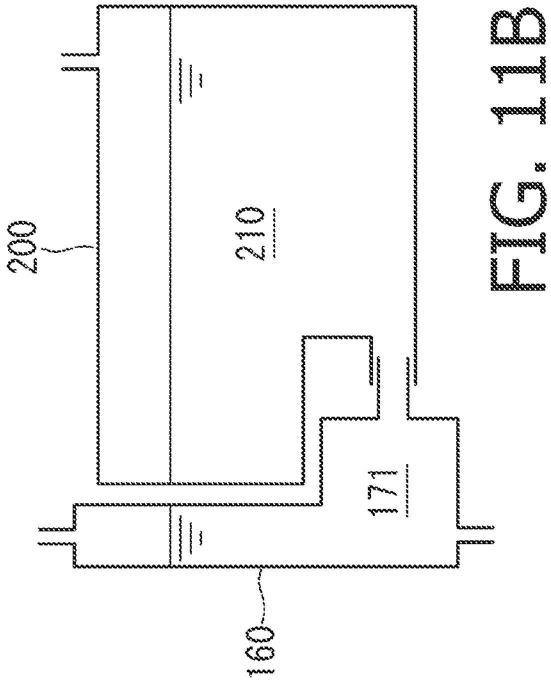
Figure 11C:
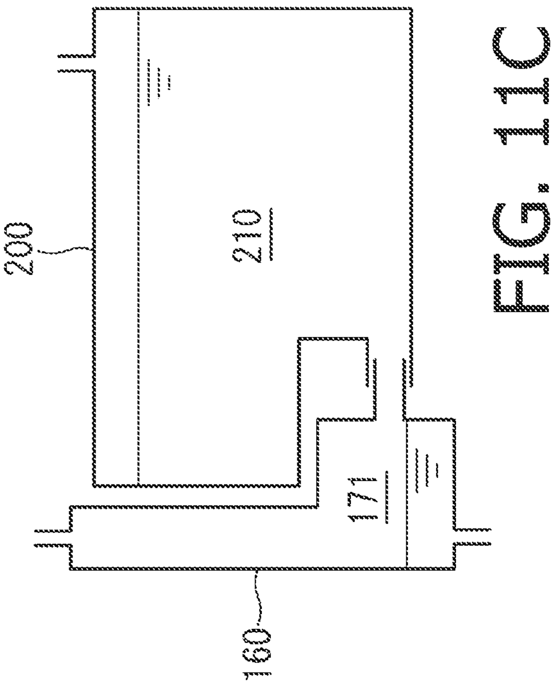
Figure 11D:
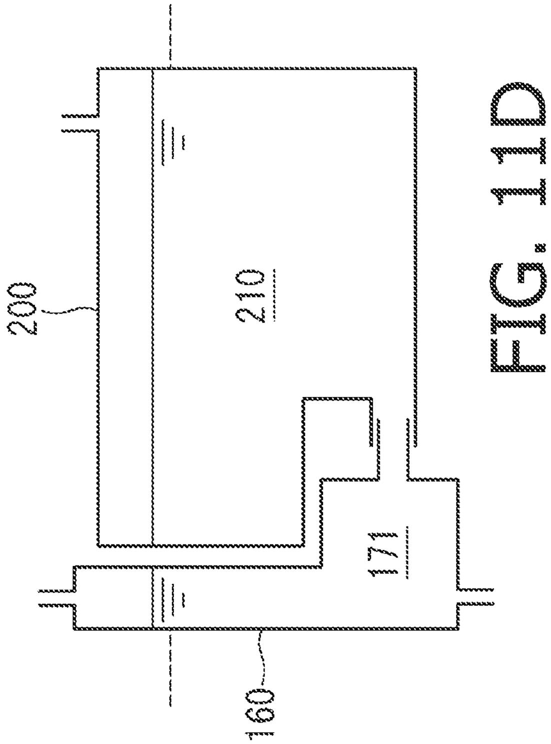

As shown in FIG. 11A, a new cartridge 200 containing the initially filled amount of ink may be attached to the attachment case 150 under the condition where the tank 160 contains no ink therein, and, as shown in FIG. 11B, a portion of the ink in the cartridge 200 attached to the attachment case 150 may flow into the tank 160. Under the condition shown in FIG. 11B, a value for the amount of the ink remaining in the cartridge 200, i.e., the first remainder value for the first remainder amount, is equal to the first predetermined value. In this regard, as shown in FIG. 11C, when another new cartridge 200 is attached to the attachment case 150 under a condition where the tank 160 contains some amount of the ink in the liquid compartment 171, a portion of the ink in the cartridge 200 may flow into the tank 160, as shown in FIG. 11D. Under the condition shown in FIG. 11D, the first remainder amount may be greater than or equal to the amount corresponding to the first predetermined value. In other words, the first remainder value may be greater than or equal to the first predetermined value. A broken line in FIG. 11D indicates a level of the ink corresponding to the first predetermined amount, i.e., the level of the ink under the condition shown in FIG. 11B. Based on these potential conditions for the ink in the cartridge 200, in S91, the controller 130 determines whether the first remainder value read in S81 is greater than or equal to the first predetermined value.

When, for example, the ink remaining in the cartridge 200 is in a condition, for example, as shown in FIG. 14A, in S91, the controller 130 determines that the first remainder value is not greater than or equal to the first predetermined value (S91: NO). In S92, the controller 130 determines the length of the bar 76 in the first object 251 to be a length, which corresponds to the first remainder value, as shown in FIG. 14B. A broken line in FIG. 14A indicates the level of the ink corresponding to the first predetermined amount, i.e., the level of the ink under the condition shown in FIG. 11B.

For example, the controller 130 may determine the length of the bar 76 in the first object 251 proportionately to the first remainder value. In particular, the controller 130 may determine the length of the bar 76 in the first object 251 based on a formula or a table prepared in advance in the EEPROM 134. The length of the bar 76 in the first object 251 may decrease linearly as the first remainder value decreases gradually or may decrease non-linearly in phases each time the first remainder value decreases to a predetermined level.

In S93, the controller 130 determines the length of the bar 78 in the second object 252 to be a maximum length for the bar 78, as shown in FIG. 14B. The length of the bar 78 in the second object 252 may be maintained at the maximum length until the values from the liquid-level sensor 155 change from the lower level (L) to the higher level (H), while the length of the bar 76 in the first object 251 may change according to the first remainder amount. Therefore, the user's attention may be focused on the first object 251 rather than the second object 252 until outputs from the liquid-level sensor 155 change from the lower level (L) to the higher level (H).

The flow proceeds to S90. The controller 130 conducts the estimated printable quantity (ISO equivalent) determining process (see FIG. 23A) to determine the estimated printable quantity and thereafter ends the objects determining process.

When, for example, the ink remaining in the cartridge 200 is in a condition, for example, as shown in FIG. 13A, in S91, the controller 130 determines that the first remainder value is greater than the first predetermined value (S91: YES). In S92, the controller 130 determines the length of the bar 76 in the first object 251 to be a maximum length for the bar 76, as shown in FIG. 13B. The length of the bar 76 in the first object 251 may be maintained at the maximum length until the first remainder amount decreases to be smaller than the first predetermined amount. Therefore, the length of the bar 76 in the first object 251 is fixed at the maximum length, regardless of the amount of the ink in the cartridge 200, each time immediately after the cartridge 200 is newly attached to the attachment case 150. In other words, each time after the cartridge 200 is newly attached to the attachment case 150, the length of the bar 76 in the first object 251 is the same without varying so that the user may not be confused by the lengths of the bar 76, which may unless otherwise vary depending on the amount of the ink remained in the tank 160, but recognize that the exhausted cartridge 200 was exchanged with a new cartridge 200 correctly. A broken line in FIG. 13A indicates the level of the ink corresponding to the first predetermined amount, i.e., the level of the ink under the condition shown in FIG. 11B.

In S96, the controller 130 determines the length of the bar 78 in the second object 252 to be the maximum length.

In S97, the controller 130 determines the estimated printable quantity in the sixth object 256 to be "a predetermined number+α" and ends the objects determining process thereat. The predetermined number indicates a quantity of the sheets corresponding to the ink amount indicated by the first predetermined value. The predetermined number may be prepared in advance and stored in the EEPROM 134. For example, the predetermined number may be obtained by dividing the ink amount corresponding to the first predetermined value by an average amount of the ink to be used to print an image on a sheet. In this regard, while the ink is being consumed in image printing, and until the first remainder value indicating the first remainder amount decreases to be smaller than the first predetermined value, the sixth object 251 may be kept as "the predetermined number+α."

For example, as shown in FIG. 13B, the predetermined numbers for the sixth objects 256M, 256C, 256Y, for the magenta, cyan, and yellow inks, respectively, may be 1,500. Meanwhile, the predetermined number for the sixth object 256Bk for the black ink, which may be stored in the cartridge 200 larger than the cartridges 200 for the magenta, cyan, and yellow inks, may be 3,000.

In S74 (FIG. 9), the controller 130 displays the ink remainder indication screen (see FIGS. 14A, 15B, 16B) using the first, second, third, fourth, and sixth objects 251, 252, 253, 254, and 256, determined through the objects determining process in S73, and ends the screen displaying process thereat.

Benefits by the First Embodiment

According to the first embodiment, the first object 251, which indicates the first remainder amount being the amount of the ink remaining in the cartridge 200, may be displayed in the ink remainder indication screen. Therefore, a user viewing the ink remainder indication screen may recognize exhaustion of the ink in the cartridge 200 or approximately when to exchange the cartridges 200. Moreover, when the cartridge 200 exhausts the ink, the first object 251, with the frame 75 alone and without the bar 76, may be displayed along with the second object 252, which indicates the ink remaining in the tank 160, in a single screen, i.e., the ink remainder indication screen. Therefore, the user may recognize how much further image printing may be continued even after the ink in the cartridge 200 is exhausted.

Moreover, the first object 251 may indicate the first remainder amount by the length of the bar 76. Therefore, the user may recognize the remainder amount of the ink in the cartridge 200 easily.

Moreover, the second object 252 may indicate the second remainder amount by the length of the bar 78. Therefore, the user may recognize the remainder amount of the ink in the tank 160 easily.

The length of the bar 76 in the first object 251 may be maintained at the maximum length until the first remainder value indicating the first remainder amount is reduced to the first predetermined value. In other words, the indication of the first remainder amount may not be affected by the amount of the ink that remained in the tank 160 at the time when the cartridges 200 were exchanged. Therefore, the user may be prevented from being confused by the indication of the first remainder amount, which may unless otherwise vary depending on the amount of the ink remaining in the tank 160, and the user may recognize that the cartridges 200 are exchanged correctly.

Meanwhile, the length of the bar 78 in the second object 252 may be maintained at the maximum length without changing until the ink in the cartridge 200 is exhausted. Once the ink in the cartridge 200 is exhausted, the length of the bar 78 in the second object 252 may be reduced proportionately to the second remainder amount. Therefore, the user's attention may be effectively focused on the first object 251 rather than the second object 252 while the ink remains in the cartridge 200 and may be drawn to the second object 252 once the ink in the cartridge 200 is exhausted.

When the signals from the liquid-level sensor 155 change from the lower level (L) to the higher level (H), the third object 253 (exclamation mark: !) may be displayed. Therefore, the user may recognize that the first remainder amount is reduced to be smaller than the ink amount indicated by the second predetermined value (e.g., zero). In other words, the user may easily recognize that the ink in the cartridge 200 is exhausted.

Moreover, when the second remainder value indicating the second remainder amount decreases to be smaller than the second predetermined value, the fourth object 254 (cross mark: x) may be displayed over the first object 251 and the second object 252. Therefore, the user may be prompted to exchange the cartridges 200 effectively.

The ink remainder indication screen may display the first object 251 and the second object 252 for each of the magenta, cyan, yellow, and black inks. Therefore, the user may recognize the first remainder amount and the second remainder amount for each of the different colored inks effectively.

While the first object 251 and the second object 252, for each of the magenta, cyan, yellow, and black inks, align along the perpendicular direction 71 in the display 28, the lengths of the bars 76, 78 in the first object 251 and the second object 252, may change in the perpendicular direction 71. Meanwhile, the first objects 251M, 251C, 251Y, 251Bk for the magenta, cyan, yellow, and black inks align along the crosswise direction 72 in the display 28, and the second objects 252M, 252C, 252Y, 252Bk for the magenta, cyan, yellow, and black inks align along the crosswise direction 72 in the display 28. Therefore, correspondence between the first object 251 and the second object 252 may be easily recognizable to the user.

Moreover, the sixth object 256 indicating the estimated printable quantity may be displayed in the ink remainder indication screen. Therefore, the user may estimate the timing when the cartridges 200 should be exchanged based on the estimated printable quantity and frequency to print images. Furthermore, the user may easily recognize how much further image printing may be continued even after the ink in the cartridge 200 is exhausted.

While the ink may be consumed as images are printed, the sixth object 256 indicating "the predetermined number+$\alpha$" may be maintained until the first remainder value indicating the first remainder amount decreases to be smaller than the first predetermined value. Therefore, the estimated printable quantity may not unnecessarily vary each time when the cartridges 200 are exchanged, in other words, the contents to be displayed by the sixth object 256 may be simplified, while the user may recognize that a sufficient amount of ink is usable.

Moreover, the sixth object 256 indicating the estimated printable quantity is displayed for each of the magenta, cyan, yellow, and black inks. Therefore, the user may estimate the timing when the cartridges 200 for each ink should be exchanged based on the estimated printable quantity and frequency to print images. Furthermore, the user may easily recognize how much further image printing may be continued even after the ink in the cartridge 200 is exhausted.

First Modified Example

It may be noted that the first object 251 and the second object 252 may not necessarily displayed to align along the perpendicular direction 71 in the ink remainder indication screen, as shown in FIG. 14B, but may be displayed to align along the crosswise direction 72 in the ink remainder indication screen, as shown in FIG. 17A.

The ink remainder indication screen shown in FIG. 17A contains the M object 260M, the C object 260C, the Y object 260Y, and the Bk object 260Bk, which are similar to those in the embodiment described above.

The ink remainder indication screen further contains the first object 251M and the second object 252M for the magenta ink, the first object 251C and the second object 252C for the cyan ink, the first object 251Y and the second object 252Y for the yellow ink, and the first object 251Bk and the second object Bk for the black ink.

The first object 251 and the second object 252 align along the crosswise direction 72 in the display 28. The first object 251 and the second object 252 each has a length along the crosswise direction 72 and a height along the perpendicular direction 71 in the display 28. The relativity in lengths and heights between the first object 251 and the second object 252 may be the same as the relativity in the lengths and widths between the first object 251 and the second object 252 in the embodiment described above.

The first object 251M for the magenta ink is displayed in an upper area in the ink remainder indication screen. The first object 251C for the cyan ink is displayed in an area lower than the first object 251M. The first object 251Y for the yellow ink is displayed in an area lower than the first object 251C. The first object 251Bk for the black ink is displayed in an area lower than the first object 251Y.

The second object 252M for the magenta ink is displayed in a rightward area with respect to the first object 251M. The second object 252C for the cyan ink is displayed in an area lower than the second object 252M. The second object 252Y for the yellow ink is displayed in an area lower than the second object 252C. The second object 252Bk for the black ink is displayed in an area lower than the second object 252Y. Optionally, the second object 252 may be displayed in a leftward area with respect to the first object 251.

Benefits by the First Modified Example

The first object 251 and the second object 252 may align along the crosswise direction 72 in the display 28, and the lengths of the bars in the first object 251 and the second object 252 may change in the crosswise direction 72. Moreover, the first objects 251M, 251C, 251Y, 251Bk may align in the direction of the height 71, and the second objects 252M, 252C, 252Y, 252Bk may align in the perpendicular direction 71, in the display 28. Thereby, the correspondence between the first object 251 and the second object 252 for each color may be as easily recognizable to the user as the first embodiment described above.

Second Modified Example

The cartridge 200 (see FIG. 4A) described in the above embodiment may be replaced with a large-capacity cartridge 226 (see FIG. 22), which may store a larger amount of ink than the cartridge 200.

The large-capacity cartridge 226 may be in a configuration similar to that in the cartridge 200 except that the liquid compartment 210 in the large-capacity cartridge 226 may contain a larger amount of ink than the liquid compartment 210 in the cartridge 200. In particular, the large-capacity cartridge 226 may not have the recessed section 62 (see FIG. 4). In other words, the large-capacity cartridge 226 may store a larger amount of ink than the cartridge 200 for a volume of the recessed section 62. Optionally, the large-capacity cartridge 226 may have a shape, of which length in the front-rear direction 8 is greater than the length in the front-rear direction 8 of the cartridge 200.

In the second modified example, the large-capacity cartridge 226 containing the black ink will be described as an example.

The controller 130 reads the first remainder value, i.e., the initially filled amount, stored in the IC chip 247 and determines whether the current cartridge is the cartridge 200 or the large-capacity cartridge 226.

If the controller 130 determines that the current cartridge is the large-capacity cartridge 226, in the objects determining process shown in FIG. 10, the controller 130 determines that a fifth object 255B, which indicates the remainder amount of the black ink, as shown in FIG. 17B will be displayed in place of the first object 251Bk (see FIG. 13B).

The fifth object 255Bk may be in a shape similar to the shape of the first object 251Bk but has a width greater than the width of the first object 251Bk in the crosswise direction 72 in the display 28. In this regard, the width of the fifth object 255Bk may be greater than the width of the second object 252Bk, which indicates the second remainder amount of the ink in the tank 160.

Benefits by the Second Modified Example

The fifth object 255Bk having the greater width than the first object 251Bk may help the user to visually recognize that the large-capacity cartridge 226 is currently attached to the attachment case 150.

Meanwhile, the width of the second object 252Bk is maintained to be the same even if the large-capacity cartridge 226 in place of the cartridge 200 is currently attached. Therefore, the user may recognize that the amount of the ink to be stored in the tank 160 stays the same between the cartridge 200 and the large-capacity cartridge 226. In this regard, a user's potential misunderstanding that the printable quantity after exhaustion of the ink in the large-capacity cartridge 226 may increase when the larger-capacity cartridge 226 is attached may be prevented.

Third Modified Example

The ink remainder indication screen may contain an eighth object 258 including eighth objects 258A, 258B, as shown in FIG. 18A. The eighth object 258 allows the user to select to display (show) or not display (hide) the sixth object 256 indicating the estimated printable quantity. Optionally, the printer 10 may have an input device, such as a button, through which the user may select to show or hide the sixth object 256, in place of the eighth objects 258A, 258B, outside the display 28.

As shown in FIG. 19, in S101, the controller 130 determines whether the user tapped on the eighth object 258. If no tapping action on the eighth object 258 is detected (S101: NO), the controller 130 continues displaying the current contents. If the user's tapping action on the eighth object 258 is detected (S101: YES), in S102, the controller 130 determines which one of the eighth objects 258A, 258B the user tapped on. In other words, whether the user selects to display or not display the sixth object 256 is determined. If the controller 130 determines that the user selects to display the sixth object 256 (S102: DISPLAY), in S103, the controller 130 determines to display the sixth object 256 and ends the display determining process thereat.

Benefits by the Third Modified Example

According to the third modified example, the user may select whether the sixth object 256 should be displayed or not displayed through the eighth object 258.

While the third modified example suggests the options for the user to select whether the sixth object 256 indicating the estimated printable quantity should be shown or hidden, the controller 130 may take control over the decision whether sixth object 256 should be shown or hidden. For example, the controller 130 may determine that the sixth object 256 should be hidden when the cartridge being attached to the attachment case 150 is an unqualified cartridge, which may be provided by, for example, a different manufacturer. In other words, the controller 130 may determine that the sixth object 256 should not be displayed when the cartridge 200 qualified for the printer 10 is absent from the attachment case 150. More specifically, the controller 130 may determine accessibility to the IC chip 247 and/or achievability to specific information concerning the ink remainder amount from the IC chip 247. If the controller 130 determines that the controller 130 may not access to the IC chip 247 or may not achieve the information concerning the ink remainder amount from the IC chip 247, the controller 130 may decide not to display the sixth object 256. The controller 130 may not access the IC chip 247 or not achieve the information concerning the ink remainder amount when, for example, ink supplied by a different manufacture is loaded. Therefore, the controller 130 may display a seventh object 257, which contains a text string such as "Unapproved ink is loaded."

Fourth Modified Examples

The forms of the first object 252 and the second object 252 may not necessarily be limited to the rectangular bars but may be in different shapes such as those shown in FIGS. 20A-20B.

As shown in FIG. 20A, the first object 251 and the second object 252 may be in triangular forms. Largeness of a shaded area in the first object 251 may express the first remainder amount, and largeness of a shaded area in the second object 252 may express the second remainder object. In other words, area dimensions in the shaded areas in the first object 251 and the second object 252 may vary depending on the first remainder amount and the second remainder amount, respectively.

As shown in FIG. 20B, the first object 251 and the second object 252 may be in circular forms. Largeness of a shaded area in the circle in the first object 251 may express the first remainder amount, and largeness of a shaded area in the second object 252 may express the second remainder object. In other words, area dimensions in the shaded areas in the first object 251 and the second object 252 may vary depending on the first remainder amount and the second remainder amount, respectively.

Benefits by the Fourth Modified Examples

The first object 251 may change a size of the area indicating the first remainder amount. Therefore, the user may visually recognize the first remainder amount easily. The second object 252 may change a size of the area indicating the second remainder amount. Therefore, the user may visually recognize the second remainder amount easily.

Fifth Modified Example

In the objects determining process (see FIG. 10), the estimated printable quantity may not necessarily be determined based on the first remainder amount and the second remainder amount (see S90 in FIG. 10). For example, as described below, the estimated printable quantity may be determined based on a predetermined lower limit number.

The controller 130 may determine the estimated printable quantity based on the total remainder value, i.e., sum of the first remainder value and the second remainder value, and determine whether the determined estimated printable quantity is greater than or equal to a predetermined number. The predetermined number may be an estimated printable quantity determined based on an amount of the ink remaining in the tank 160 when the signals output from the liquid-level sensor 155 change from the lower level (L) to the higher level (H). In other words, the predetermined number may be a quantity, which is a result of dividing the third predetermined value by a standard usage value prepared in the EEPROM 134. The standard usage value may be a standard amount of ink to be used in printing an image on a single sheet.

When the controller 130 determines that the estimated printable quantity, which is calculated based on the total remainder value and the discharged amount values, is greater than or equal to the predetermined number, the controller 130 may determine contents of the sixth object 256 (see FIG. 15B) to be the predetermined number.

Benefits by the Fifth Modified Example

The estimated printable quantity may be calculated based on the total remainder amount of the ink in the cartridge 200 and the tank 160. The total ink remainder amount may be calculated based on the discharged amount values indicating the amount of the ink discharged by the head 21 in the past. Meanwhile, the discharged amount values may contain an error being a difference from the actually discharged amount. Accordingly, the estimated printable quantity based on the discharged amount values may contain an error. In this regard, there may be an occasion that an estimated printable quantity, e.g., 150, smaller than the predetermined number, e.g., 200, is displayed in the display 28 even though the cartridge 200 is not yet actually empty. If so, when the signals from the liquid-level sensor 155 change from the lower level (L) to the higher level (H), the printable quantity may increase from 150 to 200. In other words, the user may consider that the printable quantity increased after printing images on sheets and may be confused or may be concerned about a technical problem. In this regard, according to the fifth modified example, the predetermined number being the lower limit number (e.g., 200) for the estimated printable quantity may be defined in advance, and a number smaller than the predetermined number may not be displayed until the signals from the liquid-level sensor 155 change from the lower level (L) to the higher level (H). Therefore, an event, in which the estimated printable quantity increases when the signals from the liquid-level sensor 155 change from the lower level (L) to the higher level (H), may be prevented. Therefore, the user may be prevented from the confusion or concerns that the printer 10 has a technical problem.

Sixth Modified Example

The estimated printable quantity to be displayed in the ink remainder indication screen may not necessarily be calculated on basis of the ISO equivalent. For example, the user may select whether the estimated printable quantity to be displayed in the ink remainder indication screen should be calculated on basis of either the ISO equivalent or a consumed amount. The estimated printable quantity calculated on basis of the consumed amount may indicate a quantity of sheets printable in the currently remaining inks based on a printable quantity of sheets per unit amount of ink. The ink remainder indication screen may contain a selective object (not shown), through which the user may enter a selection whether the estimated printable quantity on basis of the ISO equivalent should be displayed or estimated printable quantity on basis of the consumed amount should be displayed in the ink remainder indication screen. Alternatively to the selective object, the printer 10 may have a button to enter the selection.

For example, prior to determining the estimated printable quantity on the consumed amount basis (see FIG. 23B), the controller 130 may conduct an average usage value determining process as shown in FIG. 24.

[Average Usage Value Determining Process]

The controller 130 stands by until image printing starts (S61: NO). In this regard, the average usage value determining process may be triggered by start of image printing. When the controller 130 determines that image printing starts (S61: YES), in S62, the controller 130 counts a current discharged amount value indicating the amount of the ink currently discharged from the head 21 since the start of image printing in S61 and a quantity of printed sheets used for image printing since the start of image printing in S61. The controller 130 continues counting (S62) until the image printing is completed (S63: NO).

In S63, when the controller 130 determines that the image printing is completed (S63: YES), in S64, the controller 130 reads a total printed quantity, which is a sum of the sheets used in the past image printing from the time of the exchange of the cartridges 200, and the total discharged amount value existing in the RAM 133 or the EEPROM 134.

In S65, the controller 130 adds the printed sheet quantity counted in S62 to the total printed quantity read in S64 and writes the sum of the printed quantity and the total printed quantity over the existing total printed quantity in the EEPROM 134 to update the total printed quantity. In S65, further, the controller 130 adds the current discharged amount value counted in S62 to the total discharged amount value read in S64 and writes the summed discharged amount values over the existing total discharged amount value in the EEPROM 134 to update the total discharged amount value.

In S66, the controller 130 divides the updated total printed quantity by the updated total discharged amount value to obtain an average usage value, which indicates a printable quantity per unit amount of the ink. In S67, the controller 130 saves the average usage value in the RAM 133 and writes the average usage value over the existing average usage value in the EEPROM 134. The controller 130 ends the average usage value determining process thereat. The controller 130 proceeds to an estimated printable quantity determining process (consumption basis) shown in FIG. 23B.

[Estimated Printable Quantity Determining Process (Consumption Basis)]

In S141, the controller 130 reads the average usage value in the EEPROM 134 and, in S142, reads the first remainder value and the second remainder value in the RAM 133. In S143, the controller 130 calculates the estimated printable quantity (consumption basis) based on the average usage value, the first remainder amount, and the second remainder amount having been read. In particular, the controller 130 sums the first remainder value and the second remainder value to calculate the total remainder value. Further, the controller 130 multiplies the total remainder value by the average usage value to calculate the estimated printable quantity (consumption basis). In S144, the controller 130 saves the estimated printable quantity (consumption basis) in the RAM 133 and the EEPROM 134 and ends the estimated printable quantity determining process (consumption basis). The controller 130 may conduct the average usage value determining process shown in FIG. 24 and the estimated printable quantity determining process (consumption basis) shown in FIG. 23B each time the controller 130 conducts the image forming process shown in FIG. 7.

Thus, the controller 130 may display the sixth object 256 containing the estimated printable quantity, calculated either on the ISO equivalent basis or the consumption basis, in the ink remainder indication screen.

Benefits by the Sixth Modified Example

The user may select the estimated printable quantity to be displayed in the display 28 should be calculated based on either the ISO equivalent, which is based on the unified standard, or the actual amount consumed by the user. Therefore, operability of the printer 10 to the user may be improved.

Second Embodiment

In the following paragraphs, a printing program 315 installed in an information processing apparatus 300 as shown in FIG. 21A will be described as a second embodiment of the present disclosure. The information processing apparatus 300 may be, for example, a personal computer.

The information processing apparatus 300 includes a central processing unit (CPU) 301, a storage 302, an output interface 303, an input interface 304, a communication interface 305, and a communication bus 306. The CPU 301, the storage 302, the output interface 303, the input interface 304, and the communication interface 305 are connected with one another through the communication bus 306.

The storage 302 includes a ROM 311, a RAM 312, and a memory device 313. The memory device 313 may store various types of programs, including, for example, an operating system (OS) 314 and a printing program 315. The OS 314 and the printing program 315 may be executed by the CPU 301 on the RAM 312. The OS 314 may control processes in the programs. The printing program 315 may include a printer driver, which may conduct a process described below.

The output interface 303 is connected with a display 316 through a cable (not shown) to output image information to the display 316 and control the display 316 to display images.

The input interface 304 is connected with an input device 317 through a cable (not shown) or wirelessly. The input interface 317 may include, for example, a mouse and a keyboard.

The communication interface 305 is connected with the communication interface 34 (see FIG. 6) in the printer 10, which is described earlier in the first embodiment, to communicate with the printer 10.

As shown in FIG. 21B, the printing program 315 in information processing apparatus 300 may receive a command from the use through the input device 317 and, in S121, transmit a print command in response to the received command to the printer 10 through the communication interface 305.

The printer 10 receiving the print command may, in S122, conduct the image forming process (see FIG. 7), and in S123, conduct the screen displaying process (see FIG. 9), which were described earlier in the first embodiment. In S124, the printer 10 may generate screen data for the ink remainder indication screen based on the objects determined in the objects determining process (see FIG. 10) and transmit the generated screen data to the information processing apparatus 300 through the communication interface 34. The screen data contains information indicating the first object 251 and information indicating the second object 252.

In S125, the printing program 315 in the information processing apparatus 300 conducts a receiving process to receive the screen data from the printer 10 through the communication interface 305. In S126, the printing program 315 conducts a displaying process to display the screen data, received from the printer 10 through the output interface 303, in the display 316.

Benefits by the Second Embodiment

According to the second embodiment, the ink remainder screen, which contains the first object 251, the second object 252, the third object 253, the fourth object 254, the fifth object 255, the sixth object 256, the seventh object 257, and/or the eighth object 258, may be displayed on the display 316 in the information processing apparatus 300.

More Examples

Although examples of carrying out the invention has been described, those skilled in the art will appreciate that there are numerous variations and permutations of the image forming apparatus and the computer-readable storage medium that fall within the spirit and scope of the invention as set forth in the appended claims.

For example, the information processing apparatus 300 described in the second embodiment may not necessarily be limited to the personal computer but may include a mobile terminal. The mobile terminal may have the display 316 integrally, and the input interface 304 may be laid over a display panel in the display 316 to serve as a touch sensor.

For another example, with regard to the second embodiment described above, the screen data, containing the information of the first object 251 and the information of the second object 252, may not necessarily be transmitted from the printer 10 to the information processing apparatus 300. Instead, the printer 10 may transmit the information of the first object 251 and the information of the second object 252 alone to the information processing apparatus 300, and the information processing apparatus 300 may generate the screen data based on the information of the first object 251 and the information of the second object 252 being received and display the ink remainder indication screen based on the generated screen data in the display 316.

For another example, the first object 251 may not necessarily include the frame 75 and the bar 76 but may include the bar 76 alone, and the frame 75 may be omitted. Similarly, the second object 252 may not necessarily include the frame 77 and the bar 78 but may include the bar 78 alone, while the frame 77 may be omitted.

For another example, the fourth object 254 (cross-out mark: x) may not necessarily be displayed over the first object 251 and the second object 252 but may be displayed over either the first object 251 alone or the second object 252 alone.

For another example, in S86 in the objects determining process (see FIG. 10), the third object 253 (exclamation mark: !) may not necessarily be displayed when the signals from the liquid-level sensor 155 indicates the higher level (H) but may be displayed, after the signals from the liquid-level sensor 155 change from the lower level (L) to the higher level (H), and in response to the discharge amount value reaching a predetermined threshold value. When, for example, the printer 10 is placed in an inclined posture, the surface of the ink in the cartridge 200 may incline; therefore, the liquid-level sensor 155 may output the higher-leveled signal (H) even though the cartridge 200 still contains the ink, and the third object 253 may be displayed. In this regard, a potential confusion, in which the third object 253 is displayed even though the cartridge 200 still contains the ink, may be restrained.

For another example, the colorant to be used to form images on sheets in the printer 10 may not necessarily be limited to ink, but may be, for example, toner.

For another example, the printer 10 may not necessarily be a multicolor printer but may be a printer to print a monochrome image. In another words, the printer 10 may solely have a single reservoir set having a single cartridge 200 and a single tank 160.

What is claimed is:

1. An image forming apparatus, comprising:

a first cartridge configured to store first ink;

a first tank configured to receive the first ink from the first cartridge and to store the first ink therein;

a head mounted on a carriage and configured to receive the first ink from the first tank and to discharge the first ink;

a display; and a controller, wherein the controller is configured to cause the display to switch from a first screen to a second screen in response to a first object being touched by a user, wherein the first screen includes the first object, the first object having a rectangular shape, wherein the second screen includes a first rectangle and a second rectangle thereon, the first rectangle indicating an amount of the first ink in the first cartridge and the second rectangle indicating an amount of the first ink in the first tank.

2. The image forming apparatus according to claim 1, wherein the first object includes a sign corresponding to ink.

3. The image forming apparatus according to claim 1, wherein the first screen includes a second object, through which the display is switchable from the first screen to a setting screen.

4. The image forming apparatus according to claim 3, wherein the first object is laterally adjacent to the second object on the first screen.

5. The image forming apparatus according to claim 4, wherein the first rectangle and the second rectangle are arranged along a first direction on the second screen, and wherein the first object and the second object are arranged along a second direction on the first screen, the second direction being perpendicular to the first direction.

6. The image forming apparatus according to claim 5, wherein the first screen includes a third object, wherein the third object is larger than the first object, wherein the third object is larger than the second object, and wherein the first object and the second object are arranged below the third object on the first screen.

7. The image forming apparatus according to claim 6, wherein the first object and the second object are arranged at a bottom of the first screen.

8. The image forming apparatus according to claim 1, wherein the first rectangle has a first side extending along a first direction and a second side extending perpendicularly to the first direction.

9. The image forming apparatus according to claim 8, wherein the first side is longer than the second side.

10. The image forming apparatus according to claim 1, wherein the first rectangle has a first area and the second rectangle has a second area, and wherein the first area is larger than the second area.

11. The image forming apparatus according to claim 10, further comprising:

a second cartridge configured to store second ink, the first ink having a first color and the second ink having a second color which is different from the first color; and a second tank configured to receive the second ink from the second cartridge and store the second ink therein, wherein the head is configured to receive the second ink from the second tank and discharge the second ink, wherein the first cartridge has a first ink storable capacity and the second cartridge has a second ink storable capacity, the first ink storable capacity being greater than the second ink storable capacity, wherein the controller is configured to cause the display to display a third rectangle and a fourth rectangle thereon, the third rectangle indicating an amount of the second ink in the second cartridge and the fourth rectangle indicating an amount of the second ink in the second tank, wherein the third rectangle has a third area and the fourth rectangle has a fourth area, the third area being larger than the fourth area, and wherein the first area is larger than the third area.

12. The image forming apparatus according to claim 1, wherein the first rectangle is spaced away from the second rectangle.

13. The image forming apparatus according to claim 1, wherein the controller is configured to cause the display to display a first mark thereon when the first cartridge does not store a substantial amount of the first ink to flow into the first tank.

14. The image forming apparatus according to claim 13, wherein the first mark is an exclamation mark.

15. The image forming apparatus according to claim 13, wherein the controller is configured to cause the display to display a second mark thereon when neither the first cartridge nor the first tank stores a substantial amount of the first ink to continue printing.

16. The image forming apparatus according to claim 15, wherein the second mark is a cross-out mark.

17. The image forming apparatus according to claim 1, wherein the controller is configured to cause the display to display a first mark and a second mark thereon, wherein the first mark is displayed when the first cartridge does not store a substantial amount of the first ink to flow into the first tank, wherein the second mark is displayed when neither the first cartridge nor the first tank stores a substantial amount of the first ink to continue printing, and wherein the first mark has a first shape and the second mark has a second shape, the first shape being different from the second shape.

18. The image forming apparatus according to claim 1, wherein the controller is configured to cause the display to display a first mark and a second mark thereon, wherein the first mark is displayed when the first cartridge does not store a substantial amount of the first ink to flow into the first tank, wherein the second mark is displayed when neither the first cartridge nor the first tank stores a substantial amount of the first ink to continue printing, and wherein the first mark overlaps the first rectangle, and the second mark overlaps the second rectangle and the second rectangle.

19. The image forming apparatus according to claim 1, wherein the first rectangle has a first area, and wherein the controller is configured to display the first area to be smaller in response to decreasing of the amount of the first ink in the first cartridge.

20. The image forming apparatus according to claim 19, wherein the second rectangle has a second area, and wherein the controller is configured to display the second area to be smaller in response to decreasing of the amount of the first ink in the first tank.

21. The image forming apparatus according to claim 20, wherein the second screen includes a first frame and a second frame, and wherein the second screen includes the first frame and the second frame without displaying the first rectangle or the second rectangle when both a remaining amount of the first ink in the first cartridge and a remaining amount of the first ink in the first tank are zero.

22. The image forming apparatus according to claim 1, wherein the second screen excludes both an image of the head and an amount of the first ink in the head.

23. The image forming apparatus according to claim 1, wherein the first screen excludes the first rectangle and the second rectangle.

24. An image forming apparatus, comprising:

a first cartridge configured to store first ink;

a first tank configured to receive the first ink from the first cartridge and to store the first ink therein;

a head mounted on a carriage and configured to receive the first ink from the first tank and to discharge the first ink;

a display; and a controller, wherein the controller is configured to cause the display to switch from a first screen to a second screen in response to a first object being touched by a user, and wherein the second screen includes a first rectangle indicating an amount of the first ink in the first cartridge and a second rectangle indicating an amount of the first ink in the first tank.

25. The image forming apparatus according to claim 24, wherein the second screen excludes both an image of the head and an amount of the first ink in the head.

26. The image forming apparatus according to claim 25, wherein the first screen excludes the first rectangle and the second rectangle.

* * * * *